US012415347B2

(12) United States Patent
Kouno et al.

(10) Patent No.: US 12,415,347 B2
(45) Date of Patent: *Sep. 16, 2025

(54) EPOXY RESIN COMPOSITION, GAS BARRIER MULTILAYER BODY, RETORT FOOD PACKAGING MATERIAL, PACKAGING MATERIAL FOR DEODORIZATION OR AROMA RETENTION, HEAT SHRINKABLE LABEL AND METHOD FOR PRODUCING SAME, HEAT SHRUNK LABEL AND BOTTLE HAVING SAME

(71) Applicant: MITSUBISHI GAS CHEMICAL COMPANY, INC., Tokyo (JP)

(72) Inventors: Kazuki Kouno, Kanagawa (JP); Ryoma Hashimoto, Kanagawa (JP); Naoko Kobayashi, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 467 days.

This patent is subject to a terminal disclaimer.

(21) Appl. No.: 17/795,120

(22) PCT Filed: Jan. 22, 2021

(86) PCT No.: PCT/JP2021/002131
§ 371 (c)(1),
(2) Date: Jul. 25, 2022

(87) PCT Pub. No.: WO2021/157376
PCT Pub. Date: Aug. 12, 2021

(65) Prior Publication Data
US 2023/0059584 A1 Feb. 23, 2023

(30) Foreign Application Priority Data

Feb. 4, 2020 (JP) .................. 2020-017248
Jun. 16, 2020 (JP) .................. 2020-103711
Nov. 18, 2020 (JP) .................. 2020-191928
Nov. 18, 2020 (JP) .................. 2020-191935

(51) Int. Cl.
*C08K 5/20* (2006.01)
*B32B 7/028* (2019.01)
*B32B 27/08* (2006.01)
*B32B 27/32* (2006.01)
*B32B 27/36* (2006.01)
*C08G 59/32* (2006.01)
*C08G 59/50* (2006.01)

(52) U.S. Cl.
CPC .............. *B32B 27/36* (2013.01); *B32B 7/028* (2019.01); *B32B 27/08* (2013.01); *B32B 27/32* (2013.01); *C08G 59/32* (2013.01); *C08G 59/5033* (2013.01); *C08K 5/20* (2013.01); B32B 2250/03 (2013.01); B32B 2255/205 (2013.01); B32B 2255/26 (2013.01); B32B 2307/7248 (2013.01); B32B 2439/70 (2013.01)

(58) Field of Classification Search
CPC ......... B32B 27/36; B32B 7/028; B32B 27/08; B32B 27/32; B32B 2250/24; B32B 2225/10; B32B 2307/414; B32B 2307/7244; B32B 2307/748; B32B 7/12; C08G 59/32; C08G 59/5033; C08G 59/1477; C08G 59/52; C08G 59/60; C08K 5/20; C08K 9/04; C08K 7/00; C08K 3/013; C09D 163/00; Y02W 30/80; B65D 25/20; B65D 25/36; B65D 65/40; C08J 5/18; C08J 7/0423; C08J 7/048; C08L 63/00
USPC .......................................................... 523/414
See application file for complete search history.

(56) References Cited

U.S. PATENT DOCUMENTS

2015/0059295 A1* 3/2015 Honda .................. C08G 59/44
53/473
2016/0244592 A1 8/2016 Kowamoto et al.
2017/0121520 A1 5/2017 Tan et al.
2023/0416520 A1* 12/2023 Kobayashi .............. C08L 63/00

FOREIGN PATENT DOCUMENTS

| CN | 105693141 | 6/2016 |
|---|---|---|
| JP | 2003-300271 A | 10/2003 |
| JP | 2005-28835 A | 2/2005 |
| JP | 2005-271467 | 10/2005 |
| JP | 2006-68967 | 3/2006 |
| JP | 2006-328365 A | 12/2006 |
| JP | 2008-201463 A | 9/2008 |
| JP | 2008-222761 A | 9/2008 |
| JP | 2009-101684 A | 5/2009 |
| JP | 2010-202753 A | 9/2010 |
| JP | 2011-37156 A | 2/2011 |

(Continued)

OTHER PUBLICATIONS

Machine English Translation of JP 2002265571 (Year: 2002).*
International Search Report and Written Opinion of the International Searching Authority issued in Patent Application No. PCT/JP2021/002131, dated Apr. 6, 2021, along with an English translation thereof.

*Primary Examiner* — Hannah J Pak
(74) *Attorney, Agent, or Firm* — GREENBLUM & BERNSTEIN, P.L.C.

(57) ABSTRACT

An epoxy resin composition including an epoxy resin, an epoxy resin curing agent containing an amine-based curing agent, and an unsaturated fatty acid amide having from 14 to 24 carbons, a gas barrier laminate and a retort food packaging material using the epoxy resin composition, an odor-proofing or aroma-retaining packaging material, an odor-proofing or aroma-retaining method of sealing an article containing an odorous component or an aromatic component in the packaging material, a heat-shrinkable label, the production method of the heat-shrinkable label, a heat-shrunken label and a bottle having the heat-shrunken label, and a $CO_2$ transmission prevention method.

19 Claims, 12 Drawing Sheets

(56) References Cited

FOREIGN PATENT DOCUMENTS

| | | |
|---|---|---|
| JP | 2012-92239 A | 5/2012 |
| JP | 2013-203023 A | 10/2013 |
| JP | 2017-528530 A | 9/2017 |
| JP | 2019-6972 A | 1/2019 |
| TW | 201345944 | 11/2013 |
| TW | 201525039 | 7/2015 |
| WO | 2014/185482 A1 | 11/2014 |
| WO | 2018/105282 A1 | 6/2018 |

* cited by examiner

EPOXY RESIN COMPOSITION, GAS BARRIER MULTILAYER BODY, RETORT FOOD PACKAGING MATERIAL, PACKAGING MATERIAL FOR DEODORIZATION OR AROMA RETENTION, HEAT SHRINKABLE LABEL AND METHOD FOR PRODUCING SAME, HEAT SHRUNK LABEL AND BOTTLE HAVING SAME

TECHNICAL FIELD

The present invention relates to an epoxy resin composition, a gas barrier laminate using the epoxy resin composition, a retort food packaging material, an odor-proofing or aroma-retaining packaging material, an odor-proofing or aroma-retaining method, a heat-shrinkable label and a method for producing the heat-shrinkable label, a heat-shrunken label and a bottle having the heat-shrunken label, and a $CO_2$ transmission prevention method.

BACKGROUND ART

Packaging materials used for food products, pharmaceuticals, cosmetics, precision electronic components, and the like require high oxygen barrier properties and water vapor barrier properties to prevent deterioration of the contents.

Further, various gas barrier materials, such as glass, metal, and plastic, are being used as a material for preventing the spread of odorous components, such as ammonia and trimethylamine. Regarding gas barrier properties, glass and metal are much superior to plastic materials; however, in consideration of moldability, light weight, recyclability, transparency, and the like, a plastic material having barrier properties is suitable, and a large number of gas barrier plastic materials are being used.

Oxygen barrier performance of thermoplastic plastic films is typically not so high, and thus means for imparting gas barrier properties to the films have been studied, including a method for forming a gas barrier layer of various types, such as a polyvinylidene chloride (PVDC) layer or a polyvinyl alcohol (PVA) layer, and a method for vapor-depositing an inorganic substance, such as alumina ($Al_2O_3$) or silica ($SiO_2$).

Films having a PVDC layer formed as a gas barrier layer are transparent and exhibit good barrier properties. However, when incinerated as general wastes, those films may generate organic substances, such as acid gases, and thus a transition to other materials is desired due to environmental concerns. Films in which a PVA layer is formed exhibit excellent gas barrier properties under low humidity but are highly hygroscopic, causing a problem in that the gas barrier properties rapidly decreases at a relative humidity of approximately 70% or more.

An inorganic vapor-deposited film, which is a thermoplastic plastic film on which an inorganic substance, such as alumina or silica, is vapor-deposited, is transparent and has good gas barrier properties, and does not cause such problems described above. However, in bending the inorganic vapor-deposited film, cracks are generated in the vapor-deposited inorganic layer, causing a problem of significant reduction of the gas barrier properties.

As a method for improving the bending resistance of the gas barrier film or laminate including a layer on which an inorganic substance is vapor-deposited, a method for forming a layer made from a cured product of an epoxy resin composition containing a predetermined epoxy resin and a predetermined amine-based epoxy resin curing agent as a main component has been proposed (Patent Documents 1 to 3).

Furthermore, Patent Document 4 discloses a gas barrier film having a certain layer configuration that includes a substrate film having vapor-deposited inorganic layer and a cured resin layer, the cured resin layer including a cured product of an epoxy resin composition containing an epoxy resin, a certain epoxy resin curing agent, and non-spherical inorganic particles. This gas barrier film exhibits improved gas barrier properties and has bending resistance better than known gas barrier films having a vapor-deposited inorganic layer.

Improving epoxy resin compositions for use in gas barrier films are investigated to enhance the various functions of the gas barrier films to be obtained. For example, Patent Document 5 discloses a gas barrier resin composition containing an epoxy resin, an epoxy resin curing agent, and a specific curing accelerator, and also containing a prescribed amount of a predetermined amine-derived skeletal structure in a cured product that is to be formed, and indicates that the gas barrier resin composition exhibits high gas barrier properties in a wide range of curing conditions.

As described above, forming a gas barrier layer including a cured product of a certain epoxy resin composition on a substrate is known to have a great improvement effect on the gas barrier properties.

Furthermore, in a gas barrier film having a laminated structure, or a gas barrier laminate, it is important that interlayer adhesiveness should be high to achieve good gas barrier properties stably. In this regard, for example, Patent Document 6 describes that in a laminate film obtained by laminating at least a substrate, a primer layer, an adhesive layer, and a sealant layer in this order, using a primer composition containing a specific polyester resin to form the primer layer, and using an adhesive containing an epoxy resin composition as a main component to form the adhesive layer enable to produce a laminate film that excels in adhesiveness over time and maintains excellent laminate strength and heat seal strength even when stored for a long period of time.

However, depending on the type of substrate and epoxy resin composition used in the gas barrier film or laminate, the interlayer adhesiveness between the substrate and the cured product layer of the epoxy resin composition is not sufficient. Patent Documents 1 to 6 each disclose an epoxy resin composition in which an amine-based epoxy resin curing agent is used, but according to research by the present inventors in recent years, it has been discovered that the adhesiveness to inorganic substances, and particularly to alumina, of the cured product of an epoxy resin composition in which an amine-based epoxy resin curing agent is used is unstable.

The packaging materials for food application and the like may be subjected to a heating treatment such as a retort process, and it is important that such packaging materials can maintain the interlayer adhesiveness even after the retort process.

Regarding a material for preventing the spread of odorous components such as ammonia and trimethylamine, a method for preventing the diffusion of odorous components (odor-proofing method) by containing the odorous components in a bag including a material including a thermoplastic plastic film and further including a barrier layer made of an organic substance on the thermoplastic plastic film is being studied. Hereinafter, in this specification, the property of containing odorous components and preventing spread of odor is referred to as "odor-proofing property".

For example, in Patent Document 7, a method of preventing transmission of an amine-based volatile substance using a barrier material including at least one layer including an epoxy resin cured product containing 40 wt. % or more of a xylylene diamine skeletal structure is disclosed, and examples of a laminated film and a bag-shaped container using the barrier material as an adhesive are presented as examples.

Patent Document 8 discloses a foul-odor-sealing bag which contains an inner layer and an outer layer each of which includes an ethylene (co)polymer, and an intermediate layer including a barrier resin, the inner and outer layers containing an antiblocking agent and a surface active agent, and meets certain requirements.

However, it is desirable to further improve the odor-proofing property of packaging materials such as the film and the bag described in Patent Documents 7 and 8. For example, the thickness of the intermediate layer (barrier layer) of the foul-odor-sealing bag described in Patent Document 2 is in the range from 0.8 to 5.0 μm, but from the viewpoints of facilitating a thinner packaging material and cost efficiency, it is desirable to achieve sufficient odor-proofing property even when the barrier layer is made thinner. Further, in addition to having odor-proofing property, it is desirable for these packaging materials to have the property of containing the aromatic components of an aroma-imparted article so that the aromatic components do not spread (hereinafter also referred to as "aroma-retaining property").

Furthermore, both of the barrier layers in the disclosed art of Patent Documents 7 and 8 are adhesive materials constituting the intermediate layer of a film or a bag and having blocking property; as such, they are not suitable as materials forming a surface layer (innermost layer or outermost layer). When a barrier layer is made into an intermediate layer of a film, a bag, or the like, it is necessary that the layer constitution has at least three layers including the barrier layer, which is disadvantageous in terms of cost.

Meanwhile, in recent years, PET bottles are widely used as beverage containers. On many PET bottles, a shrink label made of plastic showing the contents is affixed to cover the body of the PET bottle.

However, when the oxygen barrier properties of a PET bottle are not sufficient, oxidative degradation of the contents is likely to occur. Therefore, there have been studies of imparting gas barrier properties to shrink labels used on PET bottles.

In addition, shrink labels also have problems such as deterioration of properties as a decorative label or deterioration of gas barrier properties after shrinking. Thus, methods to solve these problems are also being studied.

For example, Patent Document 9 discloses a shrink label having at least one of a printing layer containing a pigment, an anchor coat layer, and a barrier layer on at least one surface of a shrink film, the layers being laminated in the order of shrink film/printing layer/anchor coat layer/barrier layer, the arithmetic mean roughness of the surface of the anchor coat layer being a predetermined value or less, and discloses that this shrink label exhibits no deterioration in decorative properties such as "cloudiness" and in gas barrier properties even after processing.

Patent Document 10 discloses that a gas barrier shrink laminate film made by bonding two heat-shrinkable films with a gas barrier adhesive does not have decreased gas barrier properties even after shrinking is performed.

For a PET bottle for carbonated beverages, carbon dioxide gas ($CO_2$) barrier properties are important. However, there is only evaluation of oxygen barrier properties for the shrink label or film described in Patent Documents 9 and 10, and there is room for improvement of $CO_2$ barrier properties. Furthermore, both of the barrier layers in the shrink label or the film described in Patent Documents 9 and 10 are materials constituting the intermediate layer of the shrink label or the film, and are not suitable as materials forming a surface layer (innermost layer or outermost layer). When a barrier layer is made into an intermediate layer of a shrink label, it is necessary that the layer constitution has at least three layers including the barrier layer, which is disadvantageous in terms of cost.

CITATION LIST

Patent Document

Patent Document 1: JP 2003-300271 A
Patent Document 2: JP 2005-028835 A
Patent Document 3: JP 2009-101684 A
Patent Document 4: WO 2018/105282
Patent Document 5: JP 2010-202753 A
Patent Document 6: JP 2013-203023 A
Patent Document 7: JP 2008-222761 A
Patent Document 8: WO 2014/185482
Patent Document 9: JP 2008-201463 A Patent Document 10: JP 2011-37156 A

SUMMARY OF INVENTION

Technical Problem

Thus, the first object of the present invention is to provide an epoxy resin composition that contains an amine-based curing agent as an epoxy resin curing agent and that can form a cured product which exhibits high gas barrier properties, good adhesiveness to inorganic substances such as alumina in particular, and excellent retort resistance in which peeling-off does not easily happen even after a retort treatment, and to provide a gas barrier laminate and a retort food packaging material using the epoxy resin composition.

The second object of the present invention is to provide an odor-proofing or aroma-retaining packaging material that has good odor-proofing property and aroma-retaining property, facilitates a thinner packaging, and provides excellent cost efficiency, and to provide an odor-proofing or aroma-retaining method.

Further, the third object of the present invention is to provide a heat-shrinkable label having good $CO_2$ barrier properties, excellent conformability during heat shrinking, and cost efficiency, a method for producing the heat-shrinkable label, a heat-shrunken label and a bottle having the heat-shrunken label, and a $CO_2$ transmission prevention method.

Solution to Problem

The present inventors have discovered that the above problems can be solved by using an epoxy resin composition containing an epoxy resin, an epoxy resin curing agent containing an amine-based curing agent, and a certain fatty acid amide.

That is, the present invention relates to the following.

[1] An epoxy resin composition containing an epoxy resin, an epoxy resin curing agent containing an amine-based curing agent, and an unsaturated fatty acid amide having from 14 to 24 carbons.

[2] A gas barrier laminate including a substrate and a cured resin layer, the cured resin layer being a cured product of the epoxy resin composition according to [1].

[3] The gas barrier laminate according to [2], further including a thermoplastic resin layer.

[4] A retort food packaging material containing the gas barrier laminate according to [3].

[5] An odor-proofing or aroma-retaining packaging material including a substrate and a cured product layer of an epoxy resin composition, the epoxy resin composition containing an epoxy resin, an epoxy resin curing agent containing an amine-based curing agent, and an unsaturated fatty acid amide having from 14 to 24 carbons.

[6] A method for odor proofing or aroma retaining, the method including sealing an article containing an odorous component or an aromatic component in a packaging material including a substrate and a cured product layer of an epoxy resin composition, the epoxy resin composition containing an epoxy resin, an epoxy resin curing agent containing an amine-based curing agent, and an unsaturated fatty acid amide having from 14 to 24 carbons.

[7] A heat-shrinkable label including a heat-shrinkable substrate layer and a cured product layer of an epoxy resin composition, the epoxy resin composition containing an epoxy resin, an epoxy resin curing agent containing an amine-based curing agent, and an unsaturated fatty acid amide having from 14 to 24 carbons.

[8] A method for producing the heat-shrinkable label according to [7], the method having (I) and (II) sequentially.

(I): applying an epoxy resin composition containing an epoxy resin, an epoxy resin curing agent containing an amine-based curing agent, an unsaturated fatty acid amide having from 14 to 24 carbons, and a solvent on a surface of at least one side of a heat-shrinkable substrate and forming a coating layer (II): Heating and drying the coating layer at a temperature of less than 100° C. and removing the solvent

[9] A heat-shrunken label formed by heat-shrinking the heat-shrinkable label according to [7].

[10] A bottle having the heat-shrunken label according to [9].

[11] A $CO_2$ transmission prevention method using the heat-shrinkable label according to [7] or the heat-shrunken label according to [9].

Advantageous Effects of Invention

According to the epoxy resin composition of the first invention, the epoxy resin composition can form a cured product that exhibits high gas barrier properties, good adhesiveness to inorganic substances such as alumina in particular, and excellent retort resistance in which peeling-off does not readily occur even after a retort treatment. A gas barrier laminate in which a cured resin layer, which is a cured product of the epoxy resin composition, is formed on a substrate having at least one surface composed of an inorganic substance exhibits high gas barrier properties and interlayer adhesiveness, and has retort resistance, making it suitable for, for example, the retort food packaging material application.

According to the second invention, it is possible to provide an odor-proofing or aroma-retaining packaging material that has good odor-proofing property and aroma-retaining property, facilitates a thinner packaging, and provides excellent cost efficiency, and to provide an odor-proofing or aroma-retaining method. The packaging material according to the second invention can be suitably used for applications requiring odor-proofing property or aroma-retaining property, such as: a bag for storing used paper diapers or pet litter, wastes, kitchen refuse, and other malodorous substances; a packaging material for foods with strong odor; and a packaging material for toiletry products, cosmetics, stationery, toys, and the like that are aromatic.

Further, according to third invention, a heat-shrinkable label having good $CO_2$ barrier properties, excellent conformability during heat shrinking, and excellent cost efficiency, a method for producing the heat-shrinkable label, a heat-shrunken label and a bottle having the heat-shrunken label, and a $CO_2$ transmission prevention method can be provided. The heat-shrinkable label according to the third invention can be suitably used on a PET bottle for carbonated water or other carbonated beverages.

DESCRIPTION OF EMBODIMENTS

First Invention: Epoxy Resin Composition

Figure 1:
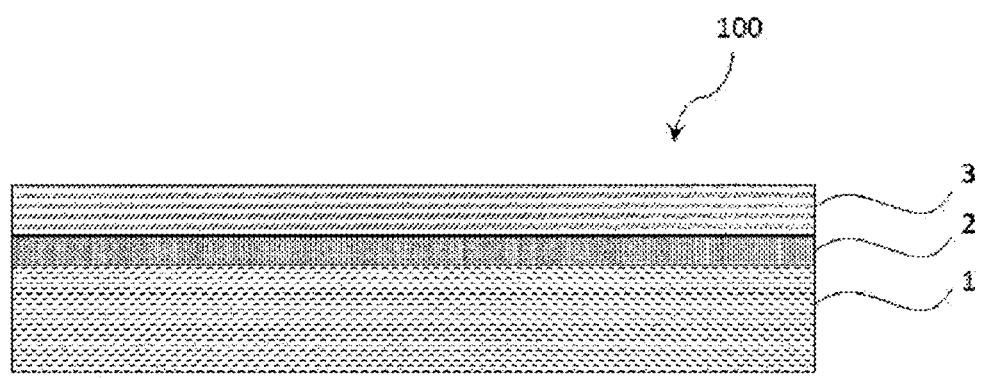
FIG. 1 is a schematic cross-sectional view illustrating a gas barrier laminate 100 according to an embodiment of the first invention.

The epoxy resin composition according to the first invention is an epoxy resin composition containing an epoxy resin, an epoxy resin curing agent containing an amine-based curing agent, and an unsaturated fatty acid amide having from 14 to 24 carbons. Hereinafter, the epoxy resin composition according to the first invention is also simply referred to as an "epoxy resin composition of the present invention".

By having the above constitution, the epoxy resin composition of the present invention can form a cured product that exhibits high gas barrier properties, good adhesiveness to inorganic substances such as alumina in particular, and excellent retort resistance in which peeling-off does not readily occur even after a retort treatment. Furthermore, the cured product formed is highly transparent.

According to research by the present inventors in recent years, it was discovered that the adhesiveness of a cured product of an epoxy resin composition to inorganic substances, and particularly alumina, is unstable, and among such cured products, this tendency is remarkable when an amine-based epoxy resin curing agent is used. Further, as a result of diligent research by the inventors, it was found that when, among fatty acid amides, an unsaturated fatty acid amide having from 14 to 24 carbons is added to an epoxy resin composition using an amine-based epoxy resin curing agent, the cured product of the epoxy resin composition has improved adhesiveness to alumina and the like, improved retort resistance, and good transparency. The reason for this is not clear but is assumed to be as follows.

When an unsaturated fatty acid amide having from 14 to 24 carbons is added to an epoxy resin composition, it is believed that the unsaturated fatty acid amide having from 14 to 24 carbons acts to relieve the stress generated in the cured product of the epoxy resin; also, compared to, for example, a saturated fatty acid amide, an unsaturated fatty acid amide having from 14 to 24 carbons has higher compatibility with an epoxy resin composition containing an amine-based epoxy resin curing agent. Therefore, it is inferred that a cured product of the epoxy resin composition of the present invention containing the unsaturated fatty acid amide has good adhesiveness to an inorganic substance such as alumina, good retort resistance, and good transparency.

Each component contained in the epoxy resin composition of the present invention will be described.

Epoxy Resin

The epoxy resin used in the epoxy resin composition of the present invention may be a saturated or unsaturated aliphatic compound or alicyclic compound, an aromatic compound, or a heterocyclic compound, but in consideration of the manifestation of high gas barrier properties, an epoxy resin containing an aromatic ring or an alicyclic structure in the molecule is preferable.

Specific examples of the epoxy resin include at least one resin selected from epoxy resins having a glycidylamino group derived from meta-xylylenediamine, epoxy resins having a glycidylamino group derived from para-xylylenediamine, epoxy resins having a glycidylamino group derived from 1,3-bis(aminomethyl) cyclohexane, epoxy resins having a glycidylamino group derived from 1,4-bis(aminomethyl) cyclohexane, epoxy resins having a glycidylamino group derived from diaminodiphenylmethane, epoxy resins having a glycidylamino group and/or a glycidyloxy group derived from a para-aminophenol, epoxy resins having a glycidyloxy group derived from bisphenol A, epoxy resins having a glycidyloxy group derived from bisphenol F, epoxy resins having a glycidyloxy group derived from a phenol novolac, and epoxy resins having a glycidyloxy group derived from resorcinol. In order to improve various performance aspects such as flexibility, impact resistance, and moist heat resistance, two or more types of the epoxy resins described above may be mixed at appropriate ratios and used.

Of the epoxy resins, from the viewpoint of gas barrier properties, the viewpoint of odor-proofing property and aroma-retaining property of a packaging material according to the second invention, and the viewpoint of $CO_2$ gas barrier properties of a heat-shrinkable label according to the third invention, the epoxy resin is preferably one having, as a main component, at least one selected from the group consisting of an epoxy resin having a glycidylamino group derived from meta-xylylenediamine, an epoxy resin having a glycidylamino group derived from para-xylylenediamine, and an epoxy resin having a glycidyloxy group derived from bisphenol F, and is more preferably one having, as a main component, an epoxy resin having a glycidylamino group derived from meta-xylylenediamine.

Note that "main component" here means that other components may be included within a range that does not depart from the spirit of the present invention, and also means a component that is included in an amount of preferably from 50 to 100 mass %, more preferably from 70 to 100 mass %, and even more preferably from 90 to 100 mass % relative to the total amount.

Epoxy Resin Curing Agent Containing Amine-Based Curing Agent

The epoxy resin curing agent used in the epoxy resin composition of the present invention contains an amine-based curing agent from the viewpoint of exhibiting high gas barrier properties, the viewpoint of exhibiting high odor-proofing property and aroma-retaining property of the packaging material according to the second invention, and a viewpoint of exhibiting high $CO_2$ barrier properties of the heat-shrinkable label according to the third invention.

As the amine-based curing agent, a polyamine or a modified product thereof conventionally used as an epoxy resin curing agent can be used. From the viewpoint of achieving high gas barrier properties, the viewpoint of odor-proofing property and aroma-retaining property of the packaging material according to the second invention, and the viewpoint of $CO_2$ barrier properties of the heat-shrinkable label according to the third invention, the amine-based curing agent is preferably a modified product of polyamine, more preferably at least one selected from the group consisting of an amine-based curing agent (i) and an amine-based curing agent (ii) described below, even more preferably an amine-based curing agent (i):

(i) A reaction product between component (A) and component (B) below:

(A) at least one selected from the group consisting of meta-xylylenediamine and para-xylylenediamine;

(B) at least one selected from the group consisting of unsaturated carboxylic acids represented by Formula (1) below and derivatives thereof,

[Chem. 1]

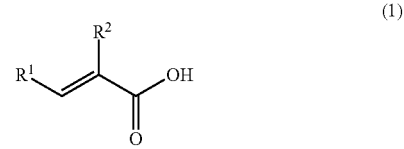

(1)

where, in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

(ii) A reaction product between epichlorohydrin and at least one selected from the group consisting of meta-xylylenediamine and para-xylylenediamine.

Amine-Based Curing Agent (i)

The amine-based curing agent (i) is a reaction product between the component (A) and the component (B) below:

(A) at least one selected from the group consisting of meta-xylylenediamine and para-xylylenediamine;

(B) at least one selected from the group consisting of unsaturated carboxylic acids represented by Formula (1) below and derivatives thereof,

[Chem. 2]

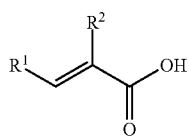

(1)

where, in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

The component (A) is used from the viewpoint of gas barrier properties, the viewpoint of odor-proofing property and aroma-retaining property of the packaging material according to the second invention, and the viewpoint of $CO_2$ barrier properties of the heat-shrinkable label according to the third invention, and meta-xylylenediamine is preferable in terms of gas barrier properties. One type of component (A) may be used alone, or two types of the components (A) may be mixed and used.

The component (B) is at least one selected from the group consisting of an unsaturated carboxylic acid represented by Formula (1) and derivatives thereof, and, from the viewpoint of gas barrier properties, the viewpoint of odor-proofing property and aroma-retaining property of the packaging material according to the second invention, and the viewpoint of $CO_2$ barrier properties of the heat-shrinkable label according to the third invention, $R^1$ in Formula (1) is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Moreover, from the viewpoint of gas barrier properties, the viewpoint of odor-proofing property and aroma-retaining property of the packaging material according to the second invention, and the viewpoint of $CO_2$ barrier properties of the heat-shrinkable label according to the third invention, $R^2$ in Formula (1) is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Examples of the derivatives of the unsaturated carboxylic acids represented by Formula (1) include esters, amides, acid anhydrides, and acid chlorides of the unsaturated carboxylic acids. The ester of the unsaturated carboxylic acid is preferably an alkyl ester, and in terms of obtaining good reactivity, the alkyl has preferably from 1 to 6 carbons, more preferably from 1 to 3 carbons, and even more preferably from 1 to 2 carbons.

Examples of the unsaturated carboxylic acids represented by Formula (1) above and the derivatives of the unsaturated carboxylic acids include unsaturated carboxylic acids, such as acrylic acid, methacrylic acid, α-ethylacrylic acid, α-propylacrylic acid, α-isopropylacrylic acid, α-n-butylacrylic acid, α-t-butylacrylic acid, α-pentylacrylic acid, α-phenylacrylic acid, α-benzylacrylic acid, crotonic acid, 2-pentenoic acid, 2-hexenoic acid, 4-methyl-2-pentenoic acid, 2-heptenoic acid, 4-methyl-2-hexenoic acid, 5-methyl-2-hexenoic acid, 4,4-dimethyl-2-pentenoic acid, 4-phenyl-2-butenoic acid, cinnamic acid, o-methyl cinnamic acid, m-methyl cinnamic acid, p-methyl cinnamic acid, and 2-octenoic acid; and esters, amides, acid anhydrides, and acid chlorides of these unsaturated carboxylic acids.

Among the above, from the viewpoint of obtaining good gas barrier properties, the viewpoint of odor-proofing property and aroma-retaining property of the packaging material according to the second invention, and the viewpoint of $CO_2$ barrier properties of the heat-shrinkable label according to the third invention, the component (B) is preferably at least one selected from the group consisting of acrylic acid, methacrylic acid, crotonic acid, and derivatives of these acids, more preferably at least one selected from the group consisting of acrylic acid, methacrylic acid, crotonic acid, and alkyl esters of these acids, even more preferably at least one selected from the group consisting of acrylic acid, methacrylic acid, and alkyl esters of these acids, yet more preferably alkyl esters of acrylic acid, and still even more preferably methyl acrylate.

One type of component (B) may be used alone, or two or more types in combination may be used.

When an unsaturated carboxylic acid, an ester, or an amide is used as the component (B), the reaction between the component (A) and the component (B) is carried out by mixing the component (A) and the component (B) under a temperature condition from 0 to 100° C. and more preferably from 0 to 70° C., and then carrying out, at a temperature condition from 100 to 300° C. and preferably from 130 to 250° C., a Michael addition reaction and an amide group formation reaction by dehydration, de-alcoholization, and deamination.

In this case, in the amide group formation reaction, to complete the reaction, the pressure inside a reaction device can be reduced at the final stage of the reaction as necessary. In addition, a non-reactive solvent can be used to dilute as necessary. Furthermore, a catalyst, such as a phosphite ester, can be added as a dehydrating agent or a dealcoholizing agent.

On the other hand, when an acid anhydride or an acid chloride of an unsaturated carboxylic acid is used as the component (B), the reaction is performed by mixing the component (A) and the component (B) under conditions of 0 to 150° C. and preferably 0 to 100° C., and then performing Michael addition reaction and the amide group formation reaction. In this case, in the amide group formation reaction, to complete the reaction, the pressure inside a reaction device can be reduced at the final stage of the reaction as necessary. In addition, a non-reactive solvent can be used to dilute as necessary. Furthermore, a tertiary amine, such as pyridine, picoline, lutidine, or trialkylamine, can be added.

The amide group moiety formed by the reaction between the component (A) and the component (B) has high cohesive force, and thus the cured resin layer (cured product layer) formed using the epoxy resin composition containing the epoxy resin curing agent that is the reaction product between the component (A) and the component (B) exhibits high gas barrier properties, odor-proofing property and aroma-retaining property, high $CO_2$ barrier properties, and good adhesiveness.

The reaction molar ratio of the component (B) to the component (A), [(B)/(A)], is preferably in a range of 0.3 to 1.0. When the reaction molar ratio is 0.3 or more, a sufficient amount of amide groups is produced in the epoxy resin curing agent, and excellent gas barrier properties, odor-proofing property and aroma-retaining property of the packaging material according to the second invention, $CO_2$ barrier properties of the heat-shrinkable label according to the third invention, and adhesiveness are achieved. On the other hand, when the reaction molar ratio is in a range of 1.0 or less, the amount of amino groups necessary for reaction with the epoxy groups in the epoxy resin is sufficient, and excellent heat resistance and excellent solubility in organic solvents and water are exhibited.

Especially when high gas barrier properties, odor-proofing property and aroma-retaining property, $CO_2$ barrier properties, and excellent coating film performance of the resulting epoxy resin cured product are taken into consideration, the reaction molar ratio [(B)/(A)] of the component (B) to the component (A) is more preferably in a range from 0.6 to 1.0.

The amine-based curing agent may also be a reaction product of the components (A) and (B), and at least one compound selected from the group consisting of the following components (C), (D) and (E).

(C) At least one component selected from the group consisting of monovalent carboxylic acids represented by $R^3$—COOH and derivatives thereof (where $R^3$ represents a hydrogen atom, an alkyl group having from 1 to 7 carbons and which may have a hydroxyl group, or an aryl group having from 6 to 12 carbons)

(D) A cyclic carbonate (E) A mono-epoxy compound having from 2 to 20 carbons

The component (C), which is a monovalent carboxylic acid represented by $R^3$—COOH or a derivative thereof, is used as necessary from the viewpoints of reducing the reactivity between the epoxy resin curing agent and the epoxy resin and improving workability.

$R^3$ represents a hydrogen atom, an alkyl group having from 1 to 7 carbons and which may have a hydroxyl group, or an aryl group having from 6 to 12 carbons, and $R^3$ is preferably an alkyl group having from 1 to 3 carbons or a phenyl group.

Examples of derivatives of the monovalent carboxylic acid represented by $R^3$—COOH include esters, amides, acid anhydrides, and acid chlorides of the carboxylic acid. The ester of the carboxylic acid is preferably an alkyl ester, and the number of carbons of the alkyl is preferably from 1 to 6, more preferably from 1 to 3, and even more preferably 1 or 2.

Examples of the component (C) include monovalent carboxylic acids such as formic acid, acetic acid, propionic acid, butyric acid, lactic acid, glycolic acid, and benzoic acid, and derivatives thereof.

For the component (C), one type may be used alone, or two or more types may be used in combination.

The cyclic carbonate of the component (D) is used as necessary, from the viewpoints of reducing the reactivity between the epoxy resin curing agent and the epoxy resin and improving workability, and is preferably a cyclic carbonate of a six-membered ring or less from the viewpoint of reactivity with the component (A). Examples include ethylene carbonate, propylene carbonate, glycerin carbonate, 1,2-butylene carbonate, vinylene carbonate, 4-vinyl-1,3-dioxolan-2-one, 4-methoxymethyl-1,3-dioxolan-2-one, and 1,3-dioxan-2-one. Among these, from the viewpoint of gas barrier properties, at least one selected from the group consisting of ethylene carbonate, propylene carbonate, and glycerin carbonate is preferable.

For the component (D), one type may be used alone, or two or more types may be used in combination.

The mono-epoxy compound, which is the component (E), is a mono-epoxy compound having from 2 to 20 carbons, and is used as necessary, from the viewpoints of reducing the reactivity between the epoxy resin curing agent and the epoxy resin and improving workability. From the viewpoint of gas barrier properties, the component (E) is preferably a mono-epoxy compound having from 2 to 10 carbons and is more preferably a compound represented by the following Formula (2):

[Chem. 3]

(2)

where in Formula (2), $R^4$ represents a hydrogen atom, an alkyl group having from 1 to 8 carbons, an aryl group, or $R^5$—O—$CH_2$—, and $R^5$ represents a phenyl group or a benzyl group.

Examples of the mono-epoxy compound represented by Formula (2) include ethylene oxide, propylene oxide, 1,2-butylene oxide, styrene oxide, phenylglycidyl ether, and benzylglycidyl ether. For the component (E), one type may be used alone, or two or more types may be used in combination.

For a case in which the component (C), (D), or (E) is used in the amine-based curing agent, any one type of a compound selected from the group consisting of the components (C), (D), and (E) may be used alone, or a combination of two or more types may be used.

Note that the amine-based curing agent may be a reaction product that is obtained by reacting, in addition to the components (A) to (E), another component within a scope that does not hinder the effect of the present invention. Examples of the other component referred to here include aromatic dicarboxylic acids or derivatives thereof.

However, the usage amount of the "other component" is preferably 30 mass % or less, more preferably 10 mass % or less, and even more preferably 5 mass % or less of the total amount of the reaction components constituting the amine-based curing agent.

The reaction product of the components (A) and (B) and the at least one compound selected from the group consisting of the components (C), (D), and (E) is obtained by using at least one compound selected from the group consisting of the components (C), (D), and (E) in combination with the component (B) and reacting this combination with the component (A), which is a polyamine compound. The reaction may be performed by adding the components (B) to (E) in any order and reacting with the component (A), or by mixing the components (B) to (E) and then reacting the mixture with the component (A).

The reaction between the component (A) and the component (C) can be carried out under the same conditions as those of the reaction between the component (A) and the component (B).

In a case where the component (C) is used, the components (B) and (C) may be mixed and then reacted with the component (A), or the components (A) and (B) may be first reacted and then further reacted with the component (C).

On the other hand, in a case in which the component (D) and/or the component (E) is used, preferably, the components (A) and (B) are first reacted, and then further reacted with the component (D) and/or the component (E).

The reaction between the component (A) and the component (D) and/or the component (E) is carried out by mixing the component (A) and the component (D) and/or the component (E) at a temperature from 25 to 200° C., and then implementing an addition reaction at a temperature from 30 to 180° C. and preferably from 40 to 170° C. Furthermore, as necessary, a catalyst such as sodium methoxide, sodium ethoxide, and potassium t-butoxide can be used.

When the reaction is to be carried out, as necessary, the component (D) and/or the component (E) may be melted or diluted with a non-reactive solvent and used in order to facilitate the reaction.

Even for a case in which the amine-based curing agent is a reaction product of the components (A) and (B), and at least one compound selected from the group consisting of the components (C), (D), and (E), the reaction molar ratio [(B)/(A)] of the component (B) to the component (A) is, for the same reason as described above, preferably in a range from 0.3 to 1.0, and more preferably in a range from 0.6 to 1.0. Meanwhile, the reaction molar ratio [{(C)+(D)+(E)}/(A)] of the components (C), (D), and (E) to the component (A) is preferably in a range from 0.05 to 3.1, more preferably in a range from 0.07 to 2.5, and even more preferably in a range from 0.1 to 2.0.

However, from the viewpoints of gas barrier properties, odor-proofing property and aroma-retaining property of the packaging material according to the second invention, $CO_2$ barrier properties of the heat-shrinkable label according to the third invention, and coating performance, the reaction molar ratio [{(B)+(C)+(D)+(E)}/(A)] of the components (B) to (E) to the component (A) is preferably in a range from 0.35 to 2.5, more preferably in a range from 0.35 to 2.0.

Amine-Based Curing Agent (ii)

The amine-based curing agent (ii) is a reaction product between epichlorohydrin and at least one selected from the group consisting of meta-xylylenediamine and para-xylylenediamine.

The amine-based curing agent (ii) preferably contains a compound represented by Formula (3) below as a main component. Here, "main component" refers to a component having a content of 50 mass % or more when the total constituent components in the amine-based curing agent (ii) is 100 mass %.

[Chem. 4]

(3)

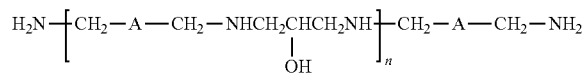

where in Formula (3), A represent a 1,3-phenylene group or a 1,4-phenylene group, and n is a number of 1 to 12.

A is more preferably a 1,3-phenylene group.

The content of the compound represented by Formula (3) above in the amine-based curing agent (ii) is preferably 60 mass % or more, more preferably 70 mass % or more, even more preferably 75 mass % or more, and yet even more preferably 85 mass % or more. Furthermore, the upper limit is 100 mass %.

From the viewpoint of obtaining excellent curing performance as a curing agent, it is preferable that the proportion of a compound for which n=1 from among the compounds represented by Formula (3) above is high. The content of the compound represented by Formula (3) above in which n=1 in the amine-based curing agent (ii) is preferably 15 mass % or more, more preferably 20 mass % or more, and even more preferably 25 mass % or more. Furthermore, the upper limit is 100 mass %.

The content of the compound represented by Formula (3) above in the amine-based curing agent (ii) and the composition of the compound represented by Formula (3) above can be determined by GC analysis and gel permeation chromatography (GPC) analysis.

The amine-based curing agent (ii) can be formed by subjecting epichlorohydrin and at least one selected from the group consisting of meta-xylylenediamine and para-xylylenediamine to an addition reaction by a common method.

The epoxy resin curing agent used in the present invention may contain a curing agent component in addition to an amine-based curing agent, but the content of the amine-based curing agent is preferably high, from the viewpoint of achieving high gas barrier properties, the viewpoint of achieving high odor-proofing property and aroma-retaining property of the packaging material according to the second invention, and the viewpoint of achieving high $CO_2$ barrier properties of the heat-shrinkable label according to the third invention. From the viewpoint of obtaining high gas barrier properties, the content of the amine-based curing agent in the epoxy resin curing agent is preferably at least 50 mass %, more preferably at least 70 mass %, even more preferably at least 80 mass %, and yet even more preferably at least 90 mass %. Furthermore, the upper limit is 100 mass %.

The epoxy resin curing agent used in the present invention may further contain a coupling agent from the viewpoint of improvement of adhesiveness of the resulting cured product to an inorganic substance. Examples of the coupling agent include silane coupling agents, titanate-based coupling agents, and aluminate-based coupling agents, and a silane coupling agent is preferable from the viewpoint of adhesiveness improvement of the resulting cured product to an inorganic substance.

Examples of the silane coupling agent include a silane coupling agent having a vinyl group, a silane coupling agent having an amino group, a silane coupling agent having an epoxy group, a silane coupling agent having a (meth)acryl group, and a silane coupling agent having a mercapto group. Among these, the silane coupling agent is preferably at least one selected from the group consisting of a silane coupling agent having an amino group and a silane coupling agent having an epoxy group, from the viewpoint of adhesiveness of the resulting cured product to an inorganic substance.

When a coupling agent is used, the content of the coupling agent in the epoxy resin curing agent is preferably from 0.1 to 10 parts by mass, more preferably from 1 to 8 parts by mass, per 100 parts by mass of the curing agent component in the epoxy resin curing agent.

The compounding ratio of the epoxy resin and the epoxy resin curing agent in the epoxy resin composition may be within the standard compounding range that is ordinarily used for a case in which an epoxy resin reaction product is produced through a reaction between an epoxy resin and an epoxy resin curing agent. Specifically, the ratio of (number of active amine hydrogens in the epoxy resin curing agent)/

(number of epoxy groups in the epoxy resin), which is the ratio of the number of active amine hydrogens in the epoxy resin curing agent to the number of epoxy groups in the epoxy resin is preferably in a range from 0.2 to 12.0. From the viewpoint of forming a cured product having good adhesiveness to an inorganic substance such as alumina and good retort resistance, the value of (number of active amine hydrogens in epoxy resin curing agent)/(number of epoxy groups in epoxy resin) is more preferably in a range from 0.4 to 10.0, even more preferably from 0.6 to 8.0, yet even more preferably more than 1.0 and 5.0 or less, and still more preferably from 1.1 to 3.5.

Unsaturated Fatty Acid Amide Having from 14 to 24 Carbons

The epoxy resin composition of the present invention contains an unsaturated fatty acid amide having from 14 to 24 carbons (hereafter, also simply referred to as an "unsaturated fatty acid amide"). This makes it possible to form a cured product having good adhesiveness to an inorganic substance such as alumina in particular, good retort resistance, and good transparency. In the packaging material according to the second invention, such an unsaturated fatty acid amide facilitates formation of a cured product layer having good odor-proofing property and aroma-retaining property, little blocking, good adhesiveness to a substrate, and good transparency. In the heat-shrinkable label according to the third invention, such an unsaturated fatty acid amide facilitates formation of a cured product layer having little blocking, good $CO_2$ barrier properties, good conformability to a substrate layer, and good transparency.

The number of carbons in the unsaturated fatty acid amide is from 14 to 24; from the viewpoint of formation of a cured product having little blocking, good adhesiveness to an inorganic substance such as alumina, good retort resistance, good $CO_2$ barrier properties, good conformability to a substrate layer, and goods transparency, the number of carbons is preferably from 16 to 24, more preferably from 18 to 22.

The unsaturated fatty acid constituting the unsaturated fatty acid amide may be a fatty acid having from 14 to 24 carbons with at least one unsaturated bond. The number of unsaturated bonds in the unsaturated fatty acid is preferably from 1 to 6, more preferably from 1 to 4, and even more preferably from 1 to 2.

Examples of the unsaturated fatty acid constituting the unsaturated fatty acid amide include: monounsaturated fatty acids, such as myristoleic acid, sapienic acid, palmitoleic acid, oleic acid, elaidic acid, vaccenic acid, gadoleic acid, eicosenoic acid, erucic acid, and nervonic acid; diunsaturated fatty acids such as linoleic acid, eicosadienoic acid, and docosadienoic acid; triunsaturated fatty acids such as linolenic acid, pinolenic acid, eleostearic acid, mead acid, and eicosatrienoic acid; and tetra fatty acids such as stearidonic acid, arachidonic acid, eicosatetraenoic acid, and adrenic acid. One type of these unsaturated fatty acids can be used, or two or more types of them can be used in combination. Among these unsaturated fatty acids, from the viewpoint of formation of a cured product having good adhesiveness to an inorganic substance such as alumina, good retort resistance, and good transparency, the unsaturated fatty acid is preferably at least one selected from the group consisting of a monounsaturated fatty acid and a diunsaturated fatty acid having from 14 to 24 carbons, more preferably a monounsaturated fatty acid having from 14 to 24 carbons, even more preferably a monounsaturated fatty acid having from 16 to 24 carbons, and yet even more preferably a monounsaturated fatty acid having from 18 to 22 carbons.

From the viewpoint of formation of a cured product having little blocking, good adhesiveness to an inorganic substance such as alumina, good retort resistance, good $CO_2$ barrier properties, good conformability to a substrate layer, and goods transparency, the unsaturated fatty acid amide used in the present invention is preferably at least one selected from the group consisting of palmitoleic acid amide, oleic acid amide, eicosenoic acid amide, and erucic acid amide, more preferably at least one selected from the group consisting of oleic acid amide and erucic acid amide; from the viewpoint of the blocking suppression effect when the epoxy resin composition is used to form a cured resin layer of a gas barrier laminate described later, a cured product layer in the packaging material according to the second invention, and a cured product layer in the heat-shrinkable label according to the third invention, the unsaturated fatty acid amide used in the present invention is even more preferably erucic acid amide.

Erucic acid amide has solubility in an epoxy resin composition containing an amine-based curing agent; meanwhile, when compared to oleic acid amide or the like, the solubility of erucic acid amide is not too high in the epoxy resin composition, and thus it bleeds out to the surface layer of the epoxy resin composition or a cured product of the epoxy resin composition and acts as a lubricant. Therefore, it is inferred that an epoxy resin composition containing erucic acid amide has improved drying speed, and the blocking suppression effect described above can be obtained.

The content of the unsaturated fatty acid amide in the epoxy resin composition is preferably from 0.1 to 20 parts by mass, more preferably from 0.2 to 15 parts by mass, even more preferably from 0.5 to 15 parts by mass, yet even more preferably from 1 to 15 parts by mass, still even more preferably from 3 to 15 parts by mass, further more preferably from 5 to 12 parts by mass, per 100 parts by mass of the total amount of the epoxy resin and the nonvolatile content in the epoxy resin curing agent. The content of the unsaturated fatty acid amide is preferably 0.1 parts by mass or more per 100 parts by mass of the total amount of the epoxy resin and the nonvolatile content in the epoxy resin curing agent in the epoxy resin composition, from the viewpoint of formation of a cured product having good adhesiveness to an inorganic substance such as alumina and good retort resistance as well as the viewpoint of $CO_2$ barrier properties, conformability to a substrate layer, and blocking suppression effect. Further, when the content of the unsaturated fatty acid amide is 20 parts by mass or less, high gas barrier properties, odor-proofing property and aroma-retaining property, and transparency can be maintained, and elution of the unsaturated fatty acid amide can also be suppressed.

Polyalkylene Glycol

The epoxy resin composition may further contain a polyalkylene glycol. When a polyalkylene glycol is used, even with an epoxy resin composition containing an unsaturated fatty acid amide having from 14 to 24 carbons, a cured product layer having high gas barrier properties, odor-proofing property and aroma-retaining property, high $CO_2$ barrier properties, as well as sufficient adhesiveness for practical use, high gloss, and leveling property can be formed.

Examples of the polyalkylene glycol include a homopolymer or copolymer of an alkylene glycol having from 2 to 8 carbons. The alkylene glycol may be either a linear alkylene glycol or a branched alkylene glycol.

Specific examples of the homopolymer of an alkylene glycol having from 2 to 8 carbons include polyethylene glycol (PEG), polypropylene glycol (PPG), poly(oxytrimethylene) glycol [polytrimethylene ether glycol], poly(oxybutylene) glycol, poly(oxytetramethylene) glycol [polytetramethylene ether glycol: PTMG], poly(oxypentamethylene) glycol, poly(oxyhexamethylene) glycol, and poly(oxyoctamethylene) glycol.

Specific examples of the copolymer of an alkylene glycol having from 2 to 8 carbons include polyoxyethylene-polyoxypropylene glycol (PEG-PPG), polyoxyethylene-polyoxytrimethylene glycol, polyoxyethylene-polyoxybutylene glycol, polyoxyethylene-polyoxytetramethylene glycol (PEG-PTMG), polyoxyethylene-polyoxyhexamethylene glycol, polyoxypropylene-polyoxytrimethylene glycol, polyoxypropylene-polyoxybutylene glycol, polyoxypropylene-polyoxytetramethylene glycol (PPG-PTMG), polyoxytrimethylene-polyoxytetramethylene glycol, polyoxytetramethylene-polyoxyhexamethylene glycol, polyoxyethylene-polyoxypropylene-polyoxybutylene glycol, and polyoxyethylene-polyoxypropylene-polyoxytetramethylene glycol.

One type of the polyalkylene glycols can be used, or two or more types of the polyalkylene glycols can be used. From the viewpoint of improvement of gas barrier properties as well as odor-proofing property and aroma-retaining property, the viewpoint of $CO_2$ barrier properties, and the viewpoint of appearance improvement of the cured product layer, the polyalkylene glycol is preferably a homopolymer or a copolymer of an alkylene glycol having 2 to 6 carbons, more preferably a homopolymer or a copolymer of an alkylene glycol having from 2 to 4 carbons, even more preferably at least one selected from the group consisting of polyethylene glycol, polypropylene glycol, poly(oxytrimethylene) glycol, poly(oxybutylene) glycol, poly(oxytetramethylene) glycol, polyoxyethylene-polyoxypropylene glycol, polyoxyethylene-polyoxytrimethylene glycol, polyoxyethylene-polyoxytetramethylene glycol, polyoxypropylene-polyoxytetramethylene glycol, and polyoxytrimethylene-polyoxytetramethylene glycol, and yet even more preferably at least one selected from the group consisting of polyethylene glycol, polypropylene glycol, and poly(oxytetramethylene) glycol; from the viewpoint of improvement of gas barrier properties as well as odor-proofing property and aroma-retaining property, the viewpoint of $CO_2$ barrier properties, the viewpoint of appearance improvement of the cured product layer, and the viewpoint of improvement of adhesiveness to a substrate, the polyalkylene glycol is still even more preferably.

From the viewpoint of improvement of gas barrier properties as well as odor-proofing property and aroma-retaining property, the viewpoint of $CO_2$ barrier properties, and the viewpoint of appearance improvement of the cured product layer, the weight average molecular weight (Mw) of the polyalkylene glycol is preferably from 200 to 10000, more preferably from 200 to 5000, and even more preferably from 200 to 3000; from the viewpoint of improvement of gas barrier properties as well as odor-proofing property and aroma-retaining property, the viewpoint of $CO_2$ barrier properties, the viewpoint of appearance improvement of the cured product layer, the viewpoint of blocking suppression, and the viewpoint of improvement of adhesiveness to a substrate, the weight average molecular weight (Mw) of the polyalkylene glycol is yet even more preferably from 400 to 2000, still even more preferably from 500 to 1500.

When a polyalkylene glycol is used, the content of polyalkylene glycol in the epoxy resin composition is preferably from 0.1 to 5.0 parts by mass, more preferably from 0.2 to 5.0 parts by mass, even more preferably from 0.3 to 3.0 parts by mass, and yet even more preferably from 0.5 to 2.0 parts by mass, per 100 parts by mass of the total amount of the epoxy resin and the nonvolatile content in the epoxy resin curing agent, from the viewpoint of improvement of gas barrier properties as well as odor-proofing property and aroma-retaining property, the viewpoint of $CO_2$ barrier properties, and the viewpoint of appearance improvement of the cured product layer.

Non-Spherical Inorganic Particles

The epoxy resin composition of the present invention can further contain non-spherical inorganic particles. The configuration in which the epoxy resin composition of the present invention includes non-spherical inorganic particles can provide blocking suppression effect when the epoxy resin composition is used to form a cured resin layer of the gas barrier laminate described later; in addition, can improve gas barrier properties and bending resistance, odor-proofing property and aroma-retaining property of the packaging material according to the second invention, and $CO_2$ barrier properties of the heat-shrinkable label according to the third invention.

The shape of the non-spherical inorganic particle is any three-dimensional shape other than spherical shape (substantially true spherical shape), and examples include plate shape, scale shape, column shape, chain shape, and fibrous shape. A plurality of plate-shaped or scale-shaped inorganic particles may be laminated in a layer. Among them, from the viewpoint of improvement of gas barrier properties and bending resistance, the viewpoint of improvement of the odor-proofing property and aroma-retaining property and transparency of the packaging material according to the second invention, and the viewpoint of improvement of $CO_2$ barrier properties of the heat-shrinkable label according to the third invention, the inorganic particle is preferably a plate-shaped, scale-shaped, column-shaped, or chain-shaped inorganic particle, more preferably a plate-shaped, scale-shaped, or column-shaped inorganic particle, and even more preferably a plate-shaped or scale-shaped inorganic particle.

Examples of the inorganic substance constituting the non-spherical inorganic particle include silica, alumina, isinglass (mica), talc, aluminum, bentonite, and smectite. Among them, from the viewpoint of improvement of gas barrier properties and bending resistance, the inorganic substance is preferably at least one selected from the group consisting of silica, alumina, and mica, more preferably at least one selected from the group consisting of silica and alumina, and even more preferably silica.

The non-spherical inorganic particles may be surface treated as necessary for the purpose of increase in dispersibility in the epoxy resin composition and improvement of the transparency of the cured product, Among them, the non-spherical inorganic particle is preferably coated with an organic-based material; from the viewpoint of improvement of gas barrier properties, bending resistance, and transparency when the epoxy resin composition is used to form a cured resin layer of a gas barrier laminate, the viewpoint of improvement of the odor-proofing property and aroma-retaining property of the packaging material according to the second invention, and the viewpoint of improvement of the $CO_2$ barrier properties of the heat-shrinkable label according to the third invention, the non-spherical inorganic particle is more preferably at least one selected from the group consisting of silica and alumina coated with an organic-based material. From the viewpoint of improvement of gas barrier properties, odor-proofing property and aroma-retaining property, $CO_2$ barrier properties, and bending resistance, the non-spherical inorganic particle is even more preferably silica coated with an organic-based material; meanwhile, from the viewpoint of transparency, the non-spherical inorganic particle is yet even more preferably alumina coated with an organic-based material.

The average particle size of the non-spherical inorganic particle is preferably from 1 to 2000 nm, more preferably from 1 to 1500 nm, even more preferably from 1 to 1000 nm, still more preferably from 1 to 800 nm, still even more preferably from 1 to 500 nm, still even more preferably from 5 to 300 nm, still even more preferably from 5 to 200 nm, still even more preferably from 5 to 100 nm, and still even more preferably from 8 to 70 nm. Non-spherical inorganic particles with an average particle size of 1 nm or more are easy to prepare; meanwhile, non-spherical inorganic particles with an average particle size of 2000 nm or less provide good gas barrier properties, good bending resistance, and good transparency when the epoxy resin composition is used to form a cured resin layer of a gas barrier laminate. In addition, such non-spherical inorganic particles can also improve the odor-proofing property and aroma-retaining property, bending resistance, and transparency of a packaging material when the epoxy resin composition is used to form a cured product layer in the packaging material according to the second invention as well as the $CO_2$ barrier properties when the epoxy resin composition is used to form a cured product layer in the heat-shrinkable label according to the third invention. Here, the average particle size is the average particle size of the primary particle.

When the non-spherical inorganic particle is plate-shaped, scale-shaped, column-shaped, or fibrous-shaped, the aspect ratio of the non-spherical inorganic particle is preferably from 2 to 700 and more preferably from 3 to 500. With the aspect ratio of 2 or more, good gas barrier properties are easily exhibited. The average particle size and the aspect ratio of the non-spherical inorganic particle are determined, for example, by observing using a scanning electron microscope (SEM) or a transmission electron microscope (TEM) and averaging measured values at three or more points. Note that the average particle size and aspect ratio of the non-spherical inorganic particle present in a cured resin layer or a cured product layer can be determined, for example, by embedding, with an epoxy resin, the gas barrier laminate described later or a packaging material, then ion milling the cross-section of the laminate or the packaging material using an ion milling device to produce a sample for cross-sectional observation, and observing and measuring a cross-section of the portion of the cured resin layer or the cured product layer of the resulting sample in the same manner as described above.

When the average particle size of the non-spherical inorganic particles is less than 100 nm and the measurement of the average particle size by the above method is difficult, the average particle size can also be measured, for example, by the BET method.

The method for producing the non-spherical inorganic particle is not particularly limited, and a well-known method can be used.

In terms of ease of preparation of the non-spherical inorganic particles, ease of blending the non-spherical inorganic particles into the epoxy resin composition, and dispersibility of the non-spherical inorganic particles therein, in the present invention, it is preferable to prepare a dispersion liquid of the non-spherical inorganic particles and blend the dispersion liquid into the epoxy resin composition. The dispersion medium of the non-spherical inorganic particle dispersion liquid is not particularly limited, and water or an organic solvent can be used. In terms of dispersibility of the non-spherical inorganic particle, the organic solvent is preferably a polar solvent. Examples include protic polar solvents, such as methanol, ethanol, 1-propanol, 2-propanol, 1-butanol, 2-butanol, 2-methoxyethanol, 2-ethoxyethanol, 2-propoxyethanol, 2-butoxyethanol, 1-methoxy-2-propanol, 1-ethoxy-2-propanol, and 1-propoxy-2-propanol; aprotic polar solvents, such as N,N-dimethylformamide, N,N-dimethylacetamide, dimethyl sulfoxide, and N-methylpyrrolidone.

In terms of dispersibility of the non-spherical inorganic particles, the dispersion medium is preferably at least one selected from the group consisting of water and a protic polar solvent, and in terms of dispersibility of the particles and miscibility of the dispersion liquid and the epoxy resin composition, the dispersion medium is more preferably a protic polar solvent and even more preferably at least one selected from the group consisting of methanol, ethanol, 1-propanol, and 2-propanol.

When non-spherical inorganic particles are used, the content of the non-spherical inorganic particles in the epoxy resin composition relative to 100 parts by mass of the total amount of the epoxy resin and the epoxy resin curing agent is preferably from 0.5 to 10.0 parts by mass, more preferably from 1.0 to 8.0 parts by mass, even more preferably from 1.5 to 7.5 parts by mass, and still more preferably from 3.0 to 7.0 parts by mass. When the content of the non-spherical inorganic particles in the epoxy resin composition is 0.5 parts by mass or more per 100 parts by mass of the total amount of the epoxy resin and the epoxy resin curing agent, the effects of improvement of the gas barrier properties and bending resistance when the epoxy resin composition is used to form a cured resin layer of a gas barrier laminate are improved. Further, the odor-proofing property and aroma-retaining property, bending resistance, and transparency of a packaging material when the epoxy resin composition is used to form a cured product layer in the packaging material according to the second invention as well as the $CO_2$ barrier properties when the epoxy resin composition is used to form a cured product layer in the heat-shrinkable label according to the third invention are also improved. Furthermore, a content thereof of 10.0 parts by mass or less results in good transparency.

The epoxy resin composition may contain an additive, such as a thermosetting resin, a wetting agent, a tackifier, an antifoaming agent, a curing accelerator, an antirust additive, a pigment, and an oxygen scavenger as necessary within a range that does not impair the effects of the present invention.

The total content of these additives in the epoxy resin composition relative to 100 parts by mass of the total amount of the epoxy resin and the epoxy resin curing agent is preferably 20.0 parts by mass or less and more preferably from 0.001 to 15.0 parts by mass.

However, from the viewpoint of the effects of the present invention, the total content of epoxy resin, epoxy resin curing agent, and unsaturated fatty acid amide having from 14 to 24 carbons in the solid content of the epoxy resin composition is preferably 60 mass % or more, more preferably 70 mass % or greater, even more preferably 80 mass % or more, and yet even more preferably 85 mass % or more, and the upper limit is 100 mass %. The "solid content of the epoxy resin composition" means components excluding the water and organic solvent in the epoxy resin composition.

The epoxy resin composition may contain an organic solvent, and the organic solvent used in the epoxy resin composition is preferably a non-reactive solvent. Specific examples of the organic solvent include polar solvents listed as a dispersion medium used for the dispersion liquid of the non-spherical inorganic particles; the organic solvent is preferably a protic polar solvent, such as methanol, ethanol, 1-propanol, 2-propanol, 1-butanol, 2-butanol, 2-methoxyethanol, 2-ethoxyethanol, 2-propoxyethanol, 2-butoxyethanol, 1-methoxy-2-propanol, 1-ethoxy-2-propanol, and 1-propoxy-2-propanol, as well as ethyl acetate, butyl acetate, methyl isobutyl ketone, and toluene; one type of these may be used, or two or more types may be used.

Among these, from the viewpoint of improvement of the drying speed and the viewpoint of appearance improvement of the resulting cured resin layer or cured product layer, the organic solvent is preferably at least one selected from the group consisting of methanol, ethanol, and ethyl acetate, more preferably at least one selected from the group consisting of ethanol and ethyl acetate.

When the epoxy resin composition contains an organic solvent, the epoxy resin and the epoxy resin curing agent react with each other over time, easily causing precipitation in the composition which may lead to a shortened shelf life (usable time). From the viewpoint of suppressing the generation of precipitation and extending the shelf life of the epoxy resin composition, the organic solvent used in the epoxy resin composition is even more preferably ethanol and ethyl acetate.

When the organic solvent is ethanol and ethyl acetate, the mass ratio of ethanol to ethyl acetate (ethanol/ethyl acetate) is preferably from 95/5 to 55/45, more preferably from 90/10 to 55/45, even more preferably from 85/15 to 60/40, and yet even more preferably from 75/25 to 65/35, from the viewpoint of extending the shelf life of the epoxy resin composition.

When the epoxy resin composition contains an organic solvent, the solid content concentration of the epoxy resin composition, while not limited, is usually 0.5 mass % or more, more preferably 1 mass % or more, from the viewpoint of coating performance. In addition, from the viewpoint of improvement of the coating performance and the shell life of the composition, the solid content concentration of the epoxy resin composition is preferably 20 mass % or less, more preferably 10 mass % or less, and even more preferably 5 mass % or less.

Preparation of the Epoxy Resin Composition

The epoxy resin composition can be prepared, for example, by blending a given amount of each of the epoxy resin, the epoxy resin curing agent, the unsaturated fatty acid amide having from 14 to 24 carbons, and as necessary, the dispersion liquid of the non-spherical inorganic particles, other additives, and the organic solvent, and then stirring and mixing using a known method and apparatus.

The order in which the components are mixed is not limited, but when non-spherical inorganic particles are to be used, preferably, the dispersion liquid of non-spherical inorganic particles and the solvent component are mixed first in order to improve dispersibility of the non-spherical inorganic particles in the epoxy resin composition, after which the epoxy resin curing agent or solution thereof, the unsaturated fatty acid amide, and the epoxy resin are added in this order. This is because the dispersibility of the non-spherical inorganic particles is favorably maintained by gradually increasing the solid content concentration in the liquid containing the non-spherical inorganic particles from a low concentration state.

In a case in which the epoxy resin composition contains an organic solvent, from the viewpoint of improvement of flexibility in mixing of the epoxy resin composition, the method for producing the epoxy resin composition preferably includes: mixing an epoxy resin curing agent with an organic solvent to prepare an epoxy resin curing agent solution 1; mixing the solution 1 with an unsaturated fatty acid amide having from 14 to 24 carbons to prepare an epoxy resin curing agent solution 2; and mixing the solution 2 and an epoxy resin, in this order (Production Method 1).

More preferably, Production Method 1 described above includes: mixing an epoxy resin curing agent with an organic solvent to prepare an epoxy resin curing agent solution 1; mixing the solution 1 with an unsaturated fatty acid amide having from 14 to 24 carbons to prepare an epoxy resin curing agent solution 2; and mixing the solution 2 with an epoxy resin and an organic solvent, in this order.

The organic solvent to be used can be those listed for the epoxy resin composition, and is preferably at least one selected from the group consisting of methanol, ethanol, and ethyl acetate, more preferably at least one selected from the group consisting of ethanol and ethyl acetate, and even more preferably ethanol and ethyl acetate. In a case in which the organic solvent included in the epoxy resin composition is ethanol and ethyl acetate, from the viewpoint of improvement of the shelf life, the mass ratio of ethanol to ethyl acetate, (ethanol)/(ethyl acetate), of the ultimately resulting epoxy resin composition is more preferably within the range described above.

When the coupling agent is to be used as an additive, the coupling agent is preferably blended with the epoxy resin curing agent solution 2. Furthermore, when the non-spherical inorganic particles are to be used, it is preferable to mix the dispersion liquid of the non-spherical inorganic particles with the epoxy resin curing agent solution 1.

In Production Method 1, from the viewpoint of the flexibility in mixing of the epoxy resin composition, the solid content concentration of the epoxy resin curing agent solution 1 is preferably 20 mass % or more, more preferably 30 mass % or more, and even more preferably 40 mass % or more; from the viewpoint of improvement of the stirring efficiency, the solid content concentration of the epoxy resin curing agent solution 1 is preferably 80 mass % or less, more preferably 75 mass % or less.

In Production Method 1, from the viewpoint of the flexibility in mixing of the epoxy resin composition, the solid content concentration of the epoxy resin curing agent solution 2 is preferably 10 mass % or more, more preferably 15 mass % or more, even more preferably 20 mass % or more, and yet even more preferably 25 mass % or more; from the viewpoint of improvement of the stirring efficiency and shelf life, the solid content concentration of the epoxy resin curing agent solution 2 is preferably 70 mass % or less, more preferably 50 mass % or less.

Mixing of the components can be performed using a known stirring device by a common method.

In addition, from the viewpoint of improvement of the production efficiency of epoxy resin composition, the unsaturated fatty acid amide having from 14 to 24 carbons is more preferably dissolved in an organic solvent in advance before blended with the epoxy resin composition.

More specifically, from the viewpoint of improvement of the production efficiency of epoxy resin composition and the viewpoint of improvement of the flexibility in mixing, the epoxy resin composition of the present invention is more preferably produced by a production method having the following (I) to (IV) (Production Method 2).

(I): Mixing an unsaturated fatty acid amide having from 14 to 24 carbons and an organic solvent (i) to prepare an unsaturated fatty acid amide solution (a)

(II): Mixing an epoxy resin curing agent containing an amine-based curing agent and an organic solvent (ii) to prepare an epoxy resin curing agent solution (b)

(III): Mixing the unsaturated fatty acid amide solution (a) and the epoxy resin curing agent solution (b) to prepare an epoxy resin curing agent solution (c)

(IV): Mixing the epoxy resin curing agent solution (c) and an epoxy resin to prepare an epoxy resin composition According to Production Method 2 described above, a solution (a) in which an unsaturated fatty acid amide having from 14 to 24 carbons is dissolved in an organic solvent in advance is prepared in (I), and the solution (a) is mixed with an epoxy resin curing agent solution (b) in (III); as such, the dissolution time during which the unsaturated fatty acid amide is dissolved in the epoxy resin composition can be shortened, and the production efficiency can be improved.

(I) and (II) may be performed in this order, or may be performed in the order of first (II) and then (I).

Step (I)

In (I), an unsaturated fatty acid amide having from 14 to 24 carbons is mixed with an organic solvent (i) to prepare an unsaturated fatty acid amide solution (a). When an unsaturated fatty acid amide is directly added to an epoxy resin curing agent, an epoxy resin curing agent solution, or an epoxy resin composition, it may take a long time to dissolve the unsaturated fatty acid amide. However, by performing (I), the dissolution time of the unsaturated fatty acid amide can be shortened.

The organic solvent (i) to be used can be those listed for the epoxy resin composition, and is preferably at least one selected from the group consisting of methanol, ethanol, and ethyl acetate, more preferably at least one selected from the group consisting of ethanol and ethyl acetate, and even more preferably ethanol and ethyl acetate.

The mixing of the unsaturated fatty acid amide and the organic solvent (i) in (I) can be performed using a well-known stirring device by a common method. The mixing temperature in (I) is not limited. However, from the viewpoint of solubility of the unsaturated fatty acid amide, the mixing temperature in (I) is preferably 15° C. or more, more preferably 20° C. or more; from the viewpoint of suppression of volatilization of the organic solvent (i), the mixing temperature in (I) is preferably 60° C. or less, more preferably 50° C. or less.

The concentration of the unsaturated fatty acid amide in the unsaturated fatty acid amide solution (a) prepared in (I) is preferably from 0.1 to 20 mass %, more preferably from 0.5 to 10 mass %, and even more preferably from 1 to 5 mass %, from the viewpoint improvement of the stirring efficiency and production efficiency of the epoxy resin composition.

Step (II)

In (II), an epoxy resin curing agent containing an amine-based curing agent is mixed with an organic solvent (ii) to prepare an epoxy resin curing agent solution (b).

The organic solvent (ii) to be used can be those listed for the epoxy resin composition, and is preferably at least one selected from the group consisting of methanol, ethanol, and ethyl acetate. From the viewpoint of the solubility of the epoxy resin curing agent containing an amine-based curing agent, the organic solvent (ii) is more preferably at least one selected from the group consisting of methanol and ethanol; when environmental safety is taken into consideration, the organic solvent (ii) is even more preferably ethanol.

At least a portion of the organic solvent (ii) may be a reaction solvent used in the production of the amine-based curing agent.

Mixing of the epoxy resin curing agent containing an amine-based curing agent and the organic solvent (ii) in (II) can be performed in the same manner as in (I). The mixing temperature is not limited. However, from the viewpoint of production efficiency, the mixing temperature is preferably 15° C. or more, more preferably 20° C. or more; from the viewpoint of suppression of thermal degradation of the epoxy resin curing agent and the viewpoint of suppression of volatilization of the organic solvent (ii), the mixing temperature is preferably 60° C. or less, more preferably 50° C. or less.

From the viewpoint of the flexibility in adjusting the concentration of the epoxy resin curing agent solution (c) prepared in (III) and the concentration of the epoxy resin composition prepared in (IV), the epoxy resin curing agent concentration of the epoxy resin curing agent solution (b) prepared in (II) is preferably 20 mass % or more, more preferably 30 mass % or more, and even more preferably 40 mass % or more; from the viewpoint of improvement of the stirring efficiency, the epoxy resin curing agent concentration of the epoxy resin curing agent solution (b) prepared in (II) is preferably 80 mass % or less, more preferably 75 mass % or less.

Step (III) In (III), the unsaturated fatty acid amide solution (a) prepared in (I) is mixed with the epoxy resin curing agent solution (b) prepared in (II) to prepare an epoxy resin curing agent solution (c).

In (III), by mixing the unsaturated fatty acid amide solution (a) prepared in (I) in advance with the epoxy resin curing agent solution (b) prepared in (II), the dissolution time of the unsaturated fatty acid amide can be shortened, and the production efficiency of the epoxy resin composition is improved.

In (III), an organic solvent may be further added as necessary for the purpose of adjusting the solid content concentration of the resulting epoxy resin curing agent solution (c). Examples of the organic solvent include the solvents listed as examples for the organic solvent (i).

When the coupling agent is used as an additive, the coupling agent is preferably blended in (III). More specifically, it is preferable to blend the coupling agent with the unsaturated fatty acid amide solution (a) and then mix the mixture with the epoxy resin curing agent solution (b) in (III).

Mixing of the unsaturated fatty acid amide solution (a) and the epoxy resin curing agent solution (b) in (III) can be performed using a known stirring device by a common method.

In (III), from the viewpoint of improvement of solubility of the unsaturated fatty acid amide, the liquid temperature of the unsaturated fatty acid amide solution (a) is preferably first adjusted to 20° C. or more, preferably 25° C. or more, and then the unsaturated fatty acid amide solution (a) is mixed with the epoxy resin curing agent solution (b). From the viewpoint of suppressing volatilization of the organic solvent, the liquid temperature of the unsaturated fatty acid amide solution (a) is preferably 60° C. or less, more preferably 50° C. or less.

After performing (III), cooling, filtration, or the like may be performed as necessary.

From the viewpoint of the flexibility in adjusting the concentration of the epoxy resin composition obtained in (IV), the solid content concentration of the epoxy resin curing agent solution (c) prepared in (III) is preferably 3 mass % or more, more preferably 5 mass % or more, and even more preferably 10 mass % or more; from the viewpoint of improvement of the stirring efficiency, the solid content concentration of the epoxy resin curing agent solution (c) prepared in (III) is preferably 70 mass % or less, more preferably 50 mass % or less.

Step (IV)

In (IV), the epoxy resin curing agent solution (c) is mixed with an epoxy resin to prepare an epoxy resin composition.

In (IV), an organic solvent may be further added as necessary for the purpose of adjusting the solid content concentration of the resulting epoxy resin composition to preferably the above range. Examples of the organic solvent include the solvents listed as examples for the organic solvent (i).

From the viewpoint of improvement of the shelf life of the epoxy resin composition, the organic solvent in the ultimately resulting epoxy resin composition is preferably ethanol and ethyl acetate; in addition, the mass ratio of ethanol to ethyl acetate, (ethanol)/(ethyl acetate), is more preferably within the range described above.

Mixing of the epoxy resin curing agent solution (c) and the epoxy resin in (IV) can be performed in the same manner as in (II).

Applications

The cured product of the epoxy resin composition of the present invention has excellent gas barrier properties, good adhesiveness to an inorganic substance such as alumina, and excellent retort resistance in which peeling-off does not readily occur even after a retort treatment. For example, a cured resin layer formed of the cured product functions as a gas barrier layer having excellent gas barrier properties. Therefore, use of the epoxy resin composition of the present invention is also suitable in gas barrier packaging materials, gas barrier adhesives, and the like, in addition to the gas barrier laminate described later. Further, the epoxy resin composition of the present invention can also be suitably used for formation of a cured product layer constituting the packaging material according to the second invention and a cured product layer constituting the heat-shrinkable label according to the third invention.

The method for forming the cured product by curing the epoxy resin composition of the present invention is not particularly limited, and a well-known method can be used. One embodiment thereof is described with regard to a method for producing a gas barrier laminate.

Gas Barrier Laminate

The gas barrier laminate according to the first invention is characterized by having a substrate and a cured resin layer that is a cured product of the epoxy resin composition (hereinafter, also referred to simply as a "cured resin layer"). Hereinafter, the gas barrier laminate according to the first invention is also referred to simply as a "(gas barrier) laminate of the present invention".

The gas barrier laminate of the present invention is a laminate having high gas barrier properties and high interlayer adhesiveness between the substrate and the cured resin layer. Materials constituting the gas barrier laminate of the present invention will be described below.

Substrate

The substrate constituting the gas barrier laminate of the present invention can be either an inorganic substrate or an organic substrate.

Examples of the inorganic substrate include a metal foil such as an aluminum foil.

The organic substrate is preferably a transparent plastic film. Examples of the transparent plastic film include polyolefin-based films, such as those of low density polyethylene, high density polyethylene, linear low density polyethylene, and polypropylene; polyester-based films, such as those of polyethylene terephthalate, polyethylene naphthalate, and polybutylene terephthalate; polyamide-based films, such as those of nylon 6, nylon 6,6, and poly meta-xylene adipamide (N-MXD6); polyimide-based films; biodegradable films, such as those of polylactic acid; polyacrylonitrile-based films; poly(meth)acrylic-based films; polystyrene-based films; polycarbonate-based films; ethylene-vinyl acetate copolymer saponified substance (EVOH)-based films, and polyvinyl alcohol-based films. Among them, in terms of transparency, strength, and heat resistance, the organic substrate is preferably a film selected from the group consisting of a polyolefin-based film, a polyester-based film, a polyamide-based film, and a polyimide-based film, more preferably a film selected from the group consisting of a polyolefin-based film and a polyester-based film, even more preferably a polypropylene film or a polyethylene terephthalate (PET) film.

The film may be stretched in a uniaxial direction or biaxial direction.

The thickness of the substrate is not limited and can be selected as appropriate in accordance with the application, but in terms of gas barrier properties and strength, the thickness is preferably from 5 to 300 μm, more preferably from 5 to 100 μm, even more preferably from 5 to 50 μm, and yet even more preferably from 5 to 40 μm. When the substrate is an organic substrate, in terms of gas barrier properties and strength, the thickness of the organic substrate is still even more preferably from 8 to 50 μm, further more preferably from 10 to 40 μm.

Cured Resin Layer

The cured resin layer of the gas barrier laminate of the present invention is a cured product of the epoxy resin composition described above. The method for curing the epoxy resin composition is not particularly limited, and curing is implemented by a known method at a temperature and concentration of the epoxy resin composition sufficient for obtaining the cured product thereof. The curing temperature can be selected, for example, in a range from 10 to 140° C.

From the viewpoints of gas barrier properties and bending resistance, the thickness of the cured resin layer is preferably 0.05 μm or more, more preferably 0.1 μm or more. In addition, from the viewpoints of adhesiveness to an inorganic substance such as alumina, retort resistance, and transparency, the thickness of the cured resin layer is preferably 20 μm or less, more preferably 10 μm or less, even more preferably 5.0 μm or less, yet even more preferably 2.0 μm or less, still even more preferably 1.0 μm or less, further preferably 0.5 μm or less, and further more preferably 0.4 μm or less. The thickness above is a thickness per layer of the cured resin layer.

The gas barrier laminate of the present invention may have a substrate and at least one layer of the cured resin layer. From the viewpoint of achieving high gas barrier properties, and from the viewpoint of the effectiveness of the effects of the present invention, the gas barrier laminate of the present invention preferably has at least one layer composed of an inorganic substance. Specifically, the layer composed of an inorganic substance is preferably the inorganic substrate or an inorganic thin film layer.

Inorganic Thin Film Layer

The inorganic thin film layer is provided to impart gas barrier properties to the gas barrier laminate, and can exhibit high gas barrier properties even when the thickness is thin.

Examples of the inorganic thin film layer can include an inorganic thin film layer made from a metal foil, and an inorganic thin film layer formed by a vapor deposition method, but from the viewpoint of obtaining high transparency, the inorganic thin film layer is preferably one formed by vapor deposition.

The inorganic substance constituting the inorganic thin film layer is not limited as long as it is an inorganic substance that can form a gas barrier thin film on the substrate, and examples include silicon, aluminum, magnesium, calcium, zinc, tin, nickel, titanium, zirconium, carbon, or oxides, carbides, nitrides, and oxynitrides thereof. Among these, in terms of gas barrier properties, the inorganic substance is preferably at least one selected from the group consisting of silicon oxides (silica), aluminum, and aluminum oxides (alumina), and from the viewpoint of formation of a thin film having high gas barrier properties and transparency, the inorganic substance is more preferably at least one selected from the group consisting of silicon oxides and aluminum oxides, and in terms of gas barrier properties, silicon oxides are more preferable. Meanwhile, the cured resin layer, which is a cured product of the epoxy resin composition of the present invention, exhibits good adhesion even to an inorganic thin film layer formed of an aluminum oxide for which such adhesion has been conventionally difficult to achieve. Thus, in terms of effectiveness of the effect of the present invention, the inorganic substance constituting the inorganic thin film layer is preferably an aluminum oxide. One type of the inorganic substances above may be used alone, or two or more types may be used in combination.

The thickness of the inorganic thin film layer is preferably 5 nm or more in terms of obtaining high gas barrier properties. In addition, in terms of transparency and bending resistance, the thickness is preferably 100 nm or less and more preferably 50 nm or less. The thickness above is a thickness per layer of the inorganic thin film layer.

The method for forming the inorganic thin film layer is not particularly limited, and as vapor deposition methods, examples include well-known vapor deposition methods including physical vapor deposition methods, such as a vacuum deposition method, a sputtering method, and an ion plating method; and chemical vapor deposition methods, such as a plasma chemical vapor deposition method, a thermal chemical vapor deposition method, and a photochemical vapor deposition method. Furthermore, the inorganic thin film layer can be formed by bonding a metal foil such as an aluminum foil to the substrate.

The inorganic thin film layer can be formed, for example, on the organic substrate, or on the cured resin layer.

Thermoplastic Resin Layer

The gas barrier laminate of the present invention can further include one or two or more layers of a thermoplastic resin layer from the viewpoint of, for example, subjecting the gas barrier laminate of the present invention to a retort treatment.

For the thermoplastic resin layer, a thermoplastic resin film is preferably used, and transparent plastic films that are the same as those listed as examples for the organic substrate can be used. Among the transparent plastic films, at least one selected from the group consisting of a polyolefin-based film and a polyamide-based film is preferred; from the viewpoint of transparency, heat resistance, and suitability for food packaging, at least one selected from the group consisting of a polypropylene film and a nylon 6 film is more preferred.

The surface of the thermoplastic resin film may be subjected to a surface treatment, such as a flame treatment or a corona discharge treatment. In addition, as the thermoplastic resin film, a film containing an ultraviolet absorber, a colorant, or the like, or a film having a primer layer, an ink layer, a surface protective layer, a vapor-deposited layer, or the like on the surface can also be used.

The thickness of the thermoplastic resin layer is preferably from 10 to 300 μm and is more preferably from 10 to 100 μm. The thickness above is a thickness per layer of the thermoplastic resin layer.

Adhesive Layer

The gas barrier laminate of the present invention may further include an adhesive layer in order to laminate the thermoplastic resin layer.

As the adhesive constituting the adhesive layer, a well-known adhesive, such as a urethane-based adhesive, an acrylic-based adhesive, or an epoxy-based adhesive, can be used. The thickness of the adhesive layer is not limited, but from the viewpoint of achieving both adhesiveness and transparency, the thickness is preferably from 0.1 to 30 μm, more preferably from 1 to 20 μm, and even more preferably from 2 to 20 μm. The thickness above is a thickness per layer of the adhesive layer.

Layer Constitution of Gas Barrier Laminate

The gas barrier laminate of the present invention may have a constitution having the substrate and at least one layer of the cured resin layer. As described above, from the viewpoint of the effectiveness of the effects of the present invention, the gas barrier laminate of the present invention preferably has a layer composed of an inorganic substance, and from the viewpoint of cost efficiency, the gas barrier laminate of the present invention preferably has a constitution having one layer or two layers of the cured resin layer, preferably only one layer of the cured resin layer. Further, from the viewpoint of the effectiveness of the effects of the present invention, the layer composed of an inorganic substance is preferably adjacent to the cured resin layer.

Examples of a layer constitution of gas barrier laminate having the substrate and one or two layers of the cured resin layer while having a layer composed of an inorganic substance are listed below.

(1) A constitution having a substrate and a cured resin layer, in which the substrate is an inorganic substrate (2) A constitution having a substrate, an inorganic thin film layer, and a cured resin layer in this order (3) A constitution having a substrate, a cured resin layer, and an inorganic thin film layer in this order (4) A constitution having a substrate, a cured resin layer, an inorganic thin film layer, and a cured resin layer in this order In (1) above, when the constitution has two or more substrates, at least one substrate may be an inorganic substrate.

The substrate in (2), (3), and (4) described above is preferably an organic substrate. Further, from the viewpoint of the effectiveness of the effects of the present invention, the layer composed of an inorganic substance is preferably adjacent to the cured resin layer; from the viewpoint of gas barrier properties, the constitution of any of (1), (2), or (4) described above is more preferable, and the constitution of either (1) or (2) described above is even more preferable.

The constitution of (2) above is yet even more preferable from the viewpoint of the effectiveness of the effects of the present invention and the viewpoint of applications requiring retort resistance and transparency.

The gas barrier laminate of the present invention has the layer constitution of any one of (1) to (4) above, and may further have one or two or more layers of the thermoplastic resin layer described above.

Examples of preferred layer constitutions of the gas barrier laminate include the constitutions illustrated in FIG. 1 to FIG. 4. Hereinafter, in this specification, a laminate having only a substrate and without a thermoplastic resin layer is referred to as "laminate (I)", a laminate in which the total number of layers of substrate and thermoplastic resin layer is 2 is referred to as "laminate (II)", and a laminate in which the total number of layers of substrate and thermoplastic resin layer is 3 is referred to as "laminate (III)".

Figure 2:
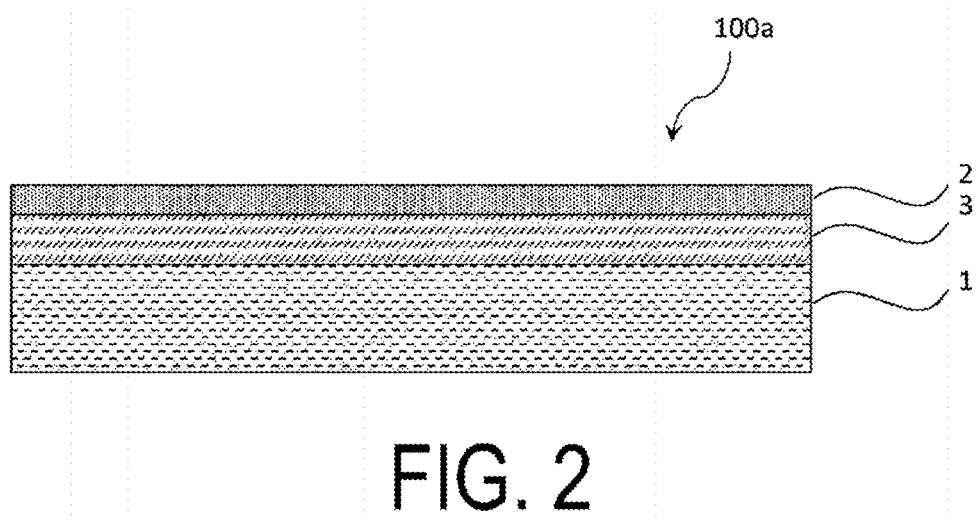
FIG. 2 is a schematic cross-sectional view illustrating a gas barrier laminate 100a according to an embodiment of the first invention.

FIG. 1 and FIG. 2 are schematic cross-sectional views illustrating gas barrier laminates (I) according to an embodiment of the present invention. The gas barrier laminate 100 in FIG. 1 has a constitution in which an inorganic thin film layer 2 and a cured resin layer 3 are provided on a substrate 1 in this order. In FIG. 1, the inorganic thin film layer 2 is adjacent to the cured resin layer 3.

A gas barrier laminate 100a in FIG. 2 has a constitution in which the cured resin layer 3 and the inorganic thin film layer 2 are provided on the substrate 1 in this order.

FIGS. 3 to 6 are schematic cross-sectional views illustrating gas barrier laminates (II) according to an embodiment of the present invention. The gas barrier laminates of FIGS. 3 to 6 have one layer of substrate and one layer of thermoplastic resin layer (two layers in total), and the thermoplastic resin layer may be laminated directly or via an adhesive layer.

Figure 3:
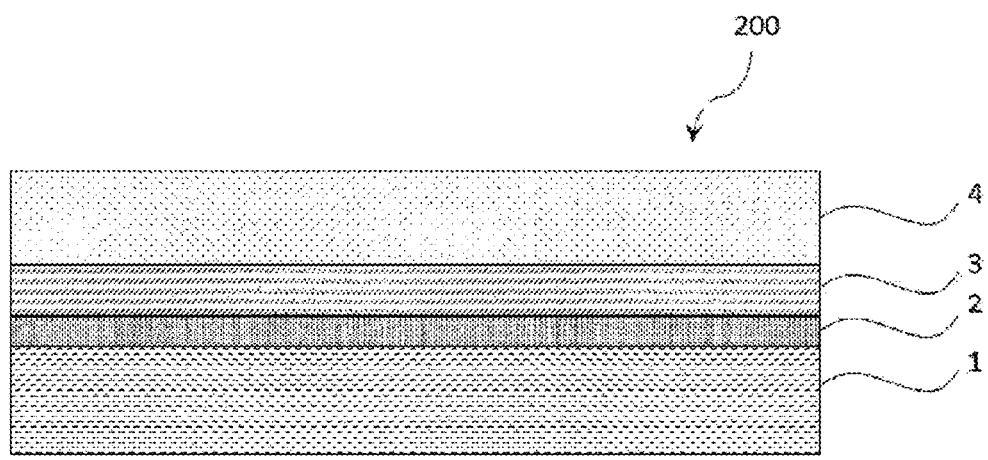
FIG. 3 is a schematic cross-sectional view illustrating a gas barrier laminate 200 according to an embodiment of the first invention.

A gas barrier laminate 200 in FIG. 3 has a constitution in which a thermoplastic resin layer 4 is directly laminated without an adhesive layer interposed therebetween and in which a substrate 1, an inorganic thin film layer 2, a cured resin layer 3, and a thermoplastic resin layer 4 are laminated in this order.

Figure 4:
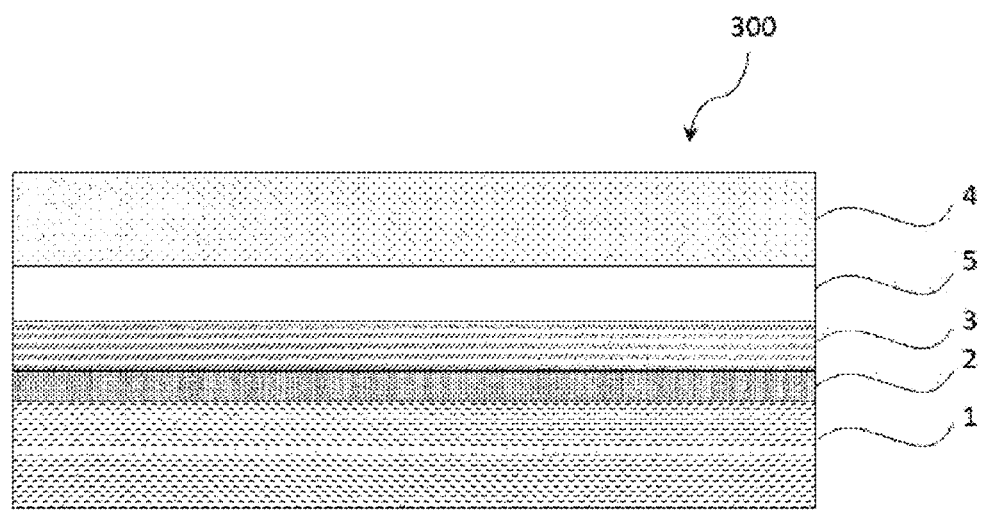
FIG. 4 is a schematic cross-sectional view illustrating a gas barrier laminate 300 according to an embodiment of the first invention.
Figure 5:
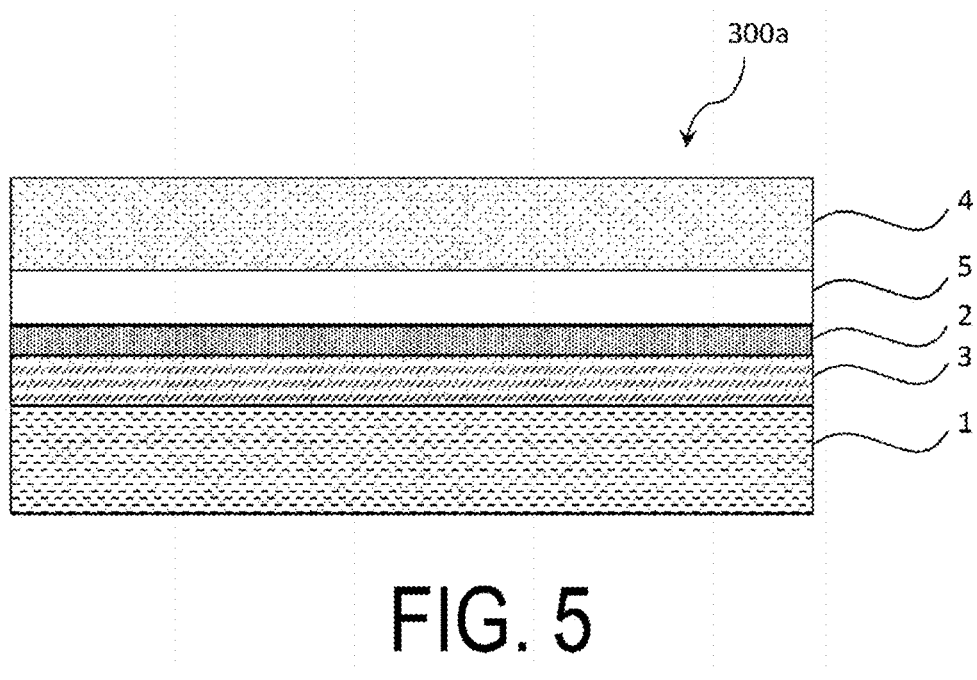
FIG. 5 is a schematic cross-sectional view illustrating a gas barrier laminate 300a according to an embodiment of the first invention.
Figure 6:
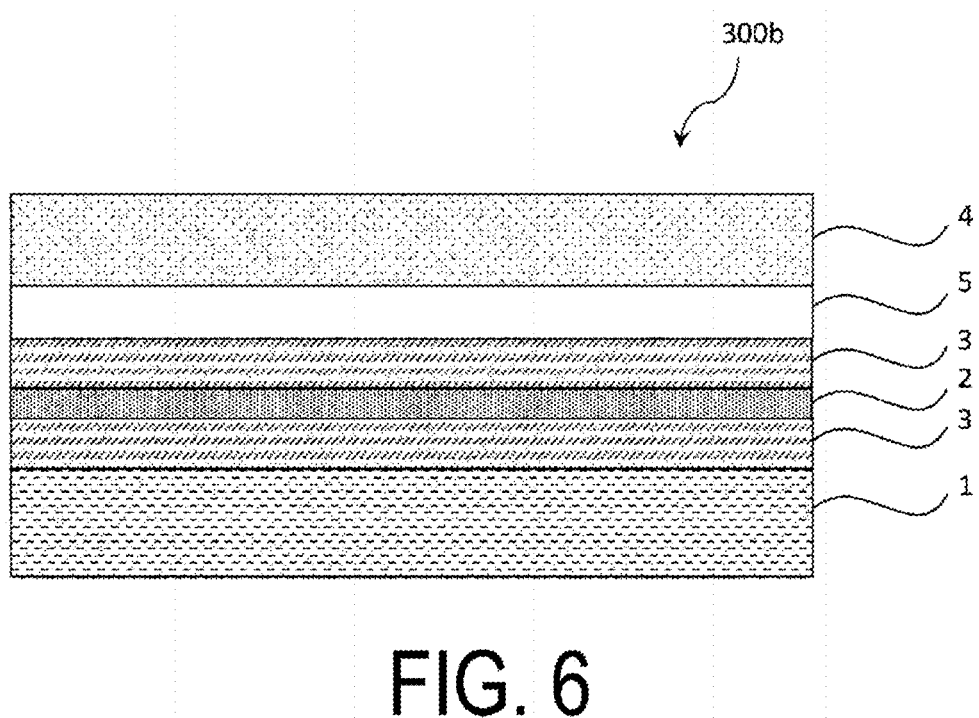
FIG. 6 is a schematic cross-sectional view illustrating a gas barrier laminate 300b according to an embodiment of the first invention.

Gas barrier laminates 300, 300a, and 300b in FIGS. 4 to 6 have a constitution in which a thermoplastic resin layer 4 is laminated with an adhesive layer 5 interposed. The gas barrier laminate 300 in FIG. 4 has a constitution in which the substrate 1, the inorganic thin film layer 2, the cured resin layer 3, the adhesive layer 5, and the thermoplastic resin layer 4 are laminated in this order.

The gas barrier laminate 300a in FIG. 5 has a constitution in which the substrate 1, the cured resin layer 3, the inorganic thin film layer 2, the adhesive layer 5, and the thermoplastic resin layer 4 are laminated in this order.

The gas barrier laminate 300b in FIG. 6 has a constitution in which the substrate 1, the cured resin layer 3, the inorganic thin film layer 2, the cured resin layer 3, the adhesive layer 5, and the thermoplastic resin layer 4 are laminated in this order.

Figure 7:
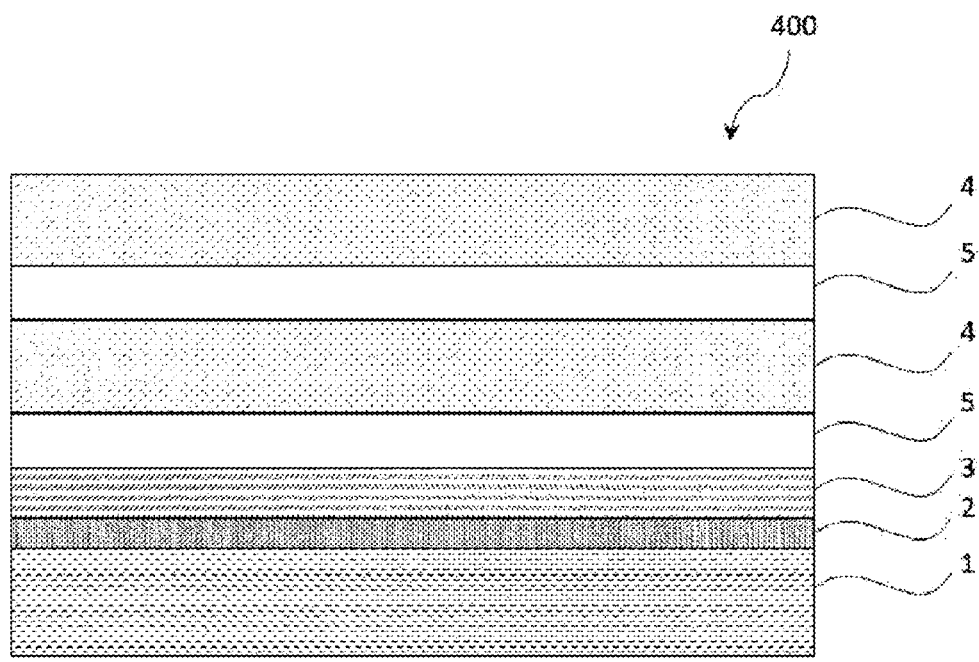
FIG. 7 is a schematic cross-sectional view illustrating a gas barrier laminate 400 according to an embodiment of the first invention.
Figure 8:
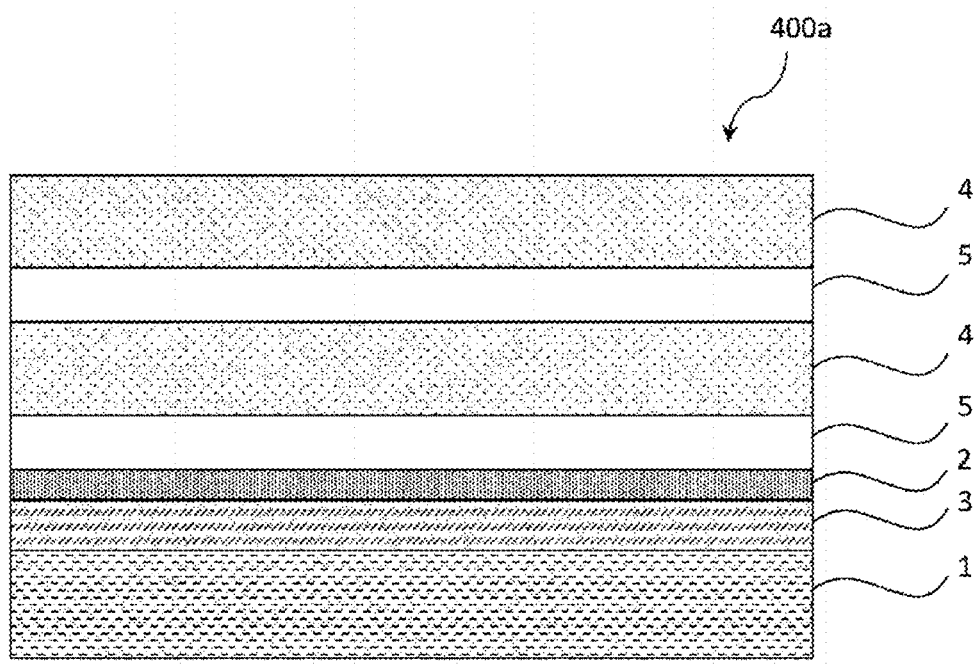
FIG. 8 is a schematic cross-sectional view illustrating a gas barrier laminate 400a according to an embodiment of the first invention.
Figure 9:
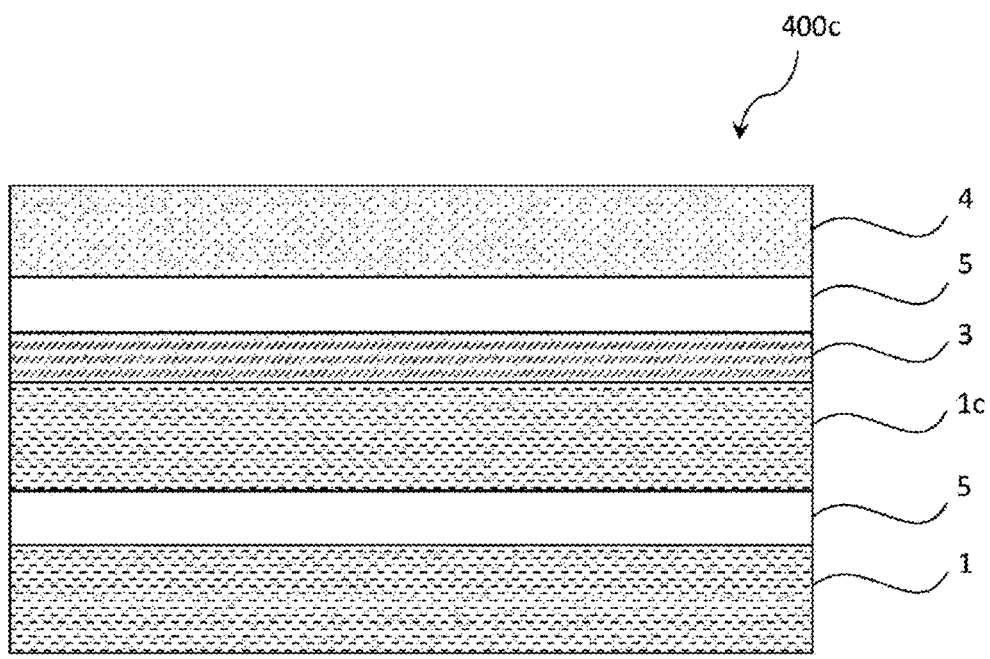
FIG. 9 is a schematic cross-sectional view illustrating a gas barrier laminate 400c according to an embodiment of the first invention.

FIGS. 7 to 9 are schematic cross-sectional views illustrating gas barrier laminates (III) according to an embodiment of the present invention. The gas barrier laminates of FIG. 7 and FIG. 8 have one layer of substrate and two layers of thermoplastic resin layer (three layers in total), and the gas barrier laminate of FIG. 9 has two layers of substrate and one layer of thermoplastic resin layer (three layers in total).

The gas barrier laminate 400 of FIG. 7 has a constitution in which a substrate 1, an inorganic thin film layer 2, a cured resin layer 3, an adhesive layer 5, a thermoplastic resin layer 4, an adhesive layer 5, and a thermoplastic resin layer 4 are laminated in this order.

The gas barrier laminate 400a of FIG. 8 has a constitution in which the substrate 1, the cured resin layer 3, the inorganic thin film layer 2, the adhesive layer 5, the thermoplastic resin layer 4, the adhesive layer 5, and the thermoplastic resin layer 4 are laminated in this order.

The gas barrier laminate 400c of FIG. 9 has a constitution in which the substrate 1, the adhesive layer 5, a substrate 1c, the cured resin layer 3, the adhesive layer 5, and the thermoplastic resin layer 4 are laminated in this order. At least one of the substrates is preferably an inorganic substrate, and for example, the substrate 1c is an inorganic substrate.

The thermoplastic resin layers 4 constituting the gas barrier laminate 400 or 400a may all be the same resin layer or may be different resin layers from each other. Further, the adhesive layers 5 may be layers made of the same adhesive or layers made of different adhesives.

However, the laminate of the present invention is not limited to the layer constitutions illustrated in FIG. 1 to FIG. 9. In addition, an optional layer, such as a primer layer, an ink layer, an adhesive layer, a surface protective layer, or a vapor-deposited layer, may be further laminated on the laminate of the present invention.

Method for Producing Gas Barrier Laminate

The method for producing the gas barrier laminate of the present invention is not limited, and a known method can be used.

Examples of the method for producing the gas barrier laminate 100 having the constitution illustrated in FIG. 1 include a method, which includes forming an inorganic thin film layer on one surface of a substrate, applying, at a desired thickness, the epoxy resin composition for forming a cured resin layer onto the surface on the side of the inorganic thin film layer, and then curing the epoxy resin composition and forming a cured resin layer. Alternatively, the method may include using a film in which an inorganic thin film layer is formed on a transparent plastic film in advance, and forming a cured resin layer on the surface of the inorganic thin film layer.

Examples of the method for producing the gas barrier laminate 100a having the constitution illustrated in FIG. 2 include a method which includes applying the epoxy resin composition onto one surface of the substrate, then curing the epoxy resin composition to form a cured resin layer, and forming an inorganic thin film layer on the cured resin layer.

Examples of the application method for applying the epoxy resin composition include bar coating, Meyer bar coating, air knife coating, gravure coating, reverse gravure coating, micro gravure coating, micro reverse gravure coating, die coating, slot die coating, vacuum die coating, dip coating, spin coating, roll coating, spray coating, and coating with a brush. Among these, bar coating, roll coating, or spray coating is preferred, and gravure coating, reverse gravure coating, micro gravure coating, or micro reverse gravure coating is industrially preferred.

After the epoxy resin composition has been applied by coating, a step (drying step) of volatilizing the solvent is implemented as necessary. Conditions in the drying can be selected as appropriate, and the drying can be performed, for example, at a drying temperature from 40 to 180° C. and a drying time from 5 to 180 seconds.

After the drying has been performed, the epoxy resin composition is cured to form a cured resin layer. The curing temperature can be selected, for example, in a range from 10 to 140° C., and is preferably in a range from 10 to 80° C. The curing time can be selected, for example, in a range from 0.5 to 200 hours, and is preferably in a range from 2 to 100 hours.

Examples of a method for producing the gas barrier laminate 200 having the constitution illustrated in FIG. 3 include a method which includes forming an inorganic thin film layer on a substrate, applying the epoxy resin composition described above onto the surface of the inorganic thin film layer, then immediately bonding a thermoplastic resin film constituting a thermoplastic resin layer to the coated surface using a nip roll or the like, and subsequently curing the epoxy resin composition by the method described above. In this case, the epoxy resin composition constituting the cured resin layer also functions as an adhesive layer that bonds the inorganic thin film layer to the thermoplastic resin film in the gas barrier laminate 200.

Examples of a method for producing the gas barrier laminate 300 having the constitution illustrated in FIG. 4 include a method including applying an adhesive constituting an adhesive layer onto the surface of the cured resin layer of the gas barrier laminate 100 having the constitution illustrated in FIG. 1, or applying an adhesive constituting an adhesive layer onto the surface on one side of a thermoplastic resin film, and then laminating the two. The gas barrier laminate 300a having the constitution illustrated in FIG. 5 can be produced in the same manner using the gas barrier laminate 100a having the constitution illustrated in FIG. 2.

Examples of a method for producing the gas barrier laminate 300b having the constitution illustrated in FIG. 6 include a method which includes forming a cured resin layer on the surface of the inorganic thin film layer of the gas barrier laminate 100a having the constitution illustrated in FIG. 2, applying an adhesive constituting an adhesive layer onto the surface of the cured resin layer or onto the surface on one side of a thermoplastic resin film, and then laminating the two.

The gas barrier laminate 400 having the constitution illustrated in FIG. 7 can be produced by forming the gas barrier laminate 300 having the constitution illustrated in FIG. 4 and then repeating the step of laminating by applying an adhesive and attaching a thermoplastic resin film. The gas barrier laminate 400a having the constitution illustrated in FIG. 8 can be produced in the same manner using the gas barrier laminate 300a having the constitution illustrated in FIG. 5.

Examples of a method for producing the gas barrier laminate 400c having the constitution illustrated in FIG. 9 include a method which includes laminating the substrate 1, the adhesive layer 5, and the substrate 1c in this order, forming a cured resin layer on the surface of the substrate 1c, then applying an adhesive constituting an adhesive layer onto the surface of the cured resin layer or onto the surface on one side of a thermoplastic resin film, and then laminating the two.

Characteristics of Gas Barrier Laminate

The gas barrier laminate of the present invention has excellent gas barrier properties. For example, the oxygen transmission rate of the gas barrier laminate (II) at 23° C. and a relative humidity of 60%, although varies depending on the barrier properties of the substrate that is used, is preferably 2 cc/m$^2$·day·atm or less, more preferably 1.5 cc/m$^2$·day·atm or less, and even more preferably 1 cc/m$^2$·day·atm or less.

The oxygen transmission rate of the gas barrier laminate is specifically determined by a method described in Examples.

Application of Gas Barrier Laminate

The gas barrier laminate of the present invention has excellent gas barrier properties and bending resistance, making it suitable for packaging material applications for protecting food products, pharmaceuticals, cosmetics, precision electronic components, or the like. When used as a packaging material, the gas barrier laminate of the present invention may be used as-is or may be used with another layer or film further laminated.

The form of the packaging material can be selected as appropriate depending on the article to be contained and stored, and examples of the form thereof include: packaging films; packaging containers such as packaging bags and bottles; and lid materials and sealing materials for packaging containers. Among these, suitable forms for subjecting to retort processing preferably include packaging films, and packaging bags or lid materials and sealing materials thereof. Specific examples of packaging films or packaging bags include: three-side sealed flat bags; standing pouches; gusset packaging bags; pillow packaging bags; multi-chamber pouches containing of a main chamber and a secondary chamber, and provided with a releasable wall between the main chamber and the secondary chamber; and shrink film packaging.

The capacity of the packaging material is also not limited, and can be selected as appropriate depending on the article to be contained and stored.

As applications of the packaging material, from the viewpoint of the effectiveness of the effects of the present invention, applications requiring retort resistance are preferable, which include application in retort food packaging materials for retort food bags and lid materials, etc.; among these, application in a retort food bag is more preferable.

From the viewpoint of retort resistance, the retort food packaging materials include the gas barrier laminate of the present invention, and preferably include the laminate (II) or the laminate (III) described above. In other words, the retort food packaging materials preferably include a laminate having a substrate, a cured resin layer, and one or two or more layers of a thermoplastic resin layer; from the viewpoint of gas barrier properties, the retort food packaging materials more preferably include a laminate further having an inorganic thin film layer. Examples of the retort food packaging materials include bags and lid materials for retort foods using the laminate (II) or laminate (III).

Second Invention: Odor-Proofing or Aroma-Retaining Packaging Material

The odor-proofing or aroma-retaining packaging material according to the second invention (hereinafter also referred to as a "packaging material of the present invention") includes a substrate and a cured product layer of an epoxy resin composition, the epoxy resin composition containing an epoxy resin, an epoxy resin curing agent containing an amine-based curing agent, and an unsaturated fatty acid amide having from 14 to 24 carbons.

The packaging material of the present invention has a cured product layer of an epoxy resin composition containing an amine-based curing agent, and thus provides excellent odor-proofing property and aroma-retaining property. Furthermore, the epoxy resin composition contains an unsaturated fatty acid amide having from 14 to 24 carbons, and thus a three-layer structure with the cured product layer of the epoxy resin composition being the intermediate layer is not necessary, and a two-layer structure composed of a substrate and the cured product layer can be used. Therefore, thinning of the packaging material is possible, and excellent cost efficiency can be achieved. Further, the adhesiveness between the substrate and the cured product layer as well as the transparency are good.

When the cured product of the epoxy resin composition is used as the intermediate layer (a layer located between two pieces of substrates) of the packaging material, the epoxy resin composition may have the performance as an adhesive in addition to the odor-proofing property and aroma-retaining property. Meanwhile, when the cured product layer of the epoxy resin composition is used as a surface layer (the innermost layer or outermost layer), it is important that there is little blocking.

When the epoxy resin composition contains an unsaturated fatty acid amide having from 14 to 24 carbons, it is thought that the unsaturated fatty acid amide having from 14 to 24 carbons functions as a lubricant, and blocking of the resulting cured product layer can be suppressed. This effect allows the layer constitution of the packaging material to be a two-layer structure composed of a substrate and a cured product layer.

Furthermore, the unsaturated fatty acid amide is thought to relieve the stress generated in the cured product of epoxy resin, and the unsaturated fatty acid amide has higher compatibility with an epoxy resin composition containing an amine-based epoxy resin curing agent. Therefore, it is inferred that a cured product of the epoxy resin composition containing the unsaturated fatty acid amide has good adhesiveness to a substrate and good transparency.

The form of the packaging material of the present invention can be selected as appropriate depending on the article to be contained and stored, and examples of the form thereof include: a packaging film; a packaging container such as a packaging bag and bottle; and a lid material and sealing material for a packaging container. Among these, from the viewpoint of enhancing odor-proofing property and aroma-retaining property, the packaging material of the present invention is preferably a bag, a film or a lid material, more preferably a packaging bag.

Specific examples of the packaging bag include: a three-side sealed flat bag; a standing pouch; a gusset packaging bag; a pillow packaging bag; a multi-chamber pouch composed of a main chamber and a secondary chamber and provided with a releasable wall between the main chamber and the secondary chamber; and a shrink packaging bag.

The capacity of the packaging material is also not limited, and can be selected as appropriate depending on the article to be contained and stored.

Materials constituting the packaging material of the present invention will be described below.

Substrate

The substrate in the packaging material of the present invention can be either an inorganic substrate or an organic substrate. Examples of the inorganic substrate and the organic substrate include the same substrates as those listed for the gas barrier laminate according to the first invention.

From the viewpoint of lightness, transparency, and cost efficiency, the substrate is preferably an organic substrate; in terms of transparency, strength and heat resistance, the substrate is more preferably one or more types selected from the group consisting of polyolefin, polyester, polyamide, and polyimide, more preferably polyolefin.

When the packaging material is a film or a bag, the substrate is preferably a film-shaped substrate, and the film may be stretched in a uniaxial or biaxial direction. Furthermore, the film may have an inorganic thin film layer such as a vapor-deposited film of silica, alumina, or the like, but the film may have a constitution without an inorganic thin film layer from the viewpoint of cost efficiency.

The thickness of the substrate is not limited and can be selected as appropriate in accordance with the shape of the packaging material or the like, but from the viewpoint of odor-proofing property and aroma-retaining property as well as strength, the thickness is preferably from 5 to 300 µm, more preferably from 5 to 100 µm, and even more preferably from 5 to 50 µm. When the substrate is an organic substrate, from the viewpoint of odor-proofing property and aroma-retaining property as well as strength, the thickness of the organic substrate is yet even more preferably from 8 to 50 µm, still even more preferably from 10 to 40 µm.

Cured Product Layer

The cured product layer in the packaging material of the present invention is a layer composed of a cured product of an epoxy resin composition containing an epoxy resin, an epoxy resin curing agent containing an amine-based curing agent, and an unsaturated fatty acid amide having from 14 to 24 carbons.

From the viewpoint of odor-proofing property and aroma-retaining property as well as bending resistance, the thickness of the cured product layer is preferably 0.02 µm or more, more preferably 0.05 µm or more, even more preferably 0.08 µm or more. In addition, from the viewpoint of adhesiveness to a substrate, transparency, thinning, and cost efficiency, the thickness of the cured product layer is preferably 1.0 µm or less, more preferably 0.6 µm or less, and even more preferably 0.5 µm or less. The thickness above is a thickness per layer of the cured product layer.

In the packaging material of the present invention, the components contained in the epoxy resin composition constituting the cured product layer and the preferred aspects thereof are the same as those of the epoxy resin composition according to the first invention.

The method for curing the epoxy resin composition to form a cured product layer is not limited, and the curing and formation may be performed by a known method at a temperature and concentration of the epoxy resin composition sufficient for formation of a cured product of the epoxy resin composition. The curing temperature can be selected, for example, in a range from 10 to 140° C. Details will be described later in the method for producing the packaging material.

Constitution of Packaging Material

The odor-proofing or aroma-retaining packaging material of the present invention may include a substrate and at least one layer of a cured product layer of the epoxy resin composition. When the packaging material of the present invention is a packaging film, a constitution having only one piece of substrate and only one layer of cured product layer (two-layer constitution) is preferable. In addition, from the viewpoint of adhesiveness, the substrate is preferably adjacent to the cured product layer.

The packaging bag is preferably composed of the packaging film described above. In this case, either the surface of the substrate or the surface of the cured product layer may be the outer layer of the packaging bag. From the viewpoint of producing the packaging bag by heat-sealing of the packaging film, the surface of the cured product layer is preferably the outer layer.

Figure 10:
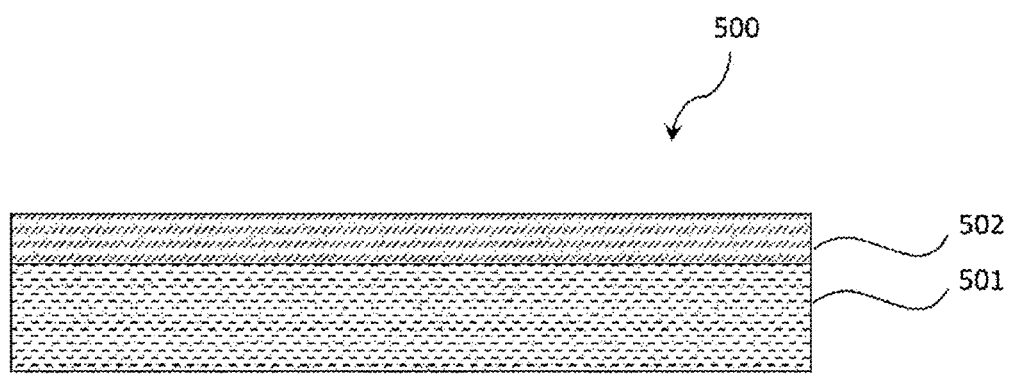
FIG. 10 is a schematic cross-sectional view illustrating a packaging material (packaging film) 500 according to an embodiment of the second invention.

An example of a preferred layer constitution of the packaging film includes the constitution illustrated in FIG. 10.

FIG. 10 is a schematic cross-sectional view illustrating an embodiment of a packaging film 500 which is an embodiment of the packaging material of the present invention. The packaging film 500 in FIG. 10 has a constitution in which a cured product layer 502 is provided on the surface of one side of a substrate 501, the substrate 501 being adjacent to the cured product layer 502.

However, the packaging film according to an embodiment of the packaging material of the present invention is not limited to the one having the layer constitution of FIG. 10.

Additionally, the packaging material may further include, on the surface of the substrate 501 in which the cured product layer 502 is not provided, or on the upper surface of the cured product layer 502 (the surface that is not adjacent to the substrate 501), an optional layer, such as a primer layer, an ink layer such as a printed layer, an adhesive layer, a surface protective layer, or a vapor-deposited layer, or a thermoplastic resin layer (not illustrated) laminated between the substrate 501 and the cured product layer 502.

From the viewpoint of odor-proofing property and aroma-retaining property as well as strength, the thickness of the packaging film is preferably from 10 to 300 μm, more preferably from 10 to 100 μm, and even more preferably from 10 to 50 μm.

Method for Producing Packaging Material

The method for producing the packaging material of the present invention is not limited, and a known method can be used.

Examples of the method for producing the packaging film 500 having the constitution illustrated in FIG. 10 include a method which includes applying, at a desired thickness, the epoxy resin composition onto one surface of a substrate, and then curing the epoxy resin composition and forming a cured product layer.

The application method when applying the epoxy resin composition is the same as described above.

After the epoxy resin composition has been applied, a step (drying step) of volatilizing the solvent is performed as necessary.

The epoxy resin composition used in the packaging material of the present invention contains an unsaturated fatty acid amide having from 14 to 24 carbons; as such, the drying speed is improved along with the blocking suppression effect, and thus drying temperature can be lowered. When a substrate having a low heat resistance is used, the drying temperature is preferably from 40 to 120° C., more preferably from 40 to 100° C., and even more preferably from 50 to 90° C.

After the drying has been performed, the epoxy resin composition is cured to form a cured product layer. The curing temperature can be selected, for example, in a range from 10 to 140° C., preferably in a range from 10 to 100° C., more preferably in a range from 10 to 80° C. Furthermore, the curing time can be selected, for example, in a range from 0.5 to 200 hours, preferably in a range from 2 to 100 hours.

Processing the above-described packaging film using a known method can provide various packaging containers such as packaging bags, packaging container lid materials, sealing materials, and the like.

Odor-Proofing or Aroma-Retaining Method

The second invention provides an odor-proofing or aroma-retaining method of sealing an article containing an odorous component or an aromatic component in a packaging material having a substrate and a cured product layer of an epoxy resin composition, the epoxy resin composition containing an epoxy resin, an epoxy resin curing agent containing an amine-based curing agent, and an unsaturated fatty acid amide having from 14 to 24 carbons.

Examples of the odorous component that is the subject of odor-proofing by the method according to the second invention include: an amine-based volatile substance, such as ammonia and trimethylamine; a sulfur-based volatile substance such as methyl mercaptan; an aldehyde, a lower fatty acid, or an ester thereof. In addition, the aromatic component that is the subject of aroma-retaining include a fragrance component such as a natural fragrance, such as limonene, geraniol, 1-menthol, or derivatives thereof, or a synthetic fragrance.

Examples of the article to be sealed in the packaging material by the method according to the second invention include: used paper diapers or pet litter, filth, kitchen waste, and other malodorous substances; foods with strong odor; and toiletry products, cosmetics, stationery, and toys that are aromatic.

According to the method according to the second invention, by sealing the article in the packaging material and then closing tightly the packaging material, the odorous component and aromatic component are less likely to spread to outside the packaging material, resulting in the exhibition of excellent odor-proofing property and aroma-retaining property.

Third Invention: Heat-Shrinkable Label

The heat-shrinkable label according to the third invention (hereinafter, also simply referred to as a "label of the present invention") includes a heat-shrinkable substrate layer and a cured product layer of an epoxy resin composition, the epoxy resin composition containing an epoxy resin, an epoxy resin curing agent containing an amine-based curing agent, and an unsaturated fatty acid amide having from 14 to 24 carbons.

The heat-shrinkable label of the present invention includes a cured product layer of an epoxy resin composition containing an amine-based curing agent, and thus excellent $CO_2$ barrier properties can be obtained.

Furthermore, the epoxy resin composition contains an unsaturated fatty acid amide having from 14 to 24 carbons, and thus the heat-shrinkable label does not need to have a three-layer structure in which the cured product layer is formed between two layers of heat-shrinkable substrate layer, and the heat-shrinkable label can have a structure having only one layer of heat-shrinkable substrate layer and one layer of the cured product layer. Therefore, the heat-shrinkable label can be made thin, and can achieve excellent cost efficiency. Furthermore, a heat-shrinkable label having good adhesiveness between the heat-shrinkable substrate layer and the cured product layer as well as excellent conformability during heat shrinking can be obtained. The reason for this is not clear but is assumed to be as follows.

When the cured product of the epoxy resin composition is used as the intermediate layer (a layer located between two heat-shrinkable substrate layers) of a label, the epoxy resin composition may have the performance as an adhesive in addition to $CO_2$ barrier properties. Meanwhile, when the cured product layer of the epoxy resin composition is used as a surface layer (the innermost layer or outermost layer), it is important that there is little blocking.

When the epoxy resin composition contains an unsaturated fatty acid amide having from 14 to 24 carbons, it is thought that the unsaturated fatty acid amide having from 14 to 24 carbons functions as a lubricant and contributes to the suppression of blocking. With this effect, the label that has a structure having only one layer of heat-shrinkable substrate layer and only one layer of the cured product layer is possible, achieving a thinner product and improved cost efficiency.

Furthermore, the unsaturated fatty acid amide is thought to relieve the stress generated in the cured product of epoxy resin. Therefore, it is inferred that the cured product of the epoxy resin composition containing the unsaturated fatty acid amide has good adhesiveness to the heat-shrinkable substrate layer and excellent conformability during heat shrinking. The unsaturated fatty acid amide has a high compatibility with the epoxy resin composition containing an amine-based epoxy resin curing agent, and thus the transparency of the cured product of the epoxy resin composition is also good.

Further, regarding the production of the heat-shrinkable label, the epoxy resin composition forming the cured product layer preferably has a high drying rate from the viewpoint of preventing the label from heat-shrinking during production. When the epoxy resin composition contains an unsaturated fatty acid amide having from 14 to 24 carbons, it is thought that the drying rate is improved along with the blocking suppression effect. Such a label can be dried under a low temperature condition, heat shrinkage of the label during production can be suppressed, and the heat-shrinkable label can be produced with high productivity.

Materials constituting the heat-shrinkable label of the present invention will be described below.

Heat-Shrinkable Substrate Layer

The substrate used in the heat-shrinkable substrate layer (hereafter, also simply referred to as a "substrate layer") is a heat-shrinkable substrate having the property of shrinking by heating; from the viewpoints of heat shrinkability, bending resistance, transparency, and cost efficiency, the substrate is preferably a resin substrate.

Examples of the resin constituting the heat-shrinkable substrate layer include a polyvinyl chloride resin, a polystyrene resin, a polyolefin resin, a polyester resin, a polyamide resin, and a polyamide-imide resin. Among these, from the viewpoints of heat shrinkability, bending resistance, transparency, and cost efficiency, the resin is preferably a resin selected from the group consisting of a polyvinyl chloride resin, a polystyrene resin, a polyolefin resin, and a polyester resin, more preferably a resin selected from the group consisting of a polyvinyl chloride resin, a polyolefin resin, and a polyester resin, and even more preferably a polyvinyl chloride resin.

From the viewpoint of imparting heat shrinkability, the heat-shrinkable substrate is preferably stretched in a uniaxial or biaxial direction. As the stretching method, a usual uniaxial stretching method, a simultaneous biaxial stretching method, or a sequential biaxial stretching method can be used.

The stretching temperature and the stretching ratio of the heat-shrinkable substrate are not particularly limited, but from the viewpoint of achieving sufficient heat shrinkability in the resulting label, and from the viewpoint of preventing breakage of the substrate during stretching, the stretching temperature is preferably from 90 to 160° C., and the stretching ratio as the product of the stretching ratios in the MD direction and the TD direction (in the case of uniaxial stretching, the ratio in the direction not stretched is taken as 1) is preferably from 1.5 to 25 times, more preferably from 2 to 20 times.

Furthermore, from the viewpoint of imparting sufficient heat shrinkability, heat fixation is preferably not performed after the stretching.

Regarding the heat shrinkage ratio of the heat-shrinkable substrate, from the viewpoint of enhancing the $CO_2$ barrier properties by heat-shrinking the label and making the label adhere to the surface of the target object, at least the heat shrinkage ratio under the conditions of heat-shrinking the label is preferably 1.0% or more, and more preferably 2.0% or more. For example, in the case of a heat-shrinkable label for a PET bottle, the condition of heat-shrinking the label include the heating temperature and the heating time when the PET bottle is shrink-wrapped by the label. In addition, the heat shrinkage ratio of the heat-shrinkable substrate after heating at 150° C. for 30 seconds is preferably from 1.0 to 80%, more preferably from 1.0 to 50%, even more preferably from 2.0 to 20%, yet even more preferably from 2.0 to 10%. When the heat shrinkage ratio is 1.0% or more, the heat shrinkability required for the resulting label to adhere to the surface of the target object can be obtained; and when the heat shrinkage ratio is 80% or less, the conformability of the cured product layer and the ink layer formed on the label at the time of heat shrinking is good.

The heat shrinkage ratio of the heat-shrinkable substrate is the area shrinkage ratio (%) after heating the substrate at 150° C. for 30 seconds; specifically, the heat shrinkage ratio can be obtained by a method described in Examples.

The thickness of the heat-shrinkable substrate layer is not limited as long as the thickness is within a range in which heat shrinkage is possible; however, from the viewpoints of $CO_2$ barrier properties, heat shrinkability, and label strength, the thickness of the heat-shrinkable substrate layer is preferably from 10 to 300 µm, more preferably from 15 to 100 µm, even more preferably from 15 to 80 µm, and yet even more preferably from 15 to 50 µm.

Cured Product Layer

The cured product layer is a layer composed of a cured product of an epoxy resin composition containing an epoxy resin, an epoxy resin curing agent containing an amine-based curing agent, and an unsaturated fatty acid amide having from 14 to 24 carbons.

The thickness of the cured product layer is preferably 0.02 µm or more, more preferably 0.05 µm or more, even more preferably 0.08 µm or more, yet even more preferably 0.1 µm or more, from the viewpoints of $CO_2$ barrier properties and bending resistance. In addition, from the viewpoints of conformability during heat shrinking, adhesiveness to heat-shrinkable substrate layer, transparency, thinning, and cost efficiency, the thickness of the cured product layer is preferably 1.0 µm or less, more preferably 0.6 µm or less, and even more preferably 0.5 µm or less. The thickness above is a thickness per layer of the cured product layer.

In the heat-shrinkable label of the present invention, the components in the epoxy resin composition constituting the cured product layer and the preferred aspects thereof are the same as those of the epoxy resin composition according to the first invention.

Constitution of Heat-Shrinkable Label

The label of the present invention may include a heat-shrinkable substrate layer and at least one layer of a cured product layer of the epoxy resin composition. From the viewpoint of heat shrinkability and thinning of the label, the label of the present invention preferably has a constitution having only one layer of the heat-shrinkable substrate layer and only one layer of the cured product layer. Furthermore, from the viewpoint of adhesiveness between the heat-shrinkable substrate layer and the cured product layer, the heat-shrinkable substrate layer is preferably adjacent to the cured product layer.

Figure 11:
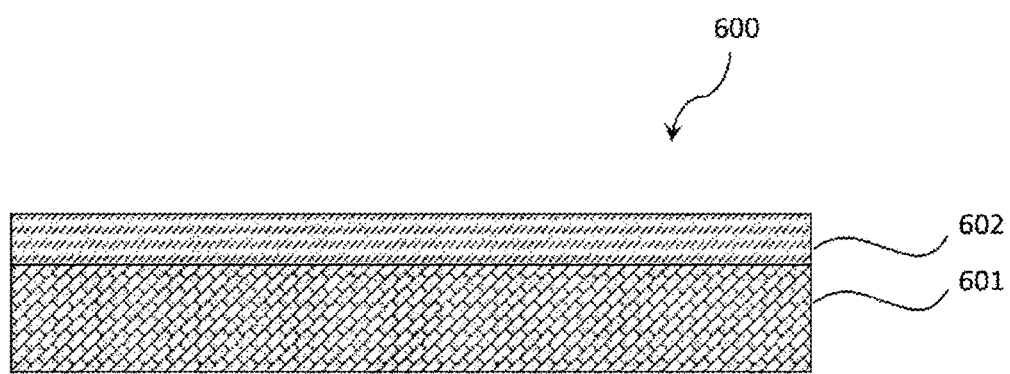
FIG. 11 is a schematic cross-sectional view illustrating a heat-shrinkable label 600 according to an embodiment of the third invention.
Figure 12:
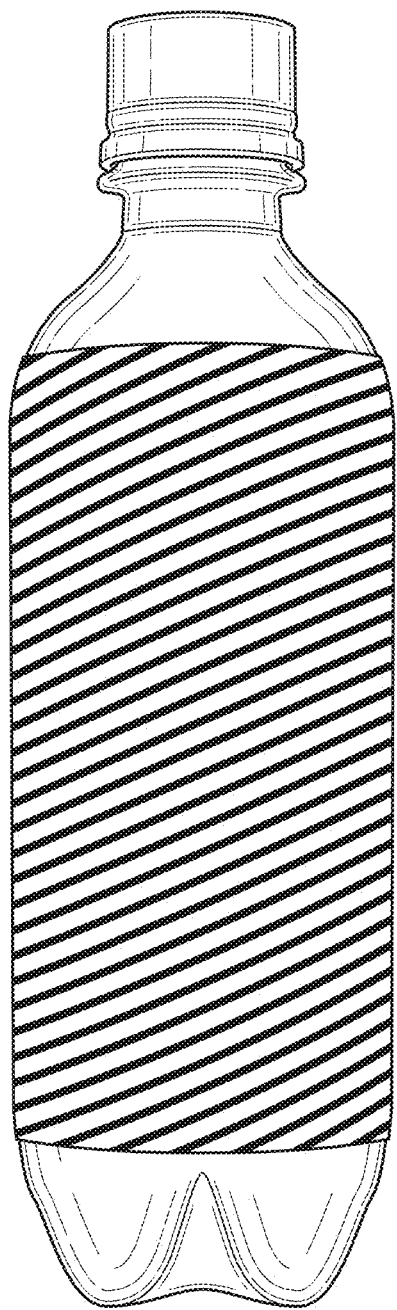
FIG. 12 is an explanatory image illustrating a location of placement of a heat-shrinkable label on a PET bottle during an evaluation of an example.

An example of a preferred layer constitution of the heat-shrinkable label includes the constitution illustrated in FIG. 11.

FIG. 11 is a schematic cross-sectional view illustrating a heat-shrinkable label 600 according to an embodiment of the invention. The heat-shrinkable label 600 illustrated in FIG. 11 has a constitution in which a cured product layer 602 is provided on the surface of one side of a heat-shrinkable label layer 601, the heat-shrinkable label layer 601 being adjacent to the cured product layer 602.

The surface of the heat-shrinkable label 600 in contact with the target object may be either the surface on side of the heat-shrinkable substrate layer 601 or the surface on the side of the cured product layer 602.

The heat-shrinkable label 600 preferably further includes an ink layer (not illustrated) such as a printed layer. The ink layer is a layer composed of, for example, an ink containing a colorant such as a pigment and a binder resin; the ink layer can be provided on the surface on the side of the heat-shrinkable substrate layer 601 of the heat-shrinkable label 600 illustrated in FIG. 11, on the surface on the side of the cured product layer 602 of the heat-shrinkable label 600 illustrated in FIG. 11, or between the heat-shrinkable substrate layer 601 and the cured product layer 602.

That is, when the heat-shrinkable label of the present invention includes an ink layer, examples of the layer constitution of the heat-shrinkable label can be any one of a constitution of heat-shrinkable substrate layer/cured product layer/ink layer, a constitution of ink layer/heat-shrinkable substrate layer/cured product layer, and a constitution of heat-shrinkable substrate layer/ink layer/cured product layer. Among these, a layer constitution of heat-shrinkable substrate layer/cured product layer/ink layer or ink layer/heat-shrinkable substrate layer/cured product layer is preferred.

Two or more layers of the ink layer may be provided. Note that in the layer constitution described above, the surface of the heat-shrinkable label 100 in contact with the target object can be any, and can be the surface of the ink layer.

The ink layer does not have to be formed on the entire surface of the heat-shrinkable label, and may be formed on at least a portion of the heat-shrinkable label. Further, from the viewpoint of imparting a display function as a label, the ink layer is preferably one to which characters, logos, patterns and the like are applied, and is preferably formed by a well-known printing method. Examples of the printing method include a gravure printing method, a flexographic printing method, a screen printing method, preferably a gravure printing method from the viewpoint of productivity.

However, the heat-shrinkable label of the present invention is not limited to one having the layer constitution illustrated in FIG. 11. Additionally, the label may further include an optional layer, such as a primer layer, an adhesive layer, a surface protective layer, or a vapor-deposited layer (not illustrated) laminated: between the heat-shrinkable substrate layer 601 and the cured product layer 602; on the surface of the heat-shrinkable substrate layer 1 in which the cured product layer 2 is not provided; or on the upper surface of the cured product layer 602 (the surface that is not adjacent to the heat-shrinkable substrate layer 601).

However, as described above, the heat-shrinkable substrate layer 601 is preferably adjacent to the cured product layer 602, and it is preferable that no primer layer or anchor coat layer is included between the heat-shrinkable substrate layer 601 and the cured product layer 602.

The thickness of the heat-shrinkable label is not particularly limited as long as the thickness is within a range in which heat shrinkage is possible; however, from the viewpoints of $CO_2$ barrier properties, heat shrinkability, and label strength, the thickness of the heat-shrinkable label is preferably from 20 to 300 µm, more preferably from 20 to 120 µm, even more preferably from 20 to 100 µm, and yet even more preferably from 20 to 60 µm.

Form of Heat-Shrinkable Label

The heat-shrinkable label of the present invention is preferably a label placed on the outer surface of a target object, which is the subject of $CO_2$ transmission prevention. The target object is preferably a container, and the container is preferably a bottle. Typically, the target object for the label includes PET bottles for carbonated water or carbonated beverages.

Specific forms of the heat-shrinkable label of the present invention include: a heat-shrinkable label having a tubular shape, which is placed on the outer surface of a container after both ends of a long label are sealed together to form a tubular shape; and a wrapping type heat-shrinkable label, in which one end of a long label is attached to a container, and, after the label is wrapped around the container, overlapping the other end with the one end to form a tubular shape. Among these, from the viewpoint of using the label on a PET bottle, the label of the present invention is preferably a heat-shrinkable label having a tubular shape.

The heat-shrinkable label having a tubular shape can be produced by, for example, by overlapping one end of a long heat-shrinkable label with the other end, preferably with the heat-shrinkable direction being the circumferential direction, and then sealing the overlapped portion with a solvent or an adhesive.

Characteristics of Heat-Shrinkable Label

The heat shrinkage ratio of the heat-shrinkable label of the present invention after heating at 150° C. for 30 seconds is preferably from 1.0 to 80%, more preferably from 1.0 to 50%, even more preferably from 2.0 to 20%, yet even more preferably from 2.0 to 10%. When the heat shrinkage ratio is 1.0% or more, the heat shrinkability required for the resulting label to adhere to the surface of the target object can be obtained; and when the heat shrinkage ratio is 80% or less, the conformability of the cured product layer and the ink layer formed on the label at the time of heat shrinking is good.

The heat shrinkage ratio of the heat-shrinkable label can be determined by the same method for obtaining the heat shrinkage ratio of the heat-shrinkable substrate.

Method for Producing Heat-Shrinkable Label

The method for producing the heat-shrinkable label of the present invention is not limited, but the heat-shrinkable label of the present invention is preferably produced by a production method including the following (I) and (II) sequentially. By using the production method, heat shrinkage of the label during production can be suppressed, and the heat-shrinkable label can be produced with high productivity.

(I): Applying an epoxy resin composition containing an epoxy resin, an epoxy resin curing agent containing an amine-based curing agent, an unsaturated fatty acid amide having from 14 to 24 carbons, and a solvent on a surface of at least one side of a heat-shrinkable substrate and forming a coating layer (II): Heating and drying the coating layer at a temperature of less than 100° C. and removing the solvent Step (I)

In (I), an epoxy resin composition containing an epoxy resin, an epoxy resin curing agent containing an amine-based curing agent, an unsaturated fatty acid amide having from 14 to 24 carbons, and a solvent is applied on the surface of at least one side of a heat-shrinkable substrate and a coating layer is formed.

The heat-shrinkable substrate, the epoxy resin composition, and the preferred aspects thereof are the same as described above.

For example, when producing the heat-shrinkable label 600 having the constitution illustrated in FIG. 11, the epoxy resin composition is applied to one surface of the heat-shrinkable substrate at a desired thickness. Examples of the application method for applying the epoxy resin composition include bar coating, Meyer bar coating, air knife coating, gravure coating, reverse gravure coating, micro gravure coating, micro reverse gravure coating, die coating, slot die coating, vacuum die coating, dip coating, spin coating, roll coating, spray coating, and coating with a brush. Among these, bar coating, roll coating, or spray coating is preferred, and gravure coating, reverse gravure coating, micro gravure coating, or micro reverse gravure coating is industrially preferred.

Step (II)

In (II), the coating layer formed in (I) is heated and dried at a temperature of less than 100° C. and the solvent is removed. The epoxy resin composition used in the formation of the coating layer includes an unsaturated fatty acid amide having from 14 to 24 carbons, and thus the drying speed is fast. As such, drying at a relatively low temperature is easy, and heat shrinkage of the label during production can be suppressed.

From the viewpoint of suppressing heat shrinkage during production, the heating and drying temperature in (II) is preferably from 40 to 90° C., more preferably from 50 to 80° C., and even more preferably from 50 to 70° C. Further, the heating and drying time is preferably from 5 to 180 seconds, more preferably from 10 to 120 seconds, and even more preferably from 10 to 60 seconds.

After the heating and drying has been performed, the epoxy resin composition is cured and a cured product layer is formed. The curing temperature can be selected, for example, in a range from 10 to 100° C., preferably in a range from 10 to 80° C., more preferably in a range from 10 to 50° C. Furthermore, the curing time can be selected, for example, in a range from 0.5 to 200 hours, preferably in a range from 2 to 100 hours.

When the heat-shrinkable label includes the ink layer, a step of forming the ink layer can be performed between (I) and (II), or after (II). The ink layer can be formed by a known printing method, such as a gravure printing method, a flexographic printing method, and a screen printing method.

After the above steps are performed, the label is formed into a desired shape, resulting in, for example, a long heat-shrinkable label, or a heat-shrinkable label having a tubular shape.

Heat-Shrunken Label, Bottle

The present invention provides a heat-shrunken label produced by heat-shrinking the heat-shrinkable label and a bottle having the heat-shrunken label.

The bottle having the heat-shrunken label is preferably a PET bottle. The heat-shrunken label may cover at least a portion of the outer surface of the bottle, preferably an aspect in which the outer peripheral side surface of the bottle is covered.

Examples of the method of producing a bottle having a heat-shrunken label include a method which includes placing a heat-shrinkable label having a tubular shape on the outer peripheral side surface of a bottle or wrapping a long heat-shrinkable label on the outer peripheral side surface of a bottle, and then heat-shrinking the label.

The method of heat-shrinking the heat-shrinkable label can be performed by a known method using a hot air dryer, a heater, steam, hot water, and the like. Examples thereof include a method which includes placing a heat-shrinkable label on a target object, such as a bottle, and then having the resulting object go through an atmosphere heated with a hot air drier, a heater, steam, or the like, or a method which includes placing a heat-shrinkable label on a target object, such as a bottle, and then immersing the resulting object in hot water.

The heat shrinkage conditions of the heat-shrinkable label can be selected as appropriate depending on the type of the heat-shrinkable substrate and the like, but from the viewpoints of heat shrinkability and productivity, the heating temperature is preferably 70° C. or more, more preferably 80° C. or more, even more preferably 85° C. or more. In addition, from the viewpoint of suppressing thermal degradation of the bottle and the contents thereof, the heating temperature is preferably less than 100° C., more preferably 95° C. or less.

Furthermore, from the viewpoint of suppressing thermal degradation of the bottle and the contents thereof and the viewpoint of productivity, the heating time is preferably from 0.5 to 120 seconds, more preferably from 2 to 60 seconds, and even more preferably from 3 to 20 seconds.

$CO_2$ Transmission Prevention Method

The present invention provides a $CO_2$ transmission prevention method using the heat-shrinkable label or the heat-shrunken label.

The target object for a label, which is the subject of $CO_2$ transmission prevention, is preferably a container. The container is preferably a bottle, more preferably a PET bottle.

Examples of a preferred aspect of the $CO_2$ transmission prevention method of the present invention include: (1) a method which includes covering at least a portion of the outer surface of a container, which is the subject of $CO_2$ transmission prevention, with a heat-shrunken label, and then sealing and closing tightly contents containing $CO_2$ inside the container; (2) a method which includes sealing and closing tightly contents containing $CO_2$ inside a container, which is the subject of $CO_2$ transmission prevention, and then covering at least a portion of the outer surface of the container with a heat-shrunken label. By these methods, transmission of $CO_2$ inside a container to the outside of the container can be suppressed.

The heat-shrunken label may cover at least a portion of the outer surface of a container, preferably an aspect in which the outer peripheral side surface of a container is covered. The method of covering at least a portion of the outer surface of a container with the heat-shrunken label can be performed in the same manner as the method described in the section of the heat-shrunken label and bottle above.

Examples of the contents containing $CO_2$ include carbonated water and other carbonated beverages.

According to the $CO_2$ transmission prevention method of the present invention, it is possible to effectively suppress the transmission of $CO_2$ injected and sealed inside a container or the like, which is the object to be adhered to by a label, to the outside.

EXAMPLES

Next, the present invention will be described specifically with reference to examples. However, the present invention is not limited in any way by these examples.

First Invention (1): Production and Evaluation of Epoxy Resin Composition and Gas Barrier Laminate Measurements and evaluations in the present examples were performed by the following methods.

Thickness of Cured Resin Layer

The thickness was measured using a multilayer film thickness measuring device ("DC-8200" available from Gunze Limited).

Haze

The haze was measured in accordance with JIS K7136:2000, using a color/turbidity simultaneous measuring device ("COH400" available from Nippon Denshoku Industries Co., Ltd.).

Total Light Transmittance

The total light transmittance was measured in accordance with JIS K7361-1:1997, using a color/turbidity simultaneous measuring device ("COH400" available from Nippon Denshoku Industries Co., Ltd.).

YI

The YI was measured in accordance with JIS K7373:2006, using a color/turbidity simultaneous measuring device ("COH400" available from Nippon Denshoku Industries Co., Ltd.).

Blocking

The vacuum-deposited alumina surface of a piece of 210 mm×297 mm alumina vapor-deposited PET ("Barrialox 1011HG Non-coated" available from Toray Advance Film Co., Ltd., thickness: 12 µm) was coated with the epoxy resin composition according to the method described in each of the examples, and drying was performed to form a resin composition layer; the resulting product was then placed on a horizontal surface. On the surface of the resin composition layer, another piece of the 210 mm×297 mm alumina-vacuum-deposited PET, prepared separately, was laminated, such that the PET side of the alumina-vacuum-deposited PET faced the surface of the resin composition layer. An A4 size weight having a mass of 15 kg was placed thereon, and aging was performed by heating at 40° C. for 2 days with the load applied. After aging, the weight was removed, and the state of blocking when the alumina-vacuum-deposited PET laminated later was manually peeled away from the surface of the cured resin layer was evaluated according to the following criteria.

A: No blocking occurred, and the alumina-vacuum-deposited PET could be easily peeled off B: Blocking occurred, and while the alumina-vacuum-deposited PET could be peeled off, the increase of haze of the gas barrier laminate after peeling was observed C: Blocking occurred, and the alumina-vacuum-deposited PET could not be peeled off Peel Strength of Laminate (at the Normal State)

The peel strength (g/15 mm) of the laminate (II) or laminate (III) obtained from each of the examples was measured in accordance with the method stipulated by JIS K6854-3:1999, by a T-peel test at a peel rate of 300 mm/min.

Peel Strength of Laminate (after Retort Treatment)

The laminate (II) or laminate (III) obtained from each of the examples was subjected to a retort treatment at 121° C. for 30 minutes or at 130° C. for 30 minutes using a retort food autoclave ("SR-240" available from Tomy Seiko Co., Ltd.), and then the peel strength (g/15 mm) of the laminate (II) or laminate (III) obtained from each of the examples was measured in accordance with the method stipulated by JIS K6854-3:1999, by a T-peel test at a peel rate of 300 mm/min. The larger the value of the peel strength, the better the retort resistance. Note that, those in which delamination occurred during the test were marked by "peeling" in the table.

Oxygen Transmission Rate (Cc/(m²·Day·Atm))

The oxygen transmission rates of the alumina vapor-deposited PET used in each of the examples and of the gas barrier laminate obtained in each of the examples were measured using an oxygen transmission rate measuring device ("OX-TRAN 2/21" available from Modern Controls Inc.) at a temperature of 23° C. and a relative humidity of 60%.

Water Vapor Transmission Rate (g/(m²·Day))

The water vapor transmission rate of the gas barrier laminate obtained in each of the examples was measured using a water vapor transmission rate measurement device (PERMATRAN-W 1/50 available from MOCON, Inc.) at a temperature of 40° C. and a relative humidity of 90%.

Production Example 1 (Preparation of Epoxy Resin Curing Agent Solution A)

A reaction vessel was charged with 1 mol of meta-xylylenediamine (MXDA). The temperature was raised to 60° C. under a nitrogen stream, and 0.93 mol of methyl acrylate was added dropwise over 1 hour. The temperature was increased to 165° C. while generated methanol was distilled off, and the temperature was then maintained at 165° C. for 2.5 hours, and thereby an amine-based curing agent was obtained. Methanol was added dropwise over 1.5 hours, after which 3-aminopropyltriethoxysilane ("KBE—903" available from Shin-Etsu Chemical Co., Ltd.), which is a silane coupling agent, was added, and an epoxy resin curing agent solution A containing 62.2 mass % of the amine-based curing agent, 2.8 mass % of 3-aminopropyltriethoxysilane, and 35 mass % of methanol was obtained.

Production Example 2 (Preparation of Epoxy Resin Curing Agent Solution B)

A reaction vessel was charged with 1 mol of meta-xylylenediamine (MXDA). The temperature was raised to 60° C. under a nitrogen stream, and 0.93 mol of methyl acrylate was added dropwise over 1 hour. The temperature was increased to 165° C. while generated methanol was distilled off, and the temperature was then maintained at 165° C. for 2.5 hours, and thereby an amine-based curing agent was obtained. Methanol was added dropwise over 1.5 hours, and an epoxy resin curing agent solution B containing 65.0 mass % of the amine-based curing agent and 35 mass % of methanol was obtained.

Example 1-1 (Preparation of Epoxy Resin Composition 1-1)

Amounts of 421.2 g of methanol and 433.8 g of ethyl acetate, as a diluting solvent, and 7.7 g of a dispersion liquid of plate-shaped alumina particles coated with an organic-based coating ("KOS-A2EOK5-10" available from Kawaken Fine Chemicals Co., Ltd., an ethanol dispersion liquid, solid content concentration: 10 mass %, average primary particle size of the alumina particles: 20 nm) were added, and the mixture was stirred well. Next, 16 g of the epoxy resin curing agent solution A obtained in Production Example 1 was added, and the mixture was stirred. To this mixture, 5 g of an epoxy resin ("TETRAD-X" available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)=1.2] as an epoxy resin and 1.54 g of an erucic acid amide ("ALFLOW P-10", available from NOF CORPORATION) were added and stirred. Thus, an epoxy resin composition 1-1 was prepared. The blending amount of the erucic acid amide is 10 parts by mass per 100 parts by mass of the total amount of the epoxy resin in the epoxy resin composition 1-1 and the nonvolatile content in the epoxy resin curing agent solution A.

Example 1-2 (Preparation of Epoxy Resin Composition 1-2)

An epoxy resin composition 1-2 was prepared in the same manner as in Example 1-1 except that the blending amount of the diluting solvent were changed to 67.2 g of methanol and 79.7 g of ethyl acetate from the numbers described in Example 1-1.

Example 2-1 (Preparation of Epoxy Resin Composition 2-1)

An epoxy resin composition 2-1 was prepared in the same manner as in Example 1-1 except that 1.54 g of an oleic acid amide ("ALFLOW E-10", available from NOF CORPORATION) was used instead of the erucic acid amide described in Example 1-1.

Example 2-2 (Preparation of Epoxy Resin Composition 2-2)

An epoxy resin composition 2-2 was prepared in the same manner as in Example 1-2 except that 1.54 g of an oleic acid amide ("ALFLOW E-10", available from NOF CORPORATION) was used instead of the erucic acid amide described in Example 1-2.

Example 3 (Preparation of Epoxy Resin Composition 3)

An epoxy resin composition 3 was prepared in the same manner as in Example 1-1 except that the blending amount of methanol was changed to 402.2 g, the blending amount of ethyl acetate was changed to 414.8 g, and the blending amount of erucic acid amide was changed to 0.77 g from the numbers described in Example 1-1.

Example 4 (Preparation of Epoxy Resin Composition 4)

Amounts of 382.7 g of methanol and 388.3 g of ethyl acetate, as a diluting solvent, and 16 g of the epoxy resin curing agent solution A obtained in Production Example 1 were added, and the mixture was stirred. To this mixture, 5 g of an epoxy resin ("TETRAD-X" available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)=1.2] as an epoxy resin and 0.462 g of an erucic acid amide were added and stirred. Thus the an epoxy resin composition 4 was prepared.

Example 5-1 (Preparation of Epoxy Resin Composition 5-1)

An epoxy resin composition 5-1 was prepared in the same manner as in Example 4 except that the blending amount of methanol was changed to 395.8 g, the blending amount of ethyl acetate was changed to 390.2 g, and the blending amount of erucic acid amide was changed to 0.77 g from the numbers described in Example 4.

Example 5-2 (Preparation of Epoxy Resin Composition 5-2)

An epoxy resin composition 5-2 was prepared in the same manner as in Example 5-1 except that the blending amount of methanol was changed to 121.0 g while the blending amount of ethyl acetate was changed to 126.6 g from the numbers described in Example 5-1.

Example 5-3 (Preparation of Epoxy Resin Composition 5-3)

An epoxy resin composition 5-3 was prepared in the same manner as in Example 5-1 except that the blending amount of methanol was changed to 67.2 g while the blending amount of ethyl acetate was changed to 72.8 g from the numbers described in Example 5-1.

Example 6 (Preparation of Epoxy Resin Composition 6)

An epoxy resin composition 6 was prepared in the same manner as in Example 4 except that the blending amount of methanol was changed to 403.3 g, the blending amount of ethyl acetate was changed to 397.7 g, and the blending amount of the erucic acid amide was changed to 1.078 g from the numbers described in Example 4.

Example 7 (Preparation of Epoxy Resin Composition 7)

An epoxy resin composition 7 was prepared in the same manner as in Example 4 except that the blending amount of methanol was changed to 414.8 g, the blending amount of ethyl acetate was changed to 409.2 g, and the blending amount of the erucic acid amide was changed to 1.54 g from the numbers described in Example 4.

Example 8 (Preparation of Epoxy Resin Composition 8)

An epoxy resin composition 8 was prepared in the same manner as in Example 4 except that 0.462 g of an oleic acid amide was used instead of the erucic acid amide described in Example 4.

Example 9 (Preparation of Epoxy Resin Composition 9)

An epoxy resin composition 9 was prepared in the same manner as in Example 5-1 except that 0.77 g of an oleic acid amide was used instead of the erucic acid amide described in Example 5-1.

Example 10 (Preparation of Epoxy Resin Composition 10)

An epoxy resin composition 10 was prepared in the same manner as in Example 6 except that an oleic acid amide was used instead of the erucic acid amide described in Example 6.

Example 11 (Preparation of Epoxy Resin Composition 11)

An epoxy resin composition 11 was prepared in the same manner as in Example 7 except that 1.078 g of an oleic acid amide was used instead of the erucic acid amide described in Example 7.

Example 12 (Preparation of Epoxy Resin Composition 12)

Amounts of 349.1 g of methanol and 337.9 g of ethyl acetate, as a diluting solvent, and 6.2 g of a dispersion liquid of plate-shaped alumina particles coated with an organic-based coating ("KOS-A2EOK5-10" available from Kawaken Fine Chemicals Co., Ltd., an ethanol dispersion liquid, solid content concentration: 10 mass %) were added, and the mixture was stirred well. Next, 16 g of the epoxy resin curing agent solution A obtained in Production Example 1 was added, and the mixture was stirred. To this mixture, 2 g of an epoxy resin ("TETRAD-X" available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)=3.0] as an epoxy resin and 1.24 g of an erucic acid amide were added and stirred. Thus, an epoxy resin composition 12 was prepared.

Example 13 (Preparation of Epoxy Resin Composition 13)

Amounts of 326.4 g of methanol and 315.6 g of ethyl acetate, as a diluting solvent, and 5.8 g of a dispersion liquid of plate-shaped alumina particles coated with an organic-based coating ("KOS-A2EOK5-10" available from Kawaken Fine Chemicals Co., Ltd.) were added, and the mixture was stirred well. Next, 16 g of the epoxy resin curing agent solution A obtained in Production Example 1 was added, and the mixture was stirred. To this mixture, 1.2 g of an epoxy resin ("TETRAD-X" available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)=5.0] as an epoxy resin and 1.16 g of an erucic acid amide were added and stirred. Thus, an epoxy resin composition 13 was prepared.

Example 14-1 (Preparation of Epoxy Resin Composition 14-1)

Amounts of 318.8 g of methanol and 313.2 g of ethyl acetate, as a diluting solvent, and 16 g of the epoxy resin curing agent solution A obtained in Production Example 1 were added, and the mixture was stirred. To this mixture, 2 g of an epoxy resin ("TETRAD-X" available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)=3.0] as an epoxy resin and 0.62 g of an erucic acid amide were added and stirred. Thus, an epoxy resin composition 14-1 was prepared.

Example 14-2 (Preparation of Epoxy Resin Composition 14-2)

An epoxy resin composition 14-2 was prepared in the same manner as in Example 14-1 except that the blending amount of methanol was changed to 118.0 g while the blending amount of ethyl acetate was changed to 123.6 g from the numbers described in Example 14-1.

Example 14-3 (Preparation of Epoxy Resin Composition 14-3)

An epoxy resin composition 14-3 was prepared in the same manner as in Example 14-1 except that the blending amount of methanol was changed to 52.9 g while the blending amount of ethyl acetate was changed to 58.5 g from the numbers described in Example 14-1.

Example 15 (Preparation of Epoxy Resin Composition 15)

Amounts of 298.3 g of methanol and 292.7 g of ethyl acetate, as a diluting solvent, and 16 g of the epoxy resin curing agent solution A obtained in Production Example 1 were added, and the mixture was stirred. To this mixture, 1.2 g of an epoxy resin ("TETRAD-X" available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)=5.0] as an epoxy resin and 0.58 g of an erucic acid amide were added and stirred. Thus, an epoxy resin composition 15 was prepared.

Example 16 (Preparation of Epoxy Resin Composition 16)

An epoxy resin composition 16 was prepared in the same manner as in Example 5-1 except that 16 g of an epoxy resin curing agent B was used instead of the epoxy resin curing agent A described in Example 5-1.

Comparative Example 1-1 (Preparation of Comparative Epoxy Resin Composition 1-1)

A comparative epoxy resin composition 1-1 was prepared in the same manner as in Example 1-1 except that 1.54 g of a stearic acid amide was used instead of the erucic acid amide described in Example 1-1.

Comparative Example 1-2 (Preparation of Comparative Epoxy Resin Composition 1-2)

A comparative epoxy resin composition 1-2 was prepared in the same manner as in Example 1-2 except that 1.54 g of a stearic acid amide was used instead of the erucic acid amide described in Example 1-2.

Comparative Example 2-1 (Preparation of Comparative Epoxy Resin Composition 2-1)

A comparative epoxy resin composition 2-1 was prepared in the same manner as in Example 1-1 except that the blending amount of methanol was changed to 383.5 g while the blending amount of ethyl acetate was changed to 396.0 g from the numbers described in Example 1-1, and except that no erucic acid amide was blended.

Comparative Example 2-2 (Preparation of Comparative Epoxy Resin Composition 2-2)

A comparative epoxy resin composition 2-2 was prepared in the same manner as in Example 1-2 except that the blending amount of methanol was changed to 62.5 g while the blending amount of ethyl acetate was changed to 69.7 g from the numbers described in Example 1-2, and except that no erucic acid amide was blended.

Comparative Example 3 (Preparation of Comparative Epoxy Resin Composition 3)

A comparative epoxy resin composition 3 was prepared in the same manner as in Example 4 except that the blending amount of methanol was changed to 371.7 g while the blending amount of ethyl acetate was changed to 377.3 g from the numbers described in Example 4, and except that no erucic acid amide was blended.

Note that the blending amounts in the table are all blending amounts (parts by mass) in terms of effective amounts.

TABLE 1

| | | Epoxy Resin Composition | | | | | | |
|---|---|---|---|---|---|---|---|---|
| | | | Epoxy Resin Curing Agent Solution | | Number of active amine hydrogens in curing agent/Number of epoxy groups in epoxy resin | Fatty Acid Amide | | Plate-shaped Alumina Particle |
| | No. | Epoxy Resin | Silane Coupling Agent Type | Parts by mass *2) | | Type | parts by mass *1) | Parts by mass *2) |
| Example 1-1 | 1-1 | TETRAD-X | A | 3 | 1.2 | Erucic Acid Amide | 10 | 5 |
| Example 1-2 | 1-2 | TETRAD-X | A | 3 | 1.2 | Erucic Acid Amide | 10 | 5 |
| Example 2-1 | 2-1 | TETRAD-X | A | 3 | 1.2 | Oleic Acid Amide | 10 | 5 |
| Example 2-2 | 2-2 | TETRAD-X | A | 3 | 1.2 | Oleic Acid Amide | 10 | 5 |
| Example 3 | 3 | TETRAD-X | A | 3 | 1.2 | Erucic Acid Amide | 5 | 5 |
| Example 4 | 4 | TETRAD-X | A | 3 | 1.2 | Erucic Acid Amide | 3 | — |
| Example 5-1 | 5-1 | TETRAD-X | A | 3 | 1.2 | Erucic Acid Amide | 5 | — |
| Example 5-2 | 5-2 | TETRAD-X | A | 3 | 1.2 | Erucic Acid Amide | 5 | — |
| Example 5-3 | 5-3 | TETRAD-X | A | 3 | 1.2 | Erucic Acid Amide | 5 | — |
| Example 6 | 6 | TETRAD-X | A | 3 | 1.2 | Erucic Acid Amide | 7 | — |
| Example 7 | 7 | TETRAD-X | A | 3 | 1.2 | Erucic Acid Amide | 10 | — |
| Example 8 | 8 | TETRAD-X | A | 3 | 1.2 | Oleic Acid Amide | 3 | — |
| Example 9 | 9 | TETRAD-X | A | 3 | 1.2 | Oleic Acid Amide | 5 | — |
| Example 10 | 10 | TETRAD-X | A | 3 | 1.2 | Oleic Acid Amide | 7 | — |
| Example 11 | 11 | TETRAD-X | A | 3 | 1.2 | Oleic Acid Amide | 10 | — |
| Example 12 | 12 | TETRAD-X | A | 3.7 | 3.0 | Erucic Acid Amide | 10 | — |
| Example 13 | 13 | TETRAD-X | A | 4 | 5.0 | Erucic Acid Amide | 10 | — |

TABLE 1-continued

| | | Epoxy Resin Composition | | | | | | |
|---|---|---|---|---|---|---|---|---|
| | | | Epoxy Resin Curing Agent Solution | | Number of active amine hydrogens in curing agent/Number of groups in epoxy resin | Fatty Acid Amide | | Plate-shaped Alumina Particle |
| | No. | Epoxy Resin | Silane Coupling Agent Type | Parts by mass *2) | | Type | parts by mass *1) | Parts by mass *2) |
| Example 14-1 | 14-1 | TETRAD-X | A | 3.7 | 3.0 | Erucic Acid Amide | 5 | — |
| Example 14-2 | 14-2 | TETRAD-X | A | 3.7 | 3.0 | Erucic Acid Amide | 5 | — |
| Example 14-3 | 14-3 | TETRAD-X | A | 3.7 | 3.0 | Erucic Acid Amide | 5 | — |
| Example 15 | 15 | TETRAD-X | A | 4 | 5.0 | Erucic Acid Amide | 5 | — |
| Example 16 | 16 | TETRAD-X | B | — | 1.2 | Erucic Acid Amide | 5 | — |
| Comparative Example 1-1 | Comparison 1-1 | TETRAD-X | A | 3 | 1.2 | Stearic acid amide | 10 | 5 |
| Comparative Example 1-2 | Comparison 1-2 | TETRAD-X | A | 3 | 1.2 | Stearic acid amide | 10 | 5 |
| Comparative Example 2-1 | Comparison 2-1 | TETRAD-X | A | 3 | 1.2 | — | — | 5 |
| Comparative Example 2-2 | Comparison 2-2 | TETRAD-X | A | 3 | 1.2 | — | — | 5 |
| Comparative Example 3 | Comparison 3 | TETRAD-X | A | 3 | 1.2 | — | — | — |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent Example 17

Production and Evaluation of Gas Barrier Laminate (I)

The alumina vapor-deposited surface of an alumina vapor-deposited PET ("Barrialox 1011HG Non-coated" available from Toray Advanced Film Co., Ltd., thickness: 12 μm, oxygen transmission rate: 2.2 cc/(m²·day·atm)), in which an aluminum oxide (alumina) was vapor-deposited on one surface of the PET, was coated with the epoxy resin composition 1-2 obtained in Example 1-2 using a bar coater No. 3. The epoxy resin composition was heated and dried for 60 seconds at 120° C. (thickness after drying: approximately 0.5 μm), and then cured by heating for two days at 40° C., resulting in a gas barrier laminate (I) having the constitution illustrated in FIG. 1. The obtained gas barrier laminate (I) was used to measure haze and total light transmittance using the methods described above. Furthermore, an alumina vapor-deposited PET was coated with the epoxy resin composition in the same manner and heated and dried for 60 seconds at 120° C. to form a resin composition layer; then, blocking evaluation was performed using the method described above. The results are shown in Table 2.

Production and Evaluation of Gas Barrier Laminate (II)

Furthermore, the surface on the side of the cured resin layer of the obtained gas barrier laminate (I) was coated with a urethane adhesive using a bar coater No. 12, and drying was performed at 80° C. for 10 seconds, forming an adhesive layer (thickness after drying: approximately 3 μm). The urethane adhesive used was prepared by adding 1.05 g of a curing agent CAT-RT85 and 25 g of ethyl acetate as a solvent to 15 g of a primary agent AD-502 and stirring the mixture well. A polypropylene film ("P1146" available from Toyobo Co., Ltd.) having a thickness of 50 μm was bonded on the adhesive layer using a nip roll, and heating was performed for two days at 40° C., resulting in a gas barrier laminate (II) having the constitution illustrated in FIG. 4.

The gas barrier laminate (II) was used to measure oxygen transmission rate and to perform peel tests at the normal state and after a retort treatment using the methods described above. The results are shown in Table 2.

Example 18, Comparative Examples 4 to 5

Gas barrier laminates were produced and evaluated in the same manner as in Example 17 except that the epoxy resin compositions shown in Table 2 were used instead of the epoxy resin composition 1-2. The results are shown in Table 2.

"Reference Example 1" in Table 2 presented the haze and total light transmittance of an alumina vapor-deposited PET by itself. Further, "Reference Example 2" presented the oxygen transmission rate of a laminate in which an alumina vapor-deposited PET and a polypropylene film are bonded together with an adhesive layer without a cured resin layer formed.

TABLE 2

| | | Epoxy Resin Composition | | | | | | |
|---|---|---|---|---|---|---|---|---|
| | | | Epoxy Resin Curing Agent Solution | | Number of active amine hydrogens | | | Plate-shaped Alumina Particle |
| | | | Silane Coupling Agent | | in curing agent/Number of epoxy | Fatty Acid Amide | | |
| | No. | Epoxy Resin | Type | Parts by mass *2) | groups in epoxy resin | Type | parts by mass *1) | Parts by mass *2) |
| Example 17 | 1-2 | TETRAD-X | A | 3 | 1.2 | Erucic Acid Amide | 10 | 5 |
| Example 18 | 2-2 | TETRAD-X | A | 3 | 1.2 | Oleic Acid Amide | 10 | 5 |
| Comparative Example 4 | Comparison 1-2 | TETRAD-X | A | 3 | 1.2 | Stearic acid amide | 10 | 5 |
| Comparative Example 5 | Comparison 2-2 | TETRAD-X | A | 3 | 1.2 | — | — | 5 |
| Reference Example 1 | — | — | — | — | — | — | — | — |
| Reference Example 2 | — | — | — | — | — | — | — | — |

| | Gas Barrier Laminate Evaluation | | | | | | |
|---|---|---|---|---|---|---|---|
| | | Laminate (I) Alumina Vapor-Deposited PET | | | | Laminate (II) Alumina Vapor-Deposited PET | |
| | Thickness of Cured Resin Layer μm | Haze % | Total Light Transmittance % | Blocking | Peel Strength (Normal) g/15 mm | Peel Strength (After Retort) *3) g/15 mm | Oxygen Transmission Rate cc/(m² · day · atm) |
| Example 17 | 0.5 | 5.7 | 89.7 | A | 600 | 170 | 0.48 |
| Example 18 | 0.5 | 5.7 | 88.9 | B | 200 | 135 | 0.34 |
| Comparative Example 4 | 0.5 | 25.9 | 79.8 | — | 175 | 125 | 0.18 |
| Comparative Example 5 | 0.5 | 4.4 | 89.9 | — | 175 | Peeled | 0.21 |
| Reference Example 1 | — | 3.3 | 88.9 | — | — | — | — |
| Reference Example 2 | — | — | — | — | — | — | 1.3 |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent
*3) Processing for 121° C. × 30 min In Table 2, the differences in the effects depending on the type of fatty acid amide were confirmed. Compared to the laminate of Comparative Example 4 in which a stearic acid amide, which is a saturated fatty acid amide having 18 carbons, was used instead of an unsaturated fatty acid amide, and the laminate of Comparative Example 5, which used an epoxy resin composition containing no fatty acid amide, the gas barrier laminates (II) of Examples 17 and 18, which used the epoxy resin composition of the present invention, had a higher peel strength at the normal state and after a retort treatment, that is, had good adhesiveness and retort resistance. Further, the gas barrier laminates (I) had low haze, high total light transmittance, and good transparency.

When comparing Example 17, which used an erucic acid amide as the unsaturated fatty acid amide, to Example 18, which used an oleic acid amide as the unsaturated fatty acid amide, Example 17 was superior to Example 18 in that the resulting gas barrier laminate (II) had higher peel strength, and further, higher blocking suppression effect of the gas barrier laminate (I).

In contrast, the normal peel strength of the gas barrier laminate (II) of Comparative Example 4, in which a stearic acid amide was used as the fatty acid amide, was the same as that of Comparative Example 5, in which no fatty acid amide was blended, and there was no improvement in adhesiveness. Furthermore, the retort resistance of the gas barrier laminate (II) of Comparative Example 4 was also lower than that of Examples 17 and 18, and the haze of the gas barrier laminate (I) was increased, leading to inferior transparency as well.

Examples 19 to 29 (Production and Evaluation of Gas Barrier Laminates (I) and (II)

Gas barrier laminates were produced and evaluated in the same manner as in Example 17 except that the epoxy resin compositions presented in Table 3 were used and that the thickness of the cured resin layers formed were changed to the thickness described in Table 3. The results are shown in Table 3.

TABLE 3

| | | Epoxy Resin Composition | | | | | | Plate-shaped Alumina Particle |
|---|---|---|---|---|---|---|---|---|
| | | | Epoxy Resin Curing Agent Solution | | Number of active amine hydrogens | | | |
| | | | | Silane Coupling Agent | in curing agent/Number | Fatty Acid Amide | | |
| | No. | Epoxy Resin | Type | Parts by mass *2) | groups in epoxy resin | Type | parts by mass *1) | Parts by mass *2) |
| Example 19 | 4 | TETRAD-X | A | 3 | 1.2 | Erucic Acid Amide | 3 | — |
| Example 20 | 5-1 | TETRAD-X | A | 3 | 1.2 | Erucic Acid Amide | 5 | — |
| Example 21 | 6 | TETRAD-X | A | 3 | 1.2 | Erucic Acid Amide | 7 | — |
| Example 22 | 7 | TETRAD-X | A | 3 | 1.2 | Erucic Acid Amide | 10 | — |
| Example 23 | 8 | TETRAD-X | A | 3 | 1.2 | Oleic Acid Amide | 3 | — |
| Example 24 | 9 | TETRAD-X | A | 3 | 1.2 | Oleic Acid Amide | 5 | — |
| Example 25 | 10 | TETRAD-X | A | 3 | 1.2 | Oleic Acid Amide | 7 | — |
| Example 26 | 11 | TETRAD-X | A | 3 | 1.2 | Oleic Acid Amide | 10 | — |
| Example 27 | 16 | TETRAD-X | B | — | 1.2 | Erucic Acid Amide | 5 | — |
| Example 28 | 3 | TETRAD-X | A | 3 | 1.2 | Erucic Acid Amide | 5 | 5 |
| Example 29 | 1-1 | TETRAD-X | A | 3 | 1.2 | Erucic Acid Amide | 10 | 5 |

| | Gas Barrier Laminate Evaluation | | | | | |
|---|---|---|---|---|---|---|
| | | Laminate (I) Alumina Vapor-Deposited PET | | Laminate (II) Alumina Vapor-Deposited PET | | |
| | Thickness of Cured Resin Layer μm | Haze % | Total Light Transmittance % | Blocking | Peel Strength (Normal) g/15 mm | Peel Strength (After Retort) *3) g/15 mm | Oxygen Transmission Rate cc/(m² · day · atm) |
| Example 19 | 0.1 | 3.8 | 89.4 | B | 760 | 215 | |
| Example 20 | 0.1 | 4.1 | 89.6 | A | 590 | 230 | 0.44 |
| Example 21 | 0.1 | 3.9 | 89.5 | A | 660 | 210 | 0.36 |
| Example 22 | 0.1 | 3.8 | 89.6 | A | 690 | 205 | 0.36 |
| Example 23 | 0.1 | 4.8 | 89.4 | B | 705 | 210 | |
| Example 24 | 0.1 | 4.0 | 89.3 | B | 780 | 145 | |
| Example 25 | 0.1 | 5.1 | 89.3 | B | 675 | 190 | |
| Example 26 | 0.1 | 4.4 | 89.5 | B | 640 | 225 | |
| Example 27 | 0.1 | 3.5 | 89.6 | A | 650 | 220 | |
| Example 28 | 0.1 | 4.1 | 89.6 | A | 610 | 195 | |
| Example 29 | 0.1 | 4.1 | 89.5 | A | 605 | 285 | |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent
*3) Processing for 121° C. × 30 min In Table 3, the differences in the effects depending on the type and blending amount of unsaturated fatty acid amide were confirmed. The comparison of Examples 19 to 22 and Examples 23 to 26 indicated that, when an oleic acid amide was used as the unsaturated fatty acid amide, the improvement of blocking regarding the gas barrier laminates (I) was not observed (Examples 23 to 26) even when the blending amount of the oleic acid amide was changed to from 3 to 10 parts by mass per 100 parts by mass of the total amount of the epoxy resin and the curing agent. In contrast, when an erucic acid amide was used, the blocking suppression effect was good when the blending amount of the erucic acid amide was set to 5 parts by mass or more (Examples 19 to 22).

The results of Examples 19 to 22 indicated that, the retort resistance of the gas barrier laminates (II) remained the same even when the blending amount of the erucic acid amide was changed to from 3 to 10 parts by mass per 100 parts by mass of the total amount of the epoxy resin and the curing agent.

The results of Examples 20 and 27 indicated that, the transparency and blocking suppression effect of the gas barrier laminates (I) as well as the adhesiveness and retort resistance of the gas barrier laminates (II) were good, regardless of whether a silane coupling agent was added. Furthermore, the results of Examples 28 and 29 indicated that, the transparency and blocking suppression effect of the resulting gas barrier laminates (I) as well as the adhesiveness and retort resistance of the gas barrier laminates (II) were good even when plate-shaped alumina particles were further blended in the epoxy resin compositions of Examples 20 and 22.

Example 30 [Production and Evaluation of Gas Barrier Laminate (III)]

The alumina vapor-deposited surface of an alumina vapor-deposited PET ("Barrialox 1011HG Non-coated" available from Toray Advanced Film Co., Ltd.) was coated with the epoxy resin composition 1-1 obtained in Example 1-1 using a bar coater No. 3. The epoxy resin composition was heated and dried for 60 seconds at 120° C. (thickness after drying: approximately 0.1 μm), and then cured by heating for two days at 40° C., resulting in a gas barrier laminate (I) having the constitution illustrated in FIG. 1.

The surface on the side of the cured resin layer was coated with a urethane adhesive using a bar coater No. 12, and drying was performed at 80° C. for 10 seconds, forming an adhesive layer (thickness after drying: approximately 3 μm). The urethane adhesive used was prepared by adding 1.05 g of a curing agent CAT-RT85 and 25 g of ethyl acetate as a solvent to 15 g of a primary agent AD-502 and stirring the mixture well. A nylon film having a thickness of 15 μm ("HARDEN Film N1202" available from Toyobo Co., Ltd.) was bonded on the adhesive layer using a nip roll. After forming an adhesive layer on the nylon film in the same manner as above (thickness after drying: approximately 3 μm), a polypropylene film ("P1146" available from Toyobo Co., Ltd.) having a thickness of 50 μm was bonded on the adhesive layer using a nip roll, and heating was performed for two days at 40° C., resulting in a gas barrier laminate (III) illustrated in FIG. 7.

The gas barrier laminate (III) was used to perform peel tests at the normal state and after a retort treatment using the methods described above. The results are shown in Table 4.

Examples 31 to 38, Comparative Examples 6 to 7

Gas barrier laminates (III) were produced and evaluated in the same manner as in Example 30 except that the epoxy resin compositions shown in Table 4 were used instead of the epoxy resin composition 1-1 and that the thickness of the cured resin layers were changed to the thickness presented in Table 4. The results are shown in Table 4.

TABLE 4

| | Epoxy Resin Composition | | | | | | |
|---|---|---|---|---|---|---|---|
| | | | Epoxy Resin Curing Agent Solution | | Number of active amine hydrogens | | |
| | No. | Epoxy Resin | Silane Coupling Agent Type | Parts by mass *2) | in curing agent/Number of epoxy groups in epoxy resin | Fatty Acid Amide Type | parts by mass *1) |
| Example 30 | 1-1 | TETRAD-X | A | 3 | 1.2 | Erucic Acid Amide | 10 |
| Comparative Example 6 | Comparison 2-1 | TETRAD-X | A | 3 | 1.2 | — | — |
| Example 31 | 12 | TETRAD-X | A | 3.7 | 3.0 | Erucic Acid Amide | 10 |
| Example 32 | 13 | TETRAD-X | A | 4 | 5.0 | Erucic Acid Amide | 10 |
| Example 33 | 5-1 | TETRAD-X | A | 3 | 1.2 | Erucic Acid Amide | 5 |
| Example 34 | 16 | TETRAD-X | B | — | 1.2 | Erucic Acid Amide | 5 |

TABLE 4-continued

| | | | | | | | |
|---|---|---|---|---|---|---|---|
| Example 35 | 5-2 | TETRAD-X | A | 3 | 1.2 | Erucic Acid Amide | 5 |
| Example 36 | 5-3 | TETRAD-X | A | 3 | 1.2 | Erucic Acid Amide | 5 |
| Comparative Example 7 | Comparison 3 | TETRAD-X | A | 3 | 1.2 | — | — |
| Example 37 | 14-1 | TETRAD-X | A | 3.7 | 3.0 | Erucic Acid Amide | 5 |
| Example 38 | 15 | TETRAD-X | A | 4 | 5.0 | Erucic Acid Amide | 5 |

| | Epoxy Resin Composition | Gas Barrier Laminate Evaluation Laminate (III) Alumina Vapor Deposited PET | | |
|---|---|---|---|---|
| | shaped Alumina Particle Parts by mass *2) | Thickness of Cured Resin Layer μm | Peel Strength (Normal) g/15 mm | Peel Strength (After Retort) *3) g/15 mm | Peel Strength (After Retort) *4) g/15 mm |
| Example 30 | 5 | 0.1 | 335 | 275 | 235 |
| Comparative Example 6 | 5 | 0.1 | 315 | Peeled | Peeled |
| Example 31 | 5 | 0.1 | 345 | 265 | 125 |
| Example 32 | 5 | 0.1 | 240 | 230 | 140 |
| Example 33 | — | 0.1 | 305 | 280 | 270 |
| Example 34 | — | 0.1 | 310 | 270 | 220 |
| Example 35 | — | 0.3 | 435 | 190 | |
| Example 36 | — | 0.5 | 390 | 160 | |
| Comparative Example 7 | — | 0.1 | 300 | Peeled | Peeled |
| Example 37 | — | 0.1 | 335 | 315 | 255 |
| Example 38 | — | 0.1 | 290 | 215 | 220 |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent
*3) Processing for 121° C. × 30 min
*4) Processing for 130° C. × 30 min From Table 4, the following can be seen.

The gas barrier laminates using the epoxy resin composition of the present invention had good adhesiveness and retort resistance even when having a constitution of the gas barrier laminate (III) illustrated in FIG. 7. Some examples were subjected to a peel test after retort treatment was performed not only at 121° C. for 30 minutes but also under high retort conditions at 130° C. for 30 minutes, but delamination did not occur, and a good retort resistance was confirmed.

According to the comparison of Examples 30 to 32 and the comparison of Examples 33, 37 and 38, when the result of number of active amine hydrogens in curing agent/number of epoxy groups in epoxy resin in epoxy resin composition was in the range from 1.2 to 3.0, the adhesiveness and the retort resistance were better. Further, according to the comparison of Examples 33, 35 and 36, the thinner the cured resin layer, the better the retort resistance.

The results of Examples 33 and 34 indicate that, the gas barrier laminates using the epoxy resin composition of the present invention had good adhesiveness and retort resistance even when having a constitution of the gas barrier laminate (III) illustrated in FIG. 7, regardless of whether a silane coupling agent was added.

Example 39 [Production and Evaluation of Gas Barrier Laminate (III)]

A gas barrier laminate (III) was produced in the same manner as in Example 30, except that the epoxy resin composition 5-1 obtained in Example 5-1 was used and that a silica deposited PET ("TECHBARRIER L" available from Mitsubishi Plastics, Inc., thickness: 12 μm) in which a silicon oxide (silica) was vapor-deposited on one surface of the PET was used instead of the alumina-vacuum-deposited PET, and peel tests at the normal state and after a retort treatment were performed using the methods described above. The results are shown in Table 5.

Examples 40 to 44, Comparative Example 8

Gas barrier laminates (III) were produced and evaluated in the same manner as in Example 39 except that the epoxy resin compositions shown in Table 5 were used and that the thickness of the cured resin layers were changed to the thickness presented in Table 5. The results are shown in Table 5.

TABLE 5

| | Epoxy Resin Composition | | | | |
|---|---|---|---|---|---|
| | | | Epoxy Resin Curing Agent Solution | | Number of active amine hydrogens |
| | No. | Epoxy Resin | Type | Silane Coupling Agent Parts by mass *2) | in curing agent/Number of epoxy groups in epoxy resin |
| Example 39 | 5-1 | TETRAD-X | A | 3 | 1.2 |
| Example 40 | 5-2 | TETRAD-X | A | 3 | 1.2 |
| Example 41 | 5-3 | TETRAD-X | A | 3 | 1.2 |
| Comparative Example 8 | Comparison 3 | TETRAD-X | A | 3 | 1.2 |
| Example 42 | 14-1 | TETRAD-X | A | 3.7 | 3.0 |
| Example 43 | 14-2 | TETRAD-X | A | 3.7 | 3.0 |
| Example 44 | 14-3 | TETRAD-X | A | 3.7 | 3.0 |

| | Epoxy Resin Composition | | | Gas Barrier Laminate Evaluation | |
|---|---|---|---|---|---|
| | Fatty Acid Amide | | Plate-shaped Alumina Particle | Laminate (III) (Silica-deposited PET) | |
| | | | | Thickness of Cured Resin Layer | Peel Strength (Normal) |
| | Type | parts by mass *1) | Parts by mass *2) | μm | g/15 mm |
| Example 39 | Erucic Acid Amide | 5 | — | 0.1 | 440 |
| Example 40 | Erucic Acid Amide | 5 | — | 0.3 | 440 |
| Example 41 | Erucic Acid Amide | 5 | — | 0.5 | 335 |
| Comparative Example 8 | — | — | — | 0.1 | 400 |
| Example 42 | Erucic Acid Amide | 5 | — | 0.1 | 395 |
| Example 43 | Erucic Acid Amide | 5 | — | 0.3 | 480 |
| Example 44 | Erucic Acid Amide | 5 | — | 0.5 | 350 |

Peel Strength (After Retort) *4) g/15 mm:
- Example 39: 175
- Example 40: 185
- Example 41: 205
- Comparative Example 8: Peeled
- Example 42: 210
- Example 43: 165
- Example 44: 150

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent
*4) Processing for 130° C. × 30 min From Table 5, it can be seen that even in the case of gas barrier laminates (III) using the epoxy resin composition of the present invention and using a silica-vacuum-deposited PET, good retort resistance could be obtained as in the case in which an alumina-vacuum-deposited PET was used.

Example 45 [Production and Evaluation of Gas Barrier Laminate (II)]

The vacuum-deposited aluminum surface of an vacuum-deposited aluminum OPP ("MLOP102" available from Mitsui Chemicals Tohcello, Inc., thickness: 25 μm) in which aluminum was vapor-deposited on one surface of a biaxially stretched polypropylene (OPP) was coated with the epoxy resin composition 5-1 obtained in Example 5-1 using a bar coater No. 3. The epoxy resin composition was heated and dried for 30 seconds at 100° C. (thickness after drying: approximately 0.1 μm), and then cured by heating for two days at 40° C., resulting in a gas barrier laminate (I) having the constitution illustrated in FIG. 1.

The surface on the side of the cured resin layer of the obtained gas barrier laminate (I) was coated with a urethane adhesive using a bar coater No. 12, and drying was performed at 80° C. for 10 seconds, forming an adhesive layer (thickness after drying: approximately 3 μm). The urethane adhesive used was prepared by adding 1.05 g of a curing agent CAT-RT85 and 25 g of ethyl acetate as a solvent to 15 g of a primary agent AD-502 and stirring the mixture well. A polypropylene film ("P1146" available from Toyobo Co., Ltd.) having a thickness of 50 μm was bonded on the adhesive layer using a nip roll, and heating was performed for two days at 40° C., resulting in a gas barrier laminate (II) having the constitution of FIG. 4.

The gas barrier laminate (II) was used to perform a peel test at the normal state using the method described above. The result is shown in Table 6.

Example 46

A gas barrier laminate (II) was produced in the same manner as in Example 45 except that the thickness of the cured resin layer formed was changed to the thickness described in Table 6, and a peel test at the normal state was performed using the method described above. The results are shown in Table 6.

Example 47

A gas barrier laminate (II) was produced in the same manner as in Example 45 except that an vacuum-deposited aluminum PET ("MLPET", available from Mitsui Chemicals Tohcello, Inc., thickness: 12 μm) in which aluminum was vapor-deposited on one surface of a PET was used instead of the vacuum-deposited aluminum OPP in Example 45, and a peel test at the normal state was performed using the method described above. The results are shown in Table 6.

Comparative Example 9

A gas barrier laminate was produced in the same manner as in Example 45 except that a cured resin layer was not formed, and a peel test at the normal state was performed using the method described above. The result is shown in Table 6.

TABLE 6

| | Epoxy Resin Composition | | | | | |
|---|---|---|---|---|---|---|
| | | | | | Number of active amine hydrogens in curing agent/Number of epoxy groups in epoxy resin | |
| | | | Epoxy Resin Curing Agent Solution | | | |
| | No. | Epoxy Resin | Type | Silane Coupling Agent Parts by mass *2) | | Type |
| Example 45 | 5-1 | TETRAD-X | A | 3 | 1.2 | Erucic Acid Amide |
| Example 46 | 5-2 | TETRAD-X | A | 3 | 1.2 | Erucic Acid Amide |
| Example 47 | 5-1 | TETRAD-X | A | 3 | 1.2 | Erucic Acid Amide |
| Comparative Example 9 | — | — | — | — | — | — |

| | Epoxy Resin Composition | | Gas Barrier Laminate Evaluation | | |
|---|---|---|---|---|---|
| | parts by mass *1) | Plate-shaped Alumina Particle Parts by mass *2) | Thickness of Cured Resin Layer μm | Laminate (II) (Al-deposited OPP) Peel Strength (Normal) g/15 mm | Laminate (II) (Al-deposited PET) Peel Strength (Normal) g/15 mm |
| Example 45 | 5 | — | 0.1 | 555 | |
| Example 46 | 5 | — | 0.3 | 515 | |
| Example 47 | 5 | — | 0.1 | | 265 |
| Comparative Example 9 | — | — | — | 490 | |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent From Table 6, it can be seen that the cured product of the epoxy resin composition of the present invention exhibits good adhesiveness to aluminum as well.

Example 48 [Production and Evaluation of Gas Barrier Laminate (IIIc)]

One surface of a PET ("E5100" available from Toyobo Co., Ltd., thickness: 12 μm) as a substrate was coated with the urethane adhesive using a bar coater No. 12, and drying was performed at 80° C. for 10 seconds, forming an adhesive layer (thickness after drying: approximately 3 μm). An aluminum foil ("1N31" available from Mitsubishi Aluminum Co., Ltd.) having a thickness of 7 μm was bonded on the adhesive layer.

Next, the aluminum foil was coated with the epoxy resin composition 5-1 obtained in Example 5-1 using a bar coater No. 3; heating and drying were performed for 60 seconds at 120° C. (thickness after drying: approximately 0.1 µm), and then curing by heating was performed for two days at 40° C., forming a cured resin layer. An adhesive layer was formed on the surface on the side of the cured resin layer using the urethane adhesive in the same manner as described above (thickness after drying: approximately 3 µm). A polypropylene film ("P1146" available from Toyobo Co., Ltd.) having a thickness of 50 µm was bonded on the adhesive layer using a nip roll, and heating was performed for two days at 40° C., resulting in a gas barrier laminate (IIIc) having the constitution of FIG. 9.

The gas barrier laminate (IIIc) was used to perform peel tests at the normal state and after a retort treatment using the methods described above. The results are shown in Table 7.

Example 49

A gas barrier laminate (IIIc) was produced in the same manner as in Example 48 except that the epoxy resin composition 14-1 obtained in Example 14-1 was used, and peel tests at the normal state and after a retort treatment were performed using the methods described above. The results are shown in Table 7.

Comparative Example 10

A gas barrier laminate was produced in the same manner as in Example 48 except that a cured resin layer was not formed, and peel tests at the normal state and after a retort treatment were performed using the methods described above. The results are shown in Table 7.

drying: approximately 0.1 µm), and then cured by heating for two days at 40° C., forming a cured resin layer. A vacuum-deposited silica layer having a thickness of approximately 170 Å was formed on the surface of the cured resin layer by a vacuum vapor deposition method, resulting in a gas barrier laminate (Ia) having the constitution illustrated in FIG. 2. The obtained gas barrier laminate (Ia) was used to measure oxygen transmission rate and water vapor transmission rate using the methods described above. The results are shown in Table 8.

Production and Evaluation of Gas Barrier Laminate (IIa)

Furthermore, the urethane adhesive was coated onto the vacuum-deposited silica surface of the obtained gas barrier laminate (Ia) using a bar coater No. 12, and drying was performed at 80° C. for 10 seconds, forming an adhesive layer (thickness after drying: approximately 3 µm). A polypropylene film ("P1146" available from Toyobo Co., Ltd.) having a thickness of 50 µm was bonded on the adhesive layer using a nip roll, and heating was performed for two days at 40° C., resulting in a gas barrier laminate (IIa) having the constitution illustrated in FIG. 5.

The gas barrier laminate (IIa) was used to perform peel tests at the normal state and after a retort treatment using the methods described above. The results are shown in Table 8.

Comparative Example 11

A gas barrier laminate was produced in the same manner as in Example 50 except that a cured resin layer was not formed; then, the oxygen transmission rate and water vapor transmission rate were measured using the methods described above, and peel tests at the normal state and after a retort treatment were performed using the methods described above. The results are shown in Table 8.

TABLE 7

| | | Epoxy Resin Composition | | | | | | Gas Barrier Laminate Evaluation | | |
| | | | | Curing Agent Solution | Number of active amine hydrogens | | | Plate- | Laminate (IIIc) (PET + Al Foil) | | |
| | No. | Epoxy Resin | Silane Coupling Agent Type | Parts by mass *2) | in curing agent/Number of epoxy groups in epoxy resin | Fatty Acid Amide Type | parts by mass *1) | shaped Alumina Particle Parts by mass *2) | Thickness of Cured Resin Layer µm | Peel Strength (Normal) g/15 mm | Peel Strength (After Retort) *4) g/15 mm |
|---|---|---|---|---|---|---|---|---|---|---|---|
| Example 48 | 5-1 | TETRAD-X | A | 3 | 1.2 | Erucic Acid Amide | 5 | — | 0.1 | 1050 | 955 |
| Example 49 | 14-1 | TETRAD-X | A | 3.7 | 3.0 | Erucic Acid Amide | 5 | — | 0.1 | 585 | 845 |
| Comparative Example 10 | — | — | — | — | — | — | — | — | — | 870 | 555 |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent
*4) Processing for 130° C. × 30 min Example 50

Production and Evaluation of Gas Barrier Laminate (Ia)

One surface of a PET ("E5100" available from Toyobo Co., Ltd., thickness: 12 µm) as a substrate was coated with the epoxy resin composition 5-1 obtained in Example 5-1 using a bar coater No. 3. The epoxy resin composition was heated and dried for 60 seconds at 120° C. (thickness after Example 51

Gas barrier laminates (Ia) and (IIa) were produced in the same manner as in Example 50 except that a biaxially stretched polypropylene film ("FOR", available from Futamura Chemical Co., Ltd., thickness: 20 µm) was used as the substrate instead of the PET, an vacuum-deposited aluminum layer was formed instead of the vacuum-deposited silica layer, and the epoxy resin composition 14-1 obtained in Example 14-1 was used as the epoxy resin; then, the oxygen transmission rate and water vapor transmission rate were measured using the methods described above, and a peel test at the normal state was performed using the method described above. The results are shown in Table 8.

Comparative Example 12

A gas barrier laminate was produced in the same manner as in Example 51 except that a cured resin layer was not formed; then, the oxygen transmission rate and water vapor transmission rate were measured using the methods described above, and a peel test at the normal state was performed using the methods described above. The results are shown in Table 8.

Example 52 [Production and Evaluation of Gas Barrier Laminate (IIb)]

A gas barrier laminate (Ia) was formed in the same manner as in Example 51. The vacuum-deposited aluminum surface was coated with the epoxy resin composition 14-1 obtained in Example 14-1 using a bar coater No. 3. The epoxy resin composition was heated and dried for 60 seconds at 120° C. (thickness after drying: approximately 0.1 µm), and then cured by heating for two days at 40° C., forming a cured resin layer. The surface of the cured resin layer was coated with the urethane adhesive using a bar coater No. 12, and drying was performed at 80° C. for 10 seconds, forming an adhesive layer (thickness after drying: approximately 3 µm). A polypropylene film ("P1146" available from Toyobo Co., Ltd.) having a thickness of 50 µm

TABLE 8

| | Epoxy Resin Composition | | | | | | | | |
|---|---|---|---|---|---|---|---|---|---|
| | Epoxy Resin Curing Agent Solution | | | Number of active amine hydrogens in curing agent/Number of epoxy groups in epoxy resin | Fatty Acid Amide | | Plate-shaped Alumina Particle | Gas Barrier Laminate Evaluation |
| | | | Silane Coupling Agent | | | | | | Thickness of Cured Resin Layer µm |
| | No. | Epoxy Resin | Type | Parts by mass *2) | | Type | parts by mass *1) | Parts by mass *2) | |
| Example 50 | 5-1 | TETRAD-X | A | 3 | 1.2 | Erucic Acid Amide | 5 | — | 0.1 |
| Comparative Example 11 | — | — | — | — | — | — | — | — | — |
| Example 51 | 14-1 | TETRAD-X | A | 3.7 | 3.0 | Erucic Acid Amide | 5 | — | 0.1 |
| Comparative Example 12 | — | — | — | — | — | — | — | — | — |

| | Gas Barrier Laminate Evaluation | | | | |
|---|---|---|---|---|---|
| | Laminate (Ia) | | | Laminate (IIa) | |
| | Substrate | Vapor-deposited Inorganic Layer | Oxygen Transmission Rate (23° C./60% RH) cc/(m² · day · atm) | Water Vapor Transmission Rate (40° C./90% RH) g/(m² · day) | Peel Strength (Normal) g/15 mm | Peel Strength (After Retort) *3) g/15 mm |
| Example 50 | PET | Silica | 3.6 | 3.4 | 965 | 225 |
| Comparative Example 11 | PET | Silica | 6 | 30 | 535 | 135 |
| Example 51 | OPP | Al | 30 | 0.5 | 140 | |
| Comparative Example 12 | OPP | Al | 65 | 0.6 | <50 | |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent
*3) Processing for 121° C. × 30 min was bonded on the adhesive layer using a nip roll, and heating was performed for two days at 40° C., resulting in a gas barrier laminate (IIb) having the constitution illustrated in FIG. 6.

The gas barrier laminate (IIb) was used to perform a peel test at the normal state using the method described above. The result is shown in Table 9.

above were added and stirred. To this mixture, 9.59 g of an erucic acid amide ("ALFLOW P-10", available from NOF CORPORATION) and 5.43 g of 3-aminopropyltriethoxysilane ("KBE-903" available from Shin-Etsu Chemical Co., Ltd.), which is a silane coupling agent, were added and stirred to prepare an epoxy resin curing agent solution C having a solid content concentration of 30.0 mass %.

TABLE 9

| | | Epoxy Resin Composition | | | | | |
|---|---|---|---|---|---|---|---|
| | | | | Epoxy Resin Curing Agent Solution | Number of active amine hydrogens in curing agent/Number of epoxy groups in epoxy resin | Fatty Acid Amide | | Plate-shaped Alumina Particle |
| | No. | Epoxy Resin | Type | Silane Coupling Agent Parts by mass *2) | | Type | parts by mass *1) | Parts by mass *2) |
| Example 51 | 14-1 | TETRAD-X | A | 3.7 | 3.0 | Erucic Acid Amide | 5 | — |
| Example 52 | 14-1 | TETRAD-X | A | 3.7 | 3.0 | Erucic Acid Amide | 5 | — |
| Comparative Example 12 | — | — | — | — | — | — | — | — |

| | Gas Barrier Laminate Evaluation | | | | |
|---|---|---|---|---|---|
| | Thickness of Cured Resin Layer µm | Substrate | Vapor-deposited Inorganic Layer | Laminate Constitution | Peel Strength (Normal) g/15 mm |
| Example 51 | 0.1 | OPP | Al | FIG. 5 IIa | 140 |
| Example 52 | 0.1 | OPP | Al | FIG. 6 IIb | 185 |
| Comparative Example 12 | — | OPP | Al | — | <50 |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent First Invention (2): Production of Epoxy Resin Composition and Evaluation of Shelf Life Production Example 3 (Preparation of Epoxy Resin Curing Agent Solution C)

A reaction vessel was charged with 1 mol of meta-xylylenediamine (MXDA). The temperature was raised to 60° C. under a nitrogen stream, and 0.93 mol of methyl acrylate was added dropwise over 1 hour. The temperature was increased to 165° C. while generated methanol was distilled off, and the temperature was then maintained at 165° C. for 2.5 hours, and thereby an amine-based curing agent was obtained. Ethanol was added dropwise over 1.5 hours to prepare a solution containing 65.0 mass % of the amine-based curing agent and 35.0 mass % of ethanol.

Amounts of 90.3 g of ethanol and 158.1 g of ethyl acetate, as a diluting solvent, and 188.5 g of the solution described above were added and stirred. To this mixture, 9.59 g of an erucic acid amide ("ALFLOW P-10", available from NOF CORPORATION) and 5.43 g of 3-aminopropyltriethoxysilane ("KBE-903" available from Shin-Etsu Chemical Co., Ltd.), which is a silane coupling agent, were added and stirred to prepare an epoxy resin curing agent solution C having a solid content concentration of 30.0 mass %.

Production Example 4 (Preparation of Epoxy Resin Curing Agent Solution D)

A solution containing 65.0 mass % of an amine-based curing agent and 35.0 mass % of ethanol was prepared in the same manner as in Production Example 3.

Amounts of 14.1 g of ethanol and 17.1 g of ethyl acetate, as a diluting solvent, and 8.17 g of the solution described above were added and stirred. To this mixture, 0.42 g of an erucic acid amide ("ALFLOW P-10", available from NOF CORPORATION) and 0.24 g of 3-aminopropyltriethoxysilane ("KBE-903" available from Shin-Etsu Chemical Co., Ltd.), which is a silane coupling agent, were added and stirred to prepare an epoxy resin curing agent solution D having a solid content concentration of 14.7 mass %.

Example 53 (Preparation and Evaluation of Epoxy Resin Composition 17)

37.6 g of ethanol as a diluting solvent was added to 2.24 g of the epoxy resin curing agent solution C prepared in Production Example 3, and the mixture was stirred well. To this mixture, 0.13 g of an epoxy resin ("TETRAD-X" available from Mitsubishi Gas Chemical Co., Inc.) having a glycidylamino group derived from meta-xylylenediamine [(number of active amine hydrogens in the epoxy resin curing agent)/(number of epoxy groups in the epoxy resin) =3.0] as an epoxy resin were added and stirred. Thus, an epoxy resin composition 17 having a solid content concentration of 2.0 mass % was prepared (Production Method 1). The blending amount of the erucic acid amide is 5.0 parts by mass per 100 parts by mass of the total amount of the epoxy resin in the epoxy resin composition and the nonvolatile content in the epoxy resin curing agent solution C.

The prepared epoxy resin composition 17 was placed in a screw tube and allowed to stand in an environment of 23° C. for visual observation; the time until the occurrence of cloudiness was presented in Table 10. The longer the time until the occurrence of cloudiness, the longer the shelf life.

Examples 54 to 58 (Preparation and Evaluation of Epoxy Resin Compositions 18 to 22)

Epoxy resin compositions were prepared in the same manner as in Example 53 except that ethanol and ethyl acetate were used and blended, in amounts giving the mass ratios of the final solvent compositions described in Table 10, instead of the 37.6 g of ethanol in Example 53 as a diluting solvent, and evaluation of the shelf life was performed. The results are shown in Table 10.

Example 59 (Preparation and Evaluation of Epoxy Resin Composition 23)

35.3 g of ethanol as a diluting solvent was added to 4.57 g of the epoxy resin curing agent solution D prepared in Production Example 4, and the mixture was stirred well. To this mixture, 0.13 g of an epoxy resin ("TETRAD-X", available from Mitsubishi Gas Chemical Co., Inc.) having a glycidylamino group derived from meta-xylylenediamine [(number of active amine hydrogens in the epoxy resin curing agent)/(number of epoxy groups in the epoxy resin) =3.0] as an epoxy resin were added and stirred. Thus, an epoxy resin composition 23 having a solid content concentration of 2.0 mass % was prepared (Production Method 1). The blending amount of the erucic acid amide was 5.0 parts by mass per 100 parts by mass of the total amount of the epoxy resin in the epoxy resin composition and the nonvolatile content in the epoxy resin curing agent solution D.

The prepared epoxy resin composition 23 was placed in a screw tube and allowed to stand in an environment of 23° C. for visual observation; the time until the occurrence of cloudiness was presented in Table 10.

Examples 60 to 64 (Preparation and Evaluation of Epoxy Resin Compositions 24 to 28)

Epoxy resin compositions were prepared in the same manner as in Example 59 except that ethanol and ethyl acetate were used and blended, in amounts giving the mass ratios of the final solvent compositions described in Table 10, instead of the 35.3 g of ethanol in Example 59 as a diluting solvent, and evaluation of the shelf life was performed. The results are shown in Table 10.

TABLE 10

| | | Epoxy Resin Composition | | | | | | | |
|---|---|---|---|---|---|---|---|---|---|
| | | Epoxy Resin Curing Agent Solution | | | | Number of active amine hydrogens | | | Evaluation |
| | No. | Type | Silane Coupling Agent parts by mass *2) | Erucic Acid Amide Parts by mass *1) | Solid Content Concentration Mass % | Epoxy Resin Type | in curing agent/Number of epoxy groups in epoxy resin | Organic Solvent Composition (w/w) | Solid Content Concentration (mass %) | Time until Occurrence of Cloudiness (hr) |
| Example 53 | 17 | C | 3.7 | 5 | 30.0 | TETRAD-X | 3.0 | EtOH | 2.0 | 11 |
| Example 54 | 18 | C | 3.7 | 5 | 30.0 | TETRAD-X | 3.0 | EtOH/EtOAc = 90/10 | 2.0 | 46 |
| Example 55 | 19 | c | 3.7 | 5 | 30.0 | TETRAD-X | 3.0 | EtOH/EtOAc = 80/20 | 2.0 | 52 |
| Example 56 | 20 | c | 3.7 | 5 | 30.0 | TETRAD-X | 3.0 | EtOH/EtOAc = 70/30 | 2.0 | 78 |
| Example 57 | 21 | c | 3.7 | 5 | 30.0 | TETRAD-X | 3.0 | EtOH/EtOAc = 60/40 | 2.0 | 72 |
| Example 58 | 22 | c | 3.7 | 5 | 30.0 | TETRAD-X | 3.0 | EtOH/EtOAc = 50/50 | 2.0 | <1 |
| Example 59 | 23 | D | 3.7 | 5 | 14.7 | TETRAD-X | 3.0 | EtOH | 2.0 | 24 |
| Example 60 | 24 | D | 3.7 | 5 | 14.7 | TETRAD-X | 3.0 | EtOH/EtOAc = 90/10 | 2.0 | 48 |
| Example 61 | 25 | D | 3.7 | 5 | 14.7 | TETRAD-X | 3.0 | EtOH/EtOAc = 80/20 | 2.0 | 75 |
| Example 62 | 26 | D | 3.7 | 5 | 14.7 | TETRAD-X | 3.0 | EtOH/EtOAc = 70/30 | 2.0 | 139 |

TABLE 10-continued

| | | Epoxy Resin Curing Agent Solution | | | | | Number of active amine hydrogens | | | Evaluation |
|---|---|---|---|---|---|---|---|---|---|---|
| | No. | Type | Silane Coupling Agent parts by mass *2) | Erucic Acid Amide Parts by mass *1) | Solid Content Concentration Mass % | Epoxy Resin Type | in curing agent/Number of epoxy groups in epoxy resin | Organic Solvent Composition (w/w) | Solid Content Concentration (mass %) | Time until Occurrence of Cloudiness (hr) |
| Example 63 | 27 | D | 3.7 | 5 | 14.7 | TETRAD-X | 3.0 | EtOH/EtOAc = 60/40 | 2.0 | 68 |
| Example 64 | 28 | D | 3.7 | 5 | 14.7 | TETRAD-X | 3.0 | EtOH/EtOAc = 50/50 | 2.0 | <1 |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent From Table 10, it can be seen that the shelf life of the epoxy resin composition was improved by using a mixture of ethanol-ethyl acetate as the organic solvent in the epoxy resin composition and by using the mixture having a predetermined mass ratio.

First Invention (3): Production and Evaluation of Epoxy Resin Composition

Example 65

Production and Evaluation of Gas Barrier Laminates (I) (II)

A gas barrier laminate (I) having the constitution illustrated in FIG. 1 and a gas barrier laminate (II) having the constitution illustrated in FIG. 4 were produced in the same manner as in Example 17 except that the epoxy resin composition 20 (prepared by Production Method 1) prepared in Example 56 was used instead of the epoxy resin composition 1-1 in Example 17.

The gas barrier laminate (I) was used to measure haze, total light transmittance, and YI, as well as oxygen transmission rate and water vapor transmission rate, using the methods described above. In addition, the gas barrier laminate (II) was used to perform a peel test at the normal state. The results are shown in Table 11.

Production and Evaluation of Gas Barrier Laminate (III)

A gas barrier laminate (III) having the constitution illustrated in FIG. 7 was produced in the same manner as in Example 30 except that the epoxy resin composition 20 prepared in Example 56 was used instead of the epoxy resin composition 1-1 in Example 30.

The gas barrier laminate (III) was used to perform peel tests at the normal state and after a retort treatment. The results are shown in Table 11.

Example 66

Gas barrier laminates (I) to (III) were produced in the same manner as in Example 65 except that the epoxy resin composition 26 (produced by Production Method 1) prepared in Example 62 was used instead of the epoxy resin composition 20 prepared in Example 56, and evaluations described above were performed. The results are shown in Table 11.

Example 67 (Preparation of Epoxy Resin Composition 29)

Preparation of Erucic Acid Amide Solution a
2.85 g of an erucic acid amide ("ALFLOW P-10", available from NOF CORPORATION) was added to 40.8 g of ethanol and 66.5 g of ethyl acetate, as a diluting solvent, and heating was performed using a band heater. Stirring was started when the temperature reached 20° C., and an erucic acid amide solution a was prepared.
Preparation of Epoxy Resin Curing Agent Solution E
An amine-based curing agent solution containing 65.0 mass % of an amine-based curing agent and 35.0 mass % of ethanol was prepared in the same manner as in Production Example 3.
1.71 g of 3-aminopropyltriethoxysilane ("KBE-903" available from Shin-Etsu Chemical Co., Ltd.), which is a silane coupling agent, was added to the erucic acid amide solution a. While continuing heating and stirring, 73.6 g of the amine-based curing agent solution was added and stirred, resulting in an epoxy resin curing agent solution E having a solid content concentration of 30.0 mass %.
Preparation of Epoxy Resin Composition 29
Amounts of 216.0 g of ethanol and 220.5 g of ethyl acetate, as a dilute solvent, were added to 12.8 g of the epoxy resin curing agent solution E, and the mixture was stirred well. To this mixture, 1.4 g of an epoxy resin ("TETRAD-X", available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)=3.0] as an epoxy resin were added and stirred. Thus, an epoxy resin composition 29 having a solid content concentration of 2.0 mass % was prepared (Production Method 2). The blending amount of the erucic acid amide was 5.0 parts by mass per 100 parts by mass of the total amount of the epoxy resin in the epoxy resin composition and the nonvolatile content in the epoxy resin curing agent solution E.

Example 68

Gas barrier laminates (I) to (III) were obtained in the same manner as in Example 65 except that the epoxy resin composition 29 (produced by Production Method 2) prepared in Example 67 was used instead of the epoxy resin composition 20 prepared in Example 56, and evaluations described above were performed. The results are shown in Table 11.

TABLE 11

| | | | Epoxy Resin Composition | | | | | | | |
|---|---|---|---|---|---|---|---|---|---|---|
| | | | Epoxy Resin Curing Agent Solution | | | | | Number of active amine hydrogens | | |
| | No. | Production Method | Type | Silane Coupling Agent Parts by mass *2) | Erucic Acid Amide Parts by mass *1) | Solid Content Concentration Mass % | Epoxy Resin Type | in curing agent/Number of epoxy groups in epoxy resin | Organic Solvent Composition (w/w) | Solid Content Concentration (mass %) |
| Example 65 | 20 | 1 | C | 3.7 | 5 | 30.0 | TETRAD-X | 3.0 | EtOH/EtOAc = 70/30 | 2.0 |
| Example 66 | 26 | 1 | D | 3.7 | 5 | 14.7 | TETRAD-X | 3.0 | EtOH/EtOAc = 70/30 | 2.0 |
| Example 68 | 29 | 2 | E | 3.7 | 5 | 30.0 | TETRAD-X | 3.0 | EtOH/EtOAc = 70/30 | 2.0 |

| | Gas Barrier Laminate Evaluation | | | | | | | |
|---|---|---|---|---|---|---|---|---|
| | Laminate (I) Alumina Vapor-Deposited PET | | | | | Laminate (II) Alumina Vapor-Deposited PET | Laminate (III) Alumina Vapor-Deposited PET | |
| | Thickness of Cured Resin Layer μm | Haze % | Total Light Transmittance % | YI | Oxygen Transmission Rate cc/($m^2$ · day · atm) | Water Vapor Transmission Rate g/($m^2$ · day) | Peel Strength (Normal) g/15 mm | Peel Strength (Normal) g/15 mm | Peel Strength (After Retort) *3) g/15 mm |
| Example 65 | 0.1 | 3.82 | 89.5 | 0.83 | 1.16 | 0.75 | 700 | 355 | 310 |
| Example 66 | 0.1 | 3.38 | 89.2 | 1.18 | 0.5 | 1.0 | 915 | 330 | 305 |
| Example 68 | 0.1 | 3.00 | 89.0 | 1.24 | 1.04 | 0.6 | 840 | 330 | 285 |

*1) Parts by mass relative to 100 parts by mass of the total amount of the epoxy resin and the nonvolatile content in the epoxy resin curing agent solution
*2) Parts by mass relative to 100 parts by mass of the total amount of the epoxy resin and the curing agent
*3) Processing for 121° C. × 30 min From Table 11, it can be seen that gas barrier laminates using the epoxy resin composition produced by either Production Method 1 or Production Method 2 yielded the same performance.

First Invention (4): Production and Evaluation of Gas Barrier Laminate (IIa)

Example 69

One surface of a biaxially stretched polypropylene film ("FOR" available from Futamura Chemical Co., Ltd., thickness: 20 μm) as a substrate was coated with the epoxy resin composition 23 prepared in Example 59 using a bar coater No. 3. The epoxy resin composition was heated and dried for 60 seconds at 120° C. (thickness after drying: approximately 0.1 μm), and then cured by heating for two days at 40° C., forming a cured resin layer. A vacuum-deposited aluminum layer having a thickness of approximately 170 Å was formed on the surface of the cured resin layer by a vacuum vapor deposition method, resulting in a gas barrier laminate (Ia) having the constitution illustrated in FIG. 2.

The vacuum-deposited aluminum surface of the obtained gas barrier laminate (Ia) was coated with the urethane adhesive using a bar coater No. 12, and drying was performed at 80° C. for 10 seconds, forming an adhesive layer (thickness after drying: approximately 3 μm). A polypropylene film ("P1146" available from Toyobo Co., Ltd.) having a thickness of 50 μm was bonded on the adhesive layer using a nip roll, and heating was performed for two days at 40° C., resulting in a gas barrier laminate (IIa) having the constitution illustrated in FIG. 5.

The gas barrier laminate (IIa) was used to perform a peel test at the normal state using the method described above. The result is shown in Table 12.

Example 70

A gas barrier laminate (IIa) was produced in the same manner as in Example 69 except that a vacuum-deposited silica layer was formed instead of the vacuum-deposited aluminum layer in Example 69, and a peel test at the normal state was performed using the method described above. The result is shown in Table 12.

Comparative Example 13

A gas barrier laminate was produced in the same manner as in Example 70 except that a cured resin layer was not formed, and a peel test at the normal state was performed using the method described above. The result is shown in Table 12.

Example 71

A gas barrier laminate (IIa) was produced in the same manner as in Example 69 except that a vacuum-deposited alumina layer was formed instead of the vacuum-deposited aluminum layer in Example 69, and a peel test at the normal state was performed using the method described above. The result is shown in Table 12.

Comparative Example 14

A gas barrier laminate was produced in the same manner as in Example 71 except that a cured resin layer was not formed, and a peel test at the normal state was performed using the method described above. The result is shown in Table 12.

The odor-proofing bag with the odorous component sealed was placed in an aluminum bag, which was then injected with 1000 cc of air via a syringe and store in a 23° C. and 50% R.H. environment. After a certain period of time, the end of the aluminum bag was cut off, 100 cc of the air inside the bag was aspirated using a detection tube, and the amount of odorous component in the air was measured

TABLE 12

| | | | | Gas Barrier Laminate Evaluation | | |
|---|---|---|---|---|---|---|
| | | | | | Laminate | |
| | Epoxy Resin Composition No. | Thickness of Cured Resin Layer μm | Substrate | Vapor-deposited Inorganic Layer | Constitution | Peel Strength (Normal) g/15 mm |
| Example 69 | 23 | 0.1 | OPP | Al | FIG. 5 IIa | 140 |
| Comparative Example 12 | — | — | OPP | Al | — | <50 |
| Example 70 | 23 | 0.1 | OPP | Silica | FIG. 5 IIa | 310 |
| Comparative Example 13 | — | — | OPP | Silica | — | <50 |
| Example 71 | 23 | 0.1 | OPP | Alumina | FIG. 5 IIa | 330 |
| Comparative Example 14 | — | — | OPP | Alumina | — | <50 |

Second Invention: Production and Evaluation of Packaging Material

Measurements and evaluations in the present examples were performed by the following methods.

Blocking Property Evaluation

The surface of one side of a linear low density polyethylene (LLDPE) film ("CMPS-017C", available from Mitsui Chemicals Tohcello, Inc., thickness: 30 μm) was coated with the epoxy resin composition according to the method described in each of the examples, and drying was performed to form a resin composition layer; the resulting product was then placed on a horizontal surface. On the surface of the resin composition layer, another piece of the 210 mm×297 mm LLDPE film, prepared separately, was laminated, such that the LLDPE film faced the surface of the resin composition layer. An A4 size weight having a mass of 15 kg was placed thereon, and aging was performed at 40° C. for 2 days with the load applied. After aging, the weight was removed, and the state of blocking when the LLDPE film laminated later was manually peeled away from the surface of the cured product layer was evaluated according to the following criteria.

A: No blocking occurred, and the LLDPE film could be easily peeled off

B: Blocking occurred, and while the LLDPE film could be peeled off, the increase of haze after peeling was observed C: Blocking occurred, and the LLDPE film could not be peeled off Odor-Proofing Property Evaluation The packaging film produced in each of the examples was cut into two pieces of 12 cm squares; then, the two pieces of the film were overlapped, and three sides were heat-sealed to form a shape of a bag. At this time, the films of Examples X1 and X2 were heat-sealed by overlapping the pieces of the films such that the cured product layers were the outermost layer. The resulting odor-proofing bag was charged with 2 mL of a 0.1% aqueous solution of an odorous component described in Table 13, and the opening was heat-sealed.

and shown in Table 13. The smaller the amount of the detected odorous component, the smaller the leakage of the odorous component from the odor-proofing bag, and the higher the odor-proofing property.

Production Example X1 (Preparation of Epoxy Resin Curing Agent Solution XA)

A reaction vessel was charged with 1 mol of meta-xylylenediamine (MXDA). The temperature was raised to 60° C. under a nitrogen stream, and 0.93 mol of methyl acrylate was added dropwise over 1 hour. The temperature was increased to 165° C. while generated methanol was distilled off, and the temperature was then maintained at 165° C. for 2.5 hours, and thereby an amine-based curing agent was obtained. Ethanol was added dropwise over 1.5 hours to prepare a solution containing 65.0 mass % of the amine-based curing agent and 35.0 mass % of ethanol.

Amounts of 166.8 g of ethanol and 200.2 g of ethyl acetate, as a diluting solvent, and 94.9 g of the solution described above were added and stirred. To this mixture, 4.64 g of an erucic acid amide ("ALFLOW P-10" available from NOF CORPORATION) and 3-aminopropyltriethoxysilane ("KBE-903" available from Shin-Etsu Chemical Co., Ltd.), which is a silane coupling agent, were added and stirred to prepare an epoxy resin curing agent solution XA.

Production Example X2 (Preparation of Epoxy Resin Composition X1)

29.0 g of ethanol as a diluting solvent was added to 3.75 g of the epoxy resin curing agent solution XA obtained in Production Example X1, and the mixture was stirred well. To this mixture, 0.10 g of an epoxy resin ("TETRAD-X" available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)

=3.0] as an epoxy resin were added and stirred. Thus, an epoxy resin composition X1 was prepared. The blending amount of the erucic acid amide was 5.0 parts by mass per 100 parts by mass of the total amount of the epoxy resin in the epoxy resin composition X1 and the nonvolatile content in the epoxy resin curing agent solution XA.

Example X1 (Production and Evaluation of Odor-Proofing Bag)

A linear low density polyethylene (LLDPE) film ("CMPS-017C" available from Mitsui Chemicals Tohcello, Inc., thickness: 30 μm) was coated with the epoxy resin composition X1 prepared in Production Example X2 using a bar coater No. 3. The epoxy resin composition was heated and dried for 30 seconds in a 60° C. drying oven (thickness after drying: approximately 0.1 μm); then, aging was performed at 40° C. for 2 days, resulting in a packaging film having the constitution illustrated in FIG. 10.

The resulting packaging film was used to produce an odor-proofing bag by the method described in "Odor-proofing property evaluation", and the evaluation described above was performed. The results are shown in Table 13.

Comparative Example X1

An odor-proofing bag was prepared by the method described in "Odor-proofing property evaluation" using only a linear low density polyethylene film ("CMPS-017C", available from Mitsui Chemicals Tohcello, Inc., thickness: 30 μm) instead of the packaging film in Example X1, and the evaluation described above was performed. The results are shown in Table 13.

Comparative Example X2

An upward air-cooled inflation molding machine (available from TOMI MACHINERY Co., Ltd.) equipped with five extruders, a feed block, and a T-die was used. From the first extruder, an LLDPE ("EVOLUE SP2510" available from Prime Polymer Co., Ltd., MFR=1.4) was extruded at 200° C.; from the second extruder, an adhesive polyolefin ("ADMER NF518" available from Mitsui Chemicals, Inc.) was extruded at 200° C.; from the third extruder, an LLDPE ("EVOLUE SP2510" available from Prime Polymer Co., Ltd., MFR=1.4) was extruded at 200° C.; from the fourth extruder, an adhesive polyolefin ("ADMER NF518" available from Mitsui Chemicals, Inc.) was extruded at 200° C.; and from the fifth extruder, an LLDPE ("EVOLUE SP2510" available from Prime Polymer Co., Ltd., MFR=1.4) was extruded at 200° C. The extruded products were air-cooled upward to produce a multi-layer sheet. The layer constitution of the multi-layer sheet was a three-type five-layer structure of, from the outer layer, LLDPE layer/adhesive polyolefin layer/LLDPE layer/adhesive polyolefin layer/LLDPE layer, and the thickness of each layer was 11/5/4/5/11 (μm).

The resulting multi-layer sheet was used to produce an odor-proofing bag by the method described in "Odor-proofing property evaluation", and odor-proofing property evaluation was performed. The results are shown in Table 13.

Comparative Example X3

A multi-layer sheet and an odor-proofing bag were produced in the same manner as in Comparative Example X2 except that an ethylene-vinylalcohol copolymer (EVOH, "ET3803RB", available from Nippon Synthetic Chemical Industry Co., Ltd., ethylene: 38 mol %) was extruded at 200° C. from the third extruder instead of the LLDPE in Comparative Example X2, and odor-proofing property evaluation was performed. The results are shown in Table 13.

Example X2

An odor-proofing property evaluation was performed in the same manner as in Example X1 except that the odorous component was changed to trimethylamine. The results are shown in Table 13.

Comparative Example X4

An odor-proofing property evaluation was performed in the same manner as in Comparative Example X1 except that the odorous component was changed to trimethylamine. The results are shown in Table 13.

TABLE 13

| | Packaging Material Constitution | | | |
|---|---|---|---|---|
| | Epoxy Resin Composition | Layer Constitution | Total Thickness μm | Thickness of Cured Product Layer μm |
| Example X1 | Production Example X2 | LLDPE#30/Cured Product Layer | 30.1 | 0.1 |
| Comparative Example X1 | — | LLDPE#30 | 30 | — |
| Comparative Example X2 | — | LLDPE#11/Tie#5/LLDPE#4/Tie#5/LLDPE#11 | 36 | — |
| Comparative Example X3 | — | LLDPE#11/Tie#5/EVOH#4/Tie#5/LLDPE#11 | 36 | — |
| Example X2 | Production Example X2 | LLDPE#30/Cured Product Layer | 30.1 | 0.1 |
| Comparative Example X4 | — | LLDPE#30 | 30 | — |

TABLE 13-continued

|  | Blocking Property Evaluation | Odor-proofing Property Evaluation ||| 
| --- | --- | --- | --- | --- |
|  |  | Odorous Substance | Concentration after 1 Day ppm | Concentration after 2 Days ppm |
| Example XI | A | Ammonia | 70 | 100 |
| Comparative Example X1 |  | Ammonia | 140 | 140 |
| Comparative Example X2 |  | Ammonia | 110 | 180 |
| Comparative Example X3 |  | Ammonia | 80 | 140 |
| Example X2 | A | Trimethylamine | 50 | 140 |
| Comparative Example X4 |  | Trimethylamine | 140 | 160 |

|  | Odor-proofing Property Evaluation |||
| --- | --- | --- | --- |
|  | Concentration after 3 Days ppm | Concentration after 4 Days ppm | Concentration after 5 Days ppm |
| Example XI | 160 |  | 190 |
| Comparative Example X1 | 220 |  |  |
| Comparative Example X2 |  | 205 | 300 |
| Comparative Example X3 |  | 255 | 300 |
| Example X2 | 200 | 200 | 260 |
| Comparative Example X4 | 200 | 200 | 300 |

*1) A diagonal line in a cell means that evaluation was not performed

The abbreviations in Table 13 are as follows.

LLDPE #30: Linear low density polyethylene film, "CMPS-017C" available from Mitsui Chemicals Tohcello, Inc., thickness: 30 μm LLDPE #11: Linear low density polyethylene layer, "EVOLUE SP2510" available from Prime Polymer Co., Ltd., MFR=1.4, layer thickness: 11 μm LLDPE #4: Linear low density polyethylene layer, "EVOLUE SP2510" available from Prime Polymer Co., Ltd., MFR=1.4, layer thickness: 4 μm Tie #5: Adhesive polyolefin layer, "ADMER NF518" available from Mitsui Chemicals, Inc., layer thickness: 5 μm EVOH #4: Ethylene-vinylalcohol copolymer, "ET3803RB" available from Nippon Synthetic Chemical Industry Co., Ltd., ethylene 38 mol %, layer thickness: 4 μm Third Invention: Production and evaluation of heat-shrinkable label Measurements and evaluations in the present examples were performed by the following methods.

Heat Shrinkage Ratio

A square of 10 cm×10 cm was drawn in the center of a heat-shrinkable substrate or a heat-shrinkable label of each of the examples, which was then placed in a hot air drier and heat treated for 30 seconds at 150° C. The area of the square after heat treatment was measured, and the heat shrinkage ratio (area shrinkage rate) was determined according to the following equation.

Heat shrinkage ratio (%)={1−(Area of square after heat shrinkage)/(Area of square before heat shrinkage)}×100

Conformability During Heat Shrinking

The heat-shrinkable label having a tubular shape in each of the examples was placed on the outer peripheral side surface of a PET bottle having a volume of 500 mL with the heat-shrinkable film surface being at the inside the tube. The location of placement of the label was a location indicated by the diagonal line-shaded portion in FIG. 2, and the lower end of the label was at a position of 0.5 cm away from the bottom of the PET bottle (surface of placement). Then, the PET bottle with the heat-shrinkable label placed was immersed in hot water at 90° C. for 5 seconds to shrink the label and adhere the label to the PET bottle (shrink wrapping). The heat-shrunken label after the shrink wrapping was visually observed, and the conformability during heat shrinking was evaluated. The case in which the label was evenly adhered to the side surface of the PET bottle and there was no delamination between the substrate layer and the cured product layer was rated as "Good"; meanwhile, the case in which the label did not conform to the shape of the side surface of the PET bottle and adhered to the PET bottle unevenly, or in which delamination between the substrate layer and the cured product layer was observed, was rated as "Bad".

$O_2$ Transmission Amount

The $O_2$ transmission amount of a bottle was measured using an oxygen transmission rate measuring device ("OX-TRAN 2/61" available from MOCON).

A PET bottle that had been subjected to shrink wrapping in the same manner as described above was filled with 30 mL of water, and 1 atm of nitrogen was circulated at 20 mL/min inside the bottle under the conditions of a temperature of 23° C., a humidity of 100% RH inside the bottle, and an outside humidity of 50% RH. Oxygen contained in the nitrogen circulated inside the bottle was detected using a coulometric sensor. The smaller the value, the less $O_2$ transmission, the better the $O_2$ barrier property.

$CO_2$ Transmission Amount

The $CO_2$ transmission rate of a bottle was measured using a carbon dioxide transmission rate measuring device ("Permatran C10" available from MOCON). 500 mL of carbonated water with a $CO_2$ amount of 3.2 GV (carbonated water in which 3.2 L of $CO_2$ is dissolved in 1 L of water) was sealed in a PET bottle that had been subjected to shrink wrapping in the same manner as described above, and the bottle was allowed to stand for 1 week in an environment of 23° C. and 50% RH. The amount of $CO_2$ in the bottle after standing for one week was quantified, based on which the $CO_2$ transmission amount was calculated. The smaller the value, the less $CO_2$ transmission, the better the $CO_2$ barrier property.

Shelf Life 500 mL of carbonated water with a $CO_2$ amount of 3.2 GV was sealed in a PET bottle that had been subjected to shrink wrapping in the same manner as described above. The bottle was allowed to stand in an environment of 23° C. and 50% RH, and the amount of $CO_2$ in the bottle was quantified over time using a carbon dioxide transmission rate measuring device ("Permatran C10" available from MOCON). The time required for the GV of $CO_2$ in the carbonated water sealed in the PET bottle to reach 80% of the initial value was shown in Table 2. The longer the shelf life, the less $CO_2$ transmission, the better the $CO_2$ barrier property.

Production Example X3 (Preparation of Epoxy Resin Composition X2)

6.48 g of ethanol as a diluting solvent was added to 3.42 g of the epoxy resin curing agent solution XA prepared in Production Example X1, and the mixture was stirred well. To this mixture, 0.10 g of an epoxy resin ("TETRAD-X", available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)= 3.0] as an epoxy resin were added and stirred. Thus, an epoxy resin composition X2 was prepared. The blending amount of the erucic acid amide was 5.0 parts by mass per 100 parts by mass of the total amount of the epoxy resin in the epoxy resin composition X2 and the nonvolatile content in the epoxy resin curing agent solution XA.

Example Y1 (Preparation and Evaluation of Heat-Shrinkable Film)

The outer surface of a tubular heat-shrinkable film [PET Bottle Customization Film "Chijimarukun" available from SUN PLASTIC CO., Ltd, width 110 mm (circumference of the tube is 220 mm)×length 175 mm×thickness 40 μm] made of polyvinyl chloride (PVC) was coated with the epoxy resin composition X1 prepared in Production Example X2 using a bar coater No. 3. The epoxy resin composition 1 was heated and dried for 30 seconds in a 60° C. drying oven (thickness after drying: approximately 0.1 μm); then, aging was performed at 40° C. for 2 days, resulting in a tubular heat-shrinkable label having the constitution illustrated FIG. 11.

The produced heat-shrinkable label was used to perform various evaluations using the methods described above. The results are shown in Table 14.

Example Y2

A heat-shrinkable label was produced in the same manner as in Example Y1 except that the epoxy resin composition X2 prepared in Production Example X3 was used instead of the epoxy resin composition X1 prepared in Production Example X2, and the evaluations described above were performed. The results are shown in Table 14.

Comparative Example Y1

A PET bottle was subjected to shrink wrapping by the method described above using only the tubular heat-shrinkable film made of PVC as the heat-shrinkable label, and the evaluations described above were performed. The results are shown in Table 14.

Reference Example Y1

A PET bottle without a shrink wrapping of a heat-shrinkable label was used to perform the evaluations described above. The results are shown in Table 14.

TABLE 14

| | Label Constitution | | Evaluation Results | | | |
|---|---|---|---|---|---|---|
| | Heat-shrinkable Substrate | Thickness of Cured Product Layer μm | Heat shrinkage ratio % | Conformability during Heat Shrinkage | $O_2$ Transmission Amount cc/(package · day) | $CO_2$ Transmission Amount cc/day | Shelf Life day |
| Example Y1 | PVC Film | 0.1 | 4 | Good | 0.03 | 2.21 | 167.0 |
| Example Y2 | PVC Film | 0.3 | 4 | Good | 0.03 | 1.85 | 192.0 |
| Comparative Example Y1 | PVC Film | — | 4 | Good | 0.03 | 2.52 | 146.3 |
| Reference Example Y1 | — | — | — | — | 0.03 | 2.59 | 137.6 |

From Table 14, it can be seen that the bottles having the heat-shrinkable labels of the Examples have the same 02 barrier properties as the bottles of Comparative Example and Reference Example while having higher $CO_2$ barrier properties. In addition, the heat-shrinkable labels of the Examples also have good conformability during heat shrinking.

INDUSTRIAL APPLICABILITY

According to the epoxy resin composition of the first invention, a cured product that exhibits high gas barrier properties, good adhesiveness to inorganic substances such as alumina in particular, and excellent retort resistance in which peeling-off does not easily happen even after a retort treatment can be formed. A gas barrier laminate in which a cured resin layer, which is a cured product of the epoxy resin composition, is formed on a substrate having at least one surface composed of an inorganic substance exhibits high gas barrier properties and interlayer adhesiveness, and has retort resistance, making it suitable for, for example, the application of a retort food packaging material.

According to the second invention, it is possible to provide an odor-proofing or aroma-retaining packaging material that has good odor-proofing property and aroma-retaining property, possibility of thinning, and excellent cost efficiency, and to provide an odor-proofing or aroma-retaining method. The packaging material according to the second invention can be suitably used for applications requiring odor-proofing property or aroma-retaining property, such as: a bag for storing used paper diapers or pet litter, filth, kitchen waste, and other malodorous substances; a packaging material for foods with strong odor; and a packaging material for toiletry products, cosmetics, stationery, toys, and the like that are aromatic.

Further, according to third invention, a heat-shrinkable label having good $CO_2$ barrier properties, excellent conformability during heat shrinking, and excellent cost efficiency, a method for producing the heat-shrinkable label, a heat-shrunken label and a bottle having the heat-shrunken label, and a $CO_2$ transmission prevention method can be provided. The heat-shrinkable label according to the third invention can be suitably used on a PET bottle for carbonated water or other carbonated beverages.

REFERENCE SIGNS LIST 100, 200, 300, 400 Gas barrier laminate
1 Substrate
2 Inorganic thin film layer
3 Cured resin layer
4 Thermoplastic resin film (thermoplastic resin layer)
5 Adhesive layer
500 Packaging material (packaging film)
501 Substrate
502, 602 Cured product layer
600 Heat-shrinkable label
601 Heat-shrinkable substrate layer

The invention claimed is:

1. An epoxy resin composition comprising an epoxy resin, an epoxy resin curing agent comprising an amine-based curing agent and an unsaturated fatty acid amide having 14 to 24 carbons, wherein a content of the unsaturated fatty acid amide in the epoxy resin composition is from 3 to 20 parts by mass per 100 parts by mass of the total amount of the epoxy resin and a nonvolatile content in the epoxy resin curing agent.

2. The epoxy resin composition according to claim 1, wherein the amine-based curing agent is an amine-based curing agent (i):
(i) a reaction product of a component (A) and a component (B):
(A) at least one selected from the group consisting of meta-xylylenediamine and para-xylylenediamine, and
(B) at least one selected from the group consisting of unsaturated carboxylic acids represented by Formula (1) and derivatives thereof;

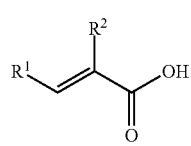

(1)

where, in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

3. The epoxy resin composition according to claim 1, wherein the epoxy resin comprises, as a main component, an epoxy resin having a glycidylamino group derived from meta-xylylenediamine.

4. The epoxy resin composition according to claim 1, wherein the unsaturated fatty acid amide is at least one selected from the group consisting of an oleic acid amide and an erucic acid amide.

5. The epoxy resin composition according to claim 1, wherein the epoxy resin composition further comprises a non-spherical inorganic particle.

6. The epoxy resin composition according to claim 1, wherein a ratio of the number of active amine hydrogens in the epoxy resin curing agent to the number of epoxy groups in the epoxy resin is more than 1.0 and 5.0 or less.

7. A gas barrier laminate comprising a substrate and a cured resin layer, the cured resin layer being a cured product of the epoxy resin composition described in claim 1.

8. The gas barrier laminate according to claim 7, wherein the gas barrier laminate comprises at least one layer composed of an inorganic substance.

9. The gas barrier laminate according to claim 8, wherein the layer composed of the inorganic substance is an inorganic thin film layer having a thickness of 5 nm or more and 100 nm or less, and the inorganic substance in the inorganic thin film layer is at least one selected from the group consisting of a silicon oxide, aluminum, and an aluminum oxide.

10. The gas barrier laminate according to claim 8, wherein the layer composed of the inorganic substance is adjacent to the cured resin layer.

11. The gas barrier laminate according to claim 7, further comprising a thermoplastic resin layer.

12. A retort food packaging material comprising the gas barrier laminate described in claim 11.

13. An odor-proofing or aroma-retaining packaging material comprising a substrate and a cured product layer of the epoxy resin composition according to claim 1.

14. The odor-proofing or aroma-retaining packaging material according to claim 13, wherein a thickness of the cured product layer is from 0.02 to 0.6 μm.

15. A method for odor proofing or aroma retaining, the method comprising an odorous component or an aromatic component in a packaging material, the packaging material comprising a substrate and a cured product layer of the epoxy resin composition according to claim 1.

16. A heat-shrinkable label comprising a heat-shrinkable substrate layer and a cured product layer of the epoxy resin composition according to claim 1.

17. The heat-shrinkable label according to claim 16, wherein the heat-shrinkable label comprises only one layer of the heat-shrinkable substrate layer and only one layer of the cured product layer.

18. A method for producing the heat-shrinkable label described in claim 16, wherein the method comprises (I) and (II) sequentially:
(I): applying the epoxy resin composition, the epoxy resin composition further comprising a solvent, on a surface of at least one side of a heat-shrinkable substrate and forming a coating layer
(II): heating and drying the coating layer at a temperature of less than 100° C. and removing the solvent.

19. The epoxy resin composition according to claim 1, wherein a content of the unsaturated fatty acid amide in the epoxy resin composition is from 3 to 15 parts by mass per 100 parts by mass of the total amount of the epoxy resin and a nonvolatile content in the epoxy resin curing agent.

* * * * *